(12) United States Patent
Rahman et al.

(10) Patent No.: US 12,519,594 B2
(45) Date of Patent: Jan. 6, 2026

(54) METHOD AND APPARATUS FOR UL TRANSMIT BEAM AND SRS RESOURCE ALIGNMENT

(71) Applicant: Samsung Electronics Co., Ltd., Suwon-si (KR)

(72) Inventors: Md. Saifur Rahman, Plano, TX (US); Eko Onggosanusi, Coppell, TX (US); Emad N. Farag, Flanders, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 369 days.

(21) Appl. No.: 18/178,419

(22) Filed: Mar. 3, 2023

(65) Prior Publication Data

US 2023/0299921 A1 Sep. 21, 2023

Related U.S. Application Data

(60) Provisional application No. 63/322,976, filed on Mar. 23, 2022, provisional application No. 63/320,102, filed on Mar. 15, 2022.

(51) Int. Cl.
*H04L 5/00* (2006.01)

(52) U.S. Cl.
CPC .......... *H04L 5/0051* (2013.01); *H04L 5/0094* (2013.01)

(58) Field of Classification Search
CPC .... H04B 7/0695; H04L 5/0051; H04L 5/0094
See application file for complete search history.

(56) References Cited

U.S. PATENT DOCUMENTS

| 2019/0312698 A1* | 10/2019 | Akkarakaran ........ H04L 5/0048 |
| 2021/0184738 A1 | 6/2021 | Bai et al. |
| 2023/0113530 A1* | 4/2023 | He ....................... H04B 7/0695 370/330 |

(Continued)

FOREIGN PATENT DOCUMENTS

WO 2021093178 A1 5/2021

OTHER PUBLICATIONS

"3rd Generation Partnership Project; Technical Specification Group Radio Access Network; Evolved Universal Terrestrial Radio Access (E-UTRA); Physical channels and modulation (Release 17)", 3GPP TS 36.211 V17.0.0, Dec. 2021, 250 pages.

(Continued)

*Primary Examiner* — Sulaiman Nooristany

(57) ABSTRACT

Apparatuses and methods for uplink (UL) transmit beam and sounding reference signal (SRS) resource alignment are provided. A method performed by a user equipment (UE) is provided. The method includes receiving a configuration including information about a list of transmission configuration indicator (TCI) states and receiving an indication indicating a TCI state from the list of TCI states. The TCI state is associated with a source reference signal (RS) and at least one sounding reference signal (SRS) related information (SRS-Info). The method further includes identifying the source RS and the at least one SRS-info associated with the TCI state; determining a beam based on the source RS; determining at least one port based on the at least one SRS-Info; and transmitting an uplink (UL) transmission using the beam and the at least one port.

18 Claims, 12 Drawing Sheets

(56) References Cited

U.S. PATENT DOCUMENTS

2024/0014880 A1* 1/2024 Svedman ........... H04B 7/06968

OTHER PUBLICATIONS

"3rd Generation Partnership Project; Technical Specification Group Radio Access Network; Evolved Universal Terrestrial Radio Access (E-UTRA); Multiplexing and channel coding (Release 17)", 3GPP TS 36.212 V17.0.0, Dec. 2021, 258 pages.

"3rd Generation Partnership Project; Technical Specification Group Radio Access Network; Evolved Universal Terrestrial Radio Access (E-UTRA); Physical layer procedures (Release 17)", 3GPP TS 36.213 V17.0.0, Dec. 2021, 582 pages.

"3rd Generation Partnership Project; Technical Specification Group Radio Access Network; Evolved Universal Terrestrial Radio Access (E-UTRA); Medium Access Control (MAC) protocol specification (Release 17)", 3GPP TS 36.321 V17.0.0, Mar. 2022, 146 pages.

"3rd Generation Partnership Project; Technical Specification Group Radio Access Network; Evolved Universal Terrestrial Radio Access (E-UTRA); Radio Resource Control (RRC); Protocol specification (Release 17)", 3GPP TS 36.331 V17.0.0, Mar. 2022, 1119 pages.

"3rd Generation Partnership Project; Technical Specification Group Radio Access Network; NR; Physical channels and modulation (Release 17)", 3GPP TS 38.211 V17.0.0, Dec. 2021, 134 pages.

"3rd Generation Partnership Project; Technical Specification Group Radio Access Network; NR; Multiplexing and channel coding (Release 17)", 3GPP TS 38.212 V17.0.0, Dec. 2021, 190 pages.

"3rd Generation Partnership Project; Technical Specification Group Radio Access Network; NR; Physical layer procedures for control (Release 17)", 3GPP TS 38.213 V17.0.0, Dec. 2021, 225 pages.

"3rd Generation Partnership Project; Technical Specification Group Radio Access Network; NR; Physical layer for procedures for data (Release 17)", 3GPP TS 38.214 V17.0.0, Dec. 2021, 217 pages.

"3rd Generation Partnership Project; Technical Specification Group Radio Access Network; NR; Physical layer measurements (Release 17)", 3GPP TS 38.215 V17.0.0, Dec. 2021, 26 pages.

"3rd Generation Partnership Project; Technical Specification Group Radio Access Network; NR; Medium Access Control (MAC) protocol specification (Release 17)", 3GPP TS 38.321 V17.0.0, Mar. 2022, 221 pages.

"3rd Generation Partnership Project; Technical Specification Group Radio Access Network; NR; Radio Resource Control (RRC) protocol specification (Release 17)", 3GPP TS 38.331 V17.0.0, Mar. 2022, 1221 pages.

International Search Report and Written Opinion issued Jun. 29, 2023 regarding International Application No. PCT/KR2023/003401, 7 pages.

Nokia, "Introduction of further enhancements on MIMO for NR", 3GPP TSG-RAN WG1 Meeting #107-e, R1-2112949, Dec. 2021, 93 pages.

Moderator (LG Electronics), Summary #2 of PDSCH/PUSCH enhancements (Scheduling/HARQ), 3GPP TSG RAN WG1 #107bis-e, R1-2200744, Jan. 2022, 99 pages.

* cited by examiner

METHOD AND APPARATUS FOR UL TRANSMIT BEAM AND SRS RESOURCE ALIGNMENT

CROSS-REFERENCE TO RELATED APPLICATION AND CLAIM OF PRIORITY

This application claims priority under 35 U.S.C. § 119(e) to U.S. Provisional Patent Application No. 63/320,102 filed on Mar. 15, 2022, and U.S. Provisional Patent Application No. 63/322,976 filed on Mar. 23, 2022. The above-identified provisional patent applications are hereby incorporated by reference in their entirety.

TECHNICAL FIELD

The present disclosure relates generally to wireless communication systems and, more specifically, to uplink (UL) transmit beam and sounding reference signal (SRS) resource alignment.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to apparatuses and methods for UL transmit beam and SRS resource alignment.

In one embodiment, a user equipment (UE) is provided. The UE includes a transceiver configured to receive a configuration including information about a list of transmission configuration indicator (TCI) states and receive an indication indicating a TCI state from the list of TCI states. The TCI state is associated with a source reference signal (RS) and at least one SRS related information (SRS-Info). The UE further includes a processor operably coupled to the transceiver. The processor, based on the indication, is configured to identify the source RS and the at least one SRS-info associated with the TCI state, determine a beam based on the source RS, and determine at least one port based on the at least one SRS-Info. The transceiver is further configured to transmit an UL transmission using the beam and the at least one port.

In another embodiment, a base station (BS) is provided. The BS includes a transceiver configured to transmit a configuration including information about a list of TCI states and transmit an indication indicating a TCI state from the list of TCI states. The TCI state is associated with a source RS and at least one SRS-Info. The source RS indicates a beam. The at least one SRS-Info indicates at least one port. The transceiver is further configured to receive an UL transmission associated with the beam and the at least one port.

In yet another embodiment, a method performed by a UE is provided. The method includes receiving a configuration including information about a list of TCI states and receiving an indication indicating a TCI state from the list of TCI states. The TCI state is associated with a source RS and at least one SRS-Info. The method further includes identifying the source RS and the at least one SRS-info associated with the TCI state; determining a beam based on the source RS; determining at least one port based on the at least one SRS-Info; and transmitting an UL transmission using the beam and the at least one port.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
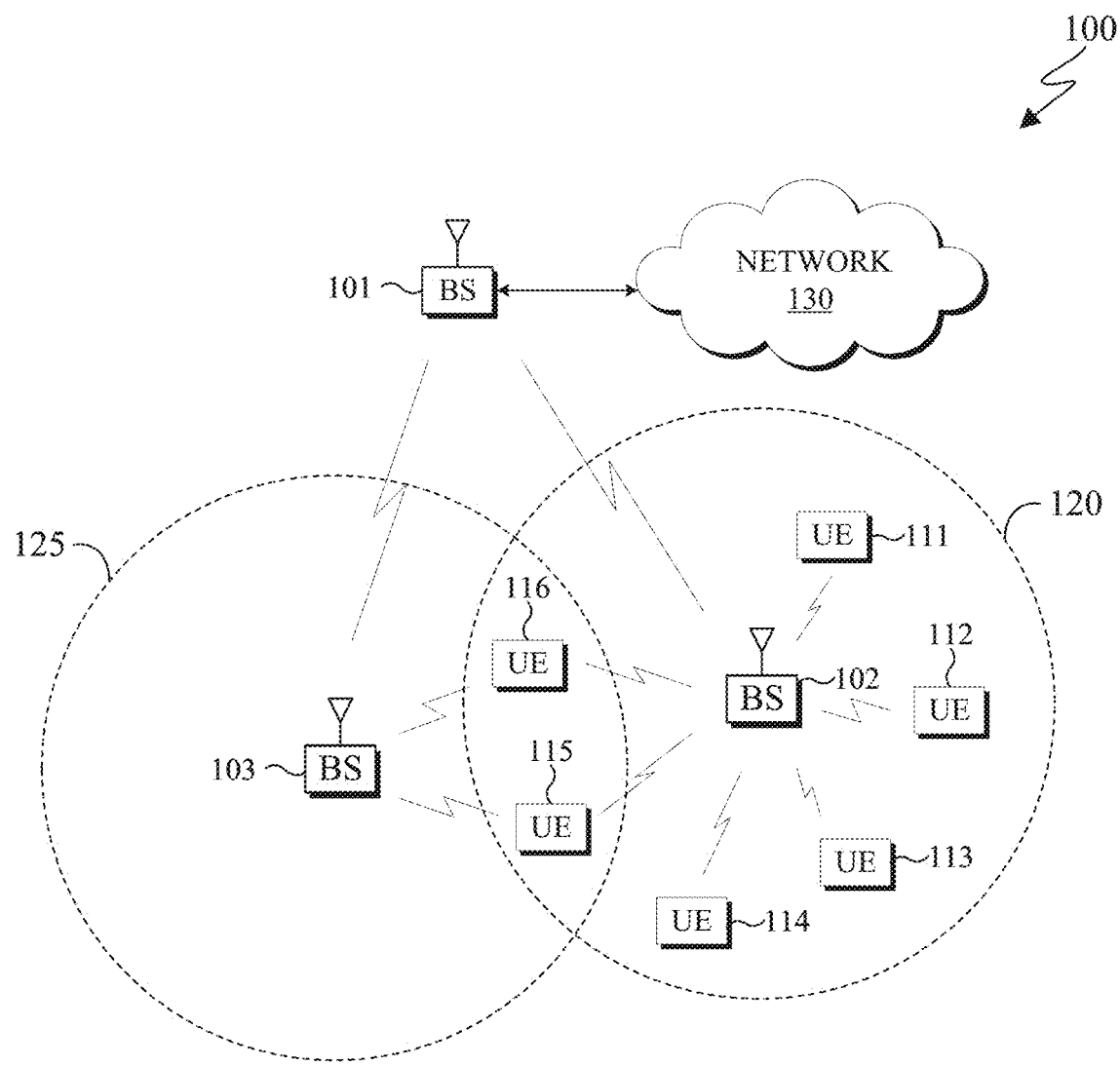
FIG. 1 illustrates an example wireless network according to embodiments of the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents and standards descriptions are hereby incorporated by reference into the present disclosure as if fully set forth herein: 3GPP TS 36.211 v17.0.0, "E-UTRA, Physical channels and modulation" (herein "REF 1"); 3GPP TS 36.212 v17.0.0, "E-UTRA, Multiplexing and Channel coding" (herein "REF 2"); 3GPP TS 36.213 v17.0.0, "E-UTRA, Physical Layer Procedures" (herein "REF 3"); 3GPP TS 36.321 v17.0.0, "E-UTRA, Medium Access Control (MAC) protocol specification" (herein "REF 4"); 3GPP TS 36.331 v17.0.0, "E-UTRA, Radio Resource Control (RRC) protocol specification" (herein "REF 5"); 3GPP TS 38.211 v17.0.0, "NR, Physical Channels and Modulation" (herein "REF 6"); 3GPP TS 38.212 v17.0.0, "NR, Multiplexing and channel coding" (herein "REF 7"); 3GPP TS 38.213 v17.0.0, "NR, Physical Layer Procedures for Control" (herein "REF 8"); 3GPP TS 38.214 v17.0.0; "NR, Physical Layer Procedures for Data" (herein "REF 9"); 3GPP TS 38.215 v17.0.0; "NR, Physical Layer Measurements" (herein "REF 10"); 3GPP TS 38.321 v17.0.0; "NR, Medium Access Control (MAC) Protocol Specification" (herein "REF 11"); and 3GPP TS 38.331 v17.0.0; "NR, Radio Resource Control (RRC) Protocol Specification" (herein "REF 12").

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
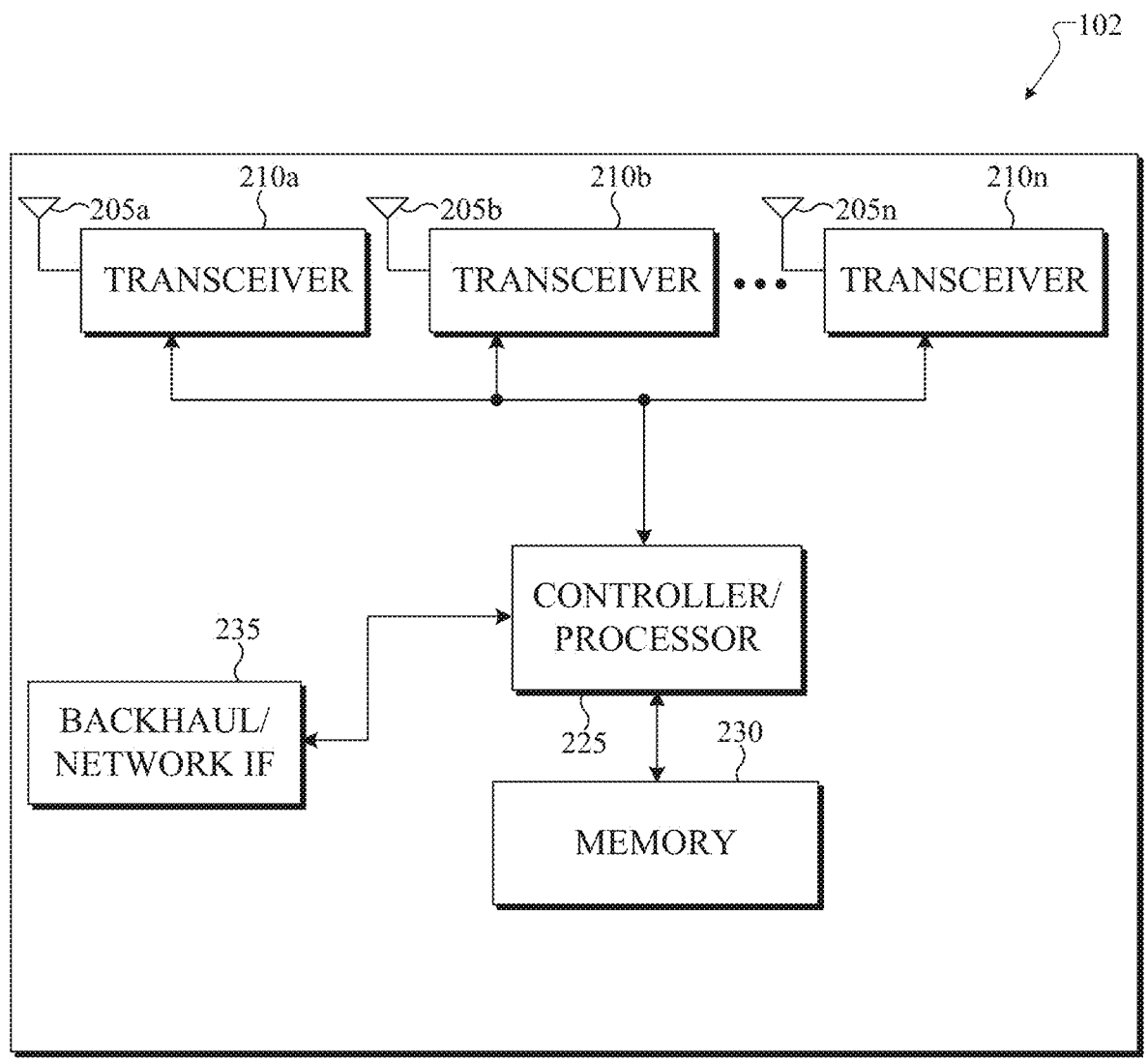
FIG. 2 illustrates an example gNodeB (gNB) according to embodiments of the present disclosure.
Figure 3:
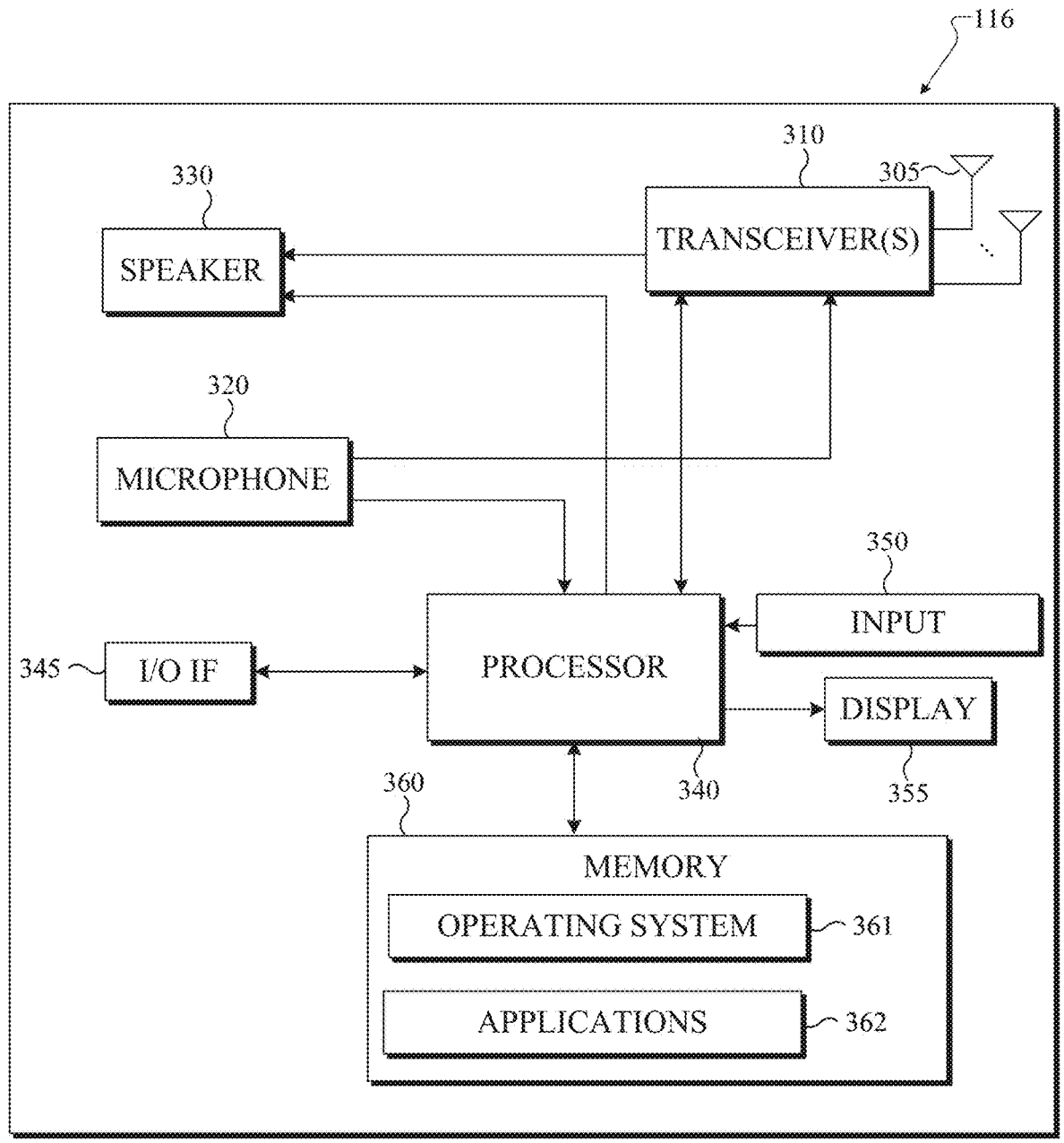
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for supporting UL transmit beam and SRS resource alignment. In certain embodiments, one or more of the BSs 101-103 include circuitry, programing, or a combination thereof for supporting UL transmit beam and SRS resource alignment.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods for enabling UL transmit beam and SRS resource alignment. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for supporting UL transmit beam and SRS resource selection. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH)—see also REF 3. An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH (see also REF 3).

An UL subframe includes two slots. Each slot includes $N_{symb}^{UL}$ symbols for transmitting data information, UCI, DMRS, or SRS. A frequency resource unit of an UL system BW is an RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 4:
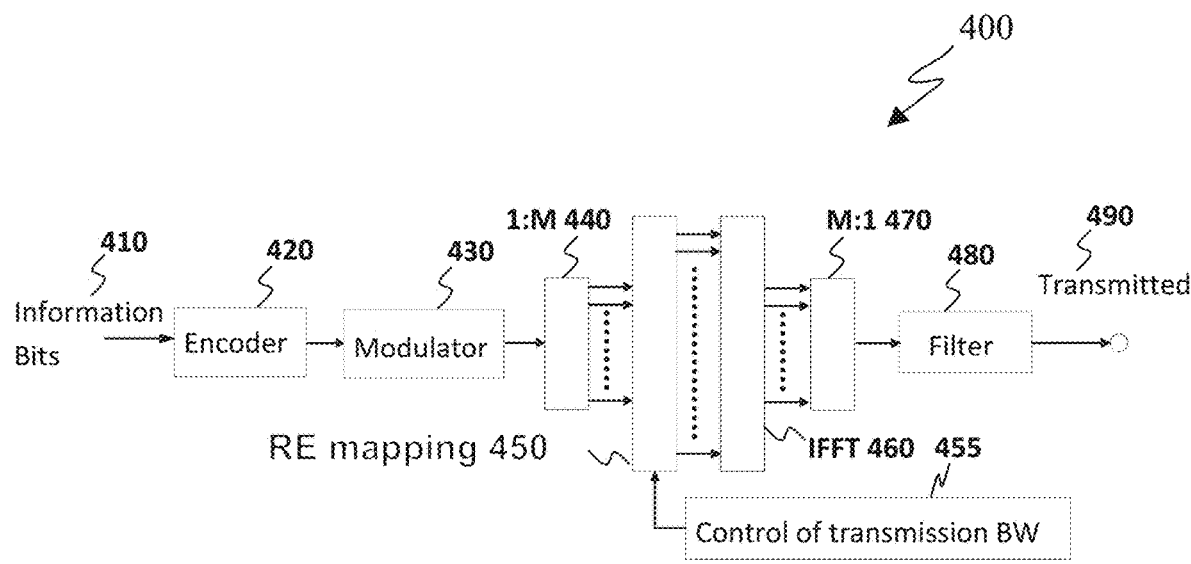
FIG. 4 illustrates a transmitter block diagram for a physical downlink shared channel (PDSCH) in a subframe according to embodiments of the present disclosure.

FIG. 4 illustrates a transmitter block diagram 400 for a PDSCH in a subframe (or slot) according to embodiments of the present disclosure. The embodiment of the transmitter block diagram 400 illustrated in FIG. 4 is for illustration only. One or more of the components illustrated in FIG. 4 can be implemented in specialized circuitry configured to perform the noted functions or one or more of the components can be implemented by one or more processors executing instructions to perform the noted functions. FIG. 4 does not limit the scope of this disclosure to any particular implementation of the transmitter block diagram 400.

As shown in FIG. 4, information bits 410 are encoded by encoder 420, such as a turbo encoder, and modulated by modulator 430, for example using quadrature phase shift keying (QPSK) modulation. A serial to parallel (S/P) converter 440 generates M modulation symbols that are subsequently provided to a mapper 450 to be mapped to REs selected by a transmission BW selection unit 455 for an assigned PDSCH transmission BW, unit 460 applies an Inverse fast Fourier transform (IFFT), the output is then serialized by a parallel to serial (P/S) converter 470 to create a time domain signal, filtering is applied by filter 480, and a signal transmitted 490. Additional functionalities, such as data scrambling, cyclic prefix insertion, time windowing, interleaving, and others are well known in the art and are not shown for brevity.

Figure 5:
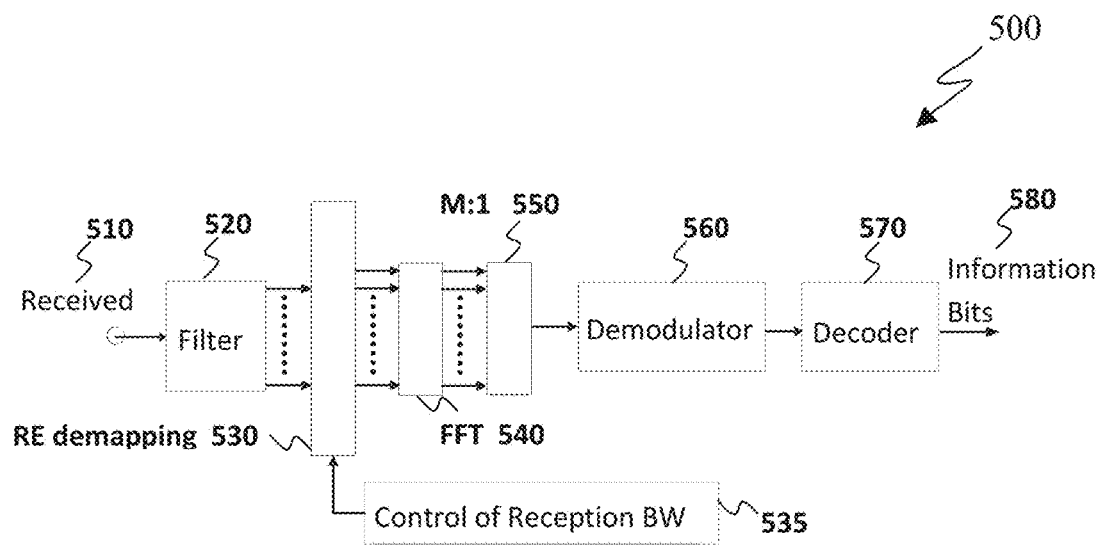
FIG. 5 illustrates a receiver block diagram for a PDSCH in a subframe according to embodiments of the present disclosure.

FIG. 5 illustrates a receiver block diagram 500 for a PDSCH in a subframe (or slot) according to embodiments of the present disclosure. The embodiment of the diagram 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the diagram 500.

As shown in FIG. 5, a received signal 510 is filtered by filter 520, the signals are then provided to a RE demapper 530 to demap REs for an assigned reception BW selected by BW selector 535, unit 540 applies a fast Fourier transform (FFT), and an output is serialized by a parallel-to-serial converter 550. Subsequently, a demodulator 560 coherently demodulates data symbols by applying a channel estimate obtained from a DMRS or a CRS (not shown), and a decoder 570, such as a turbo decoder, decodes the demodulated data to provide an estimate of the information data bits 580. Additional functionalities such as time-windowing, cyclic prefix removal, de-scrambling, channel estimation, and de-interleaving are not shown for brevity.

Figure 6:
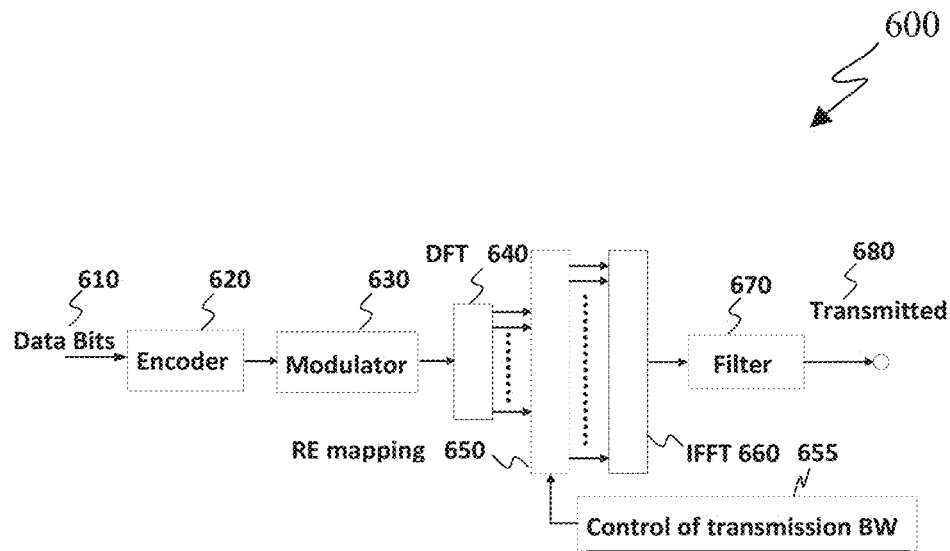
FIG. 6 illustrates a transmitter block diagram for a physical uplink shared channel (PUSCH) in a subframe according to embodiments of the present disclosure.

FIG. 6 illustrates a transmitter block diagram 600 for a PUSCH in a subframe (or slot) according to embodiments of the present disclosure. The embodiment of the block diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the block diagram 600.

As shown in FIG. 6, information data bits 610 are encoded by encoder 620, such as a turbo encoder, and modulated by modulator 630. A discrete Fourier transform (DFT) unit 640 applies a DFT on the modulated data bits, RE mapper 650 maps REs corresponding to an assigned PUSCH transmission BW selected by transmission BW selection unit 655, unit 660 applies an IFFT and, after a cyclic prefix insertion (not shown), filtering is applied by filter 670 and a signal transmitted 680.

Figure 7:
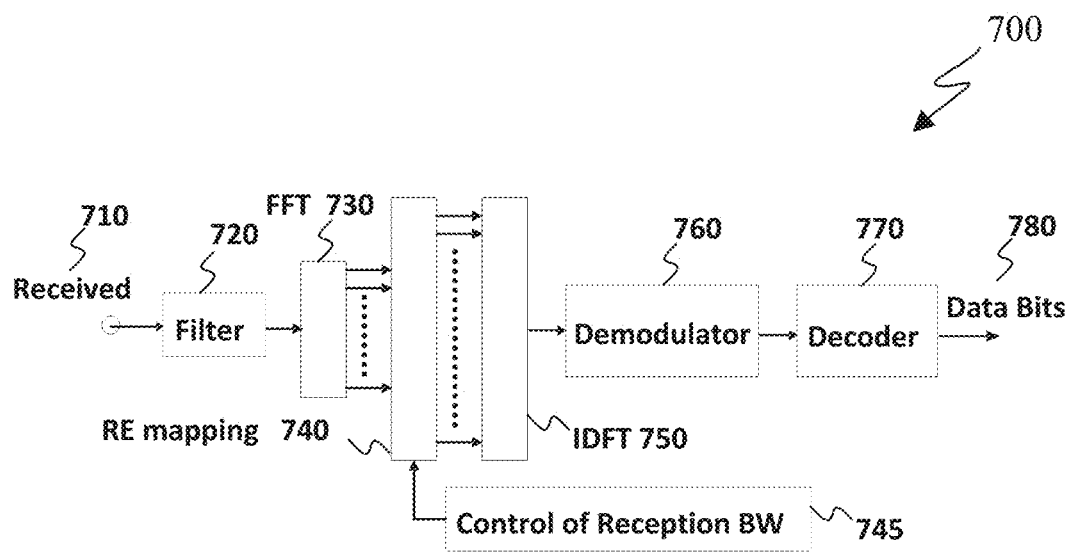
FIG. 7 illustrates a receiver block diagram for a PUSCH in a subframe according to embodiments of the present disclosure.

FIG. 7 illustrates a receiver block diagram 700 for a PUSCH in a subframe (or slot) according to embodiments of the present disclosure. The embodiment of the block diagram 700 illustrated in FIG. 7 is for illustration only. One or more of the components illustrated in FIG. 7 can be implemented in specialized circuitry configured to perform the noted functions or one or more of the components can be implemented by one or more processors executing instructions to perform the noted functions. FIG. 7 does not limit the scope of this disclosure to any particular implementation of the block diagram 700.

As shown in FIG. 7, a received signal 710 is filtered by filter 720. Subsequently, after a cyclic prefix is removed (not shown), unit 730 applies an FFT, RE demapper 740 demaps REs corresponding to an assigned PUSCH reception BW selected by a reception BW selector 745, unit 750 applies an inverse DFT (IDFT), a demodulator 760 coherently demodulates data symbols by applying a channel estimate obtained from a DMRS (not shown), a decoder 770, such as a turbo decoder, decodes the demodulated data to provide an estimate of the information data bits 780.

In next generation cellular systems, various use cases are envisioned beyond the capabilities of LTE system. Termed 5G or the fifth-generation cellular system, a system capable of operating at sub-6 GHz and above-6 GHz (for example, in mmWave regime) becomes one of the requirements. In 3GPP TR 22.891 (REF 6), 74 5G use cases have been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per km$^2$ with less stringent the reliability, data rate, and latency requirements.

The 3GPP NR specification supports up to 32 CSI-RS antenna ports which enable a gNB to be equipped with a large number of antenna elements (such as 64 or 128). In this case, a plurality of antenna elements is mapped onto one CSI-RS port.

Figure 8:
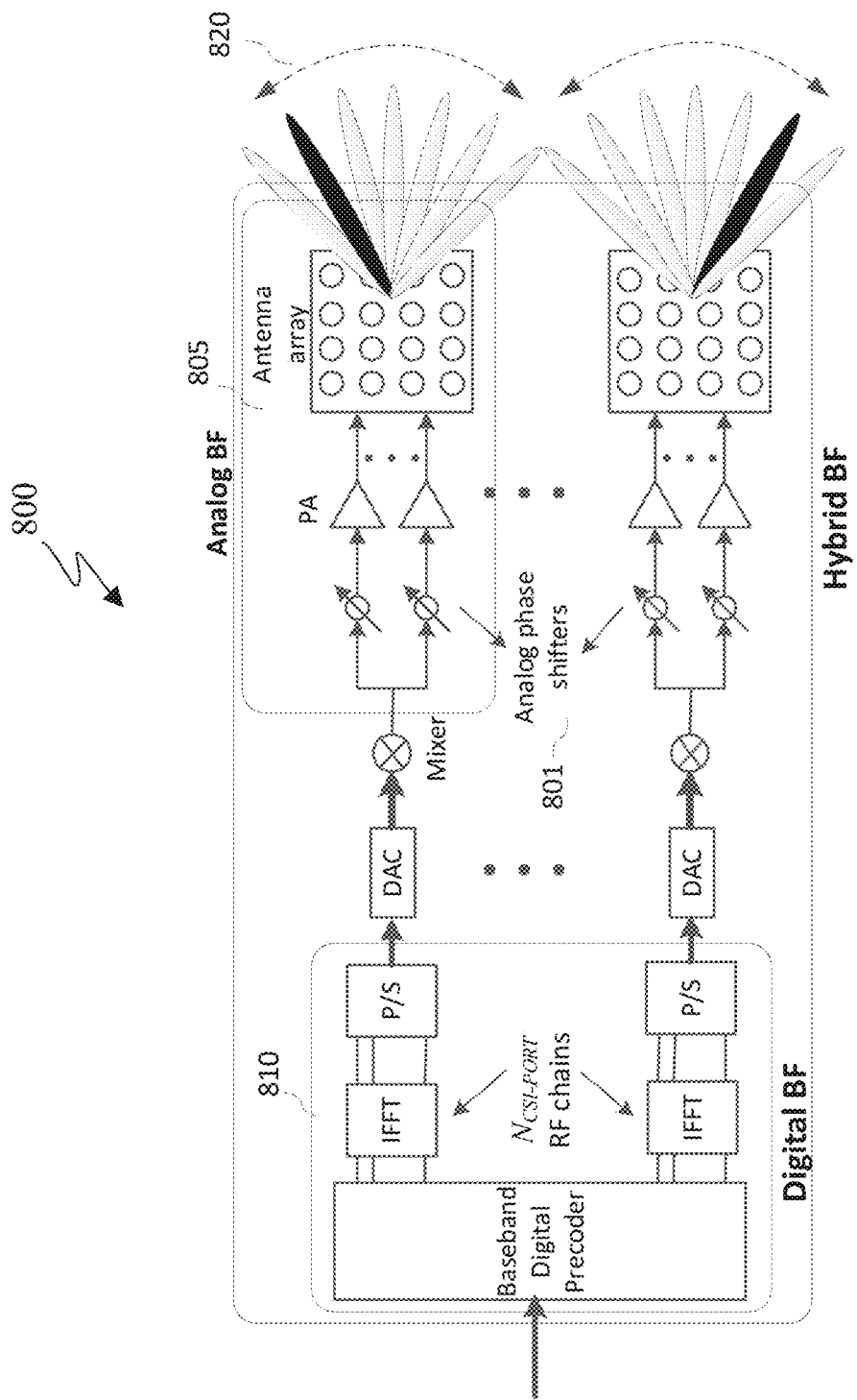
FIG. 8 illustrates an example antenna blocks or arrays forming beams according to embodiments of the present disclosure.

FIG. 8 illustrates an example antenna blocks or arrays 800 according to embodiments of the present disclosure. The embodiment of the antenna blocks or arrays 800 illustrated in FIG. 8 is for illustration only. FIG. 8 does not limit the scope of this disclosure to any particular implementation of the antenna blocks or arrays.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 8. In this case, one CSI-RS port is mapped onto a large number of antenna elements which can be controlled by a bank of analog phase shifters 801. One CSI-RS port can then correspond to one sub-array which produces a narrow analog beam through analog beamforming 805. This analog beam can be configured to sweep across a wider range of angles 820 by varying the phase shifter bank across symbols or subframes. The number of sub-arrays (equal to the number of RF chains) is the same as the number of CSI-RS ports $N_{CSI-PORT}$. A digital beamforming unit 810 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as >52.6 GHz (also termed the FR4). In this case, the system can employ only analog beams. Due to the O2 absorption loss around 60 GHz frequency (~10 dB additional loss @100 m distance), larger number of and sharper analog beams (hence larger number of radiators in the array) will be needed to compensate for the additional path loss.

Various embodiments of the present disclosure recognize that in Rel.15 NR, multi-beam operation is designed primarily for single transmit-receive point (TRP) and single antenna panel. Therefore, the specification supports beam indication for one TX beam wherein a TX beam is associated with a reference RS. For DL beam indication and measurement, the reference RS can be NZP (non-zero power) CSI-RS and/or SSB (synchronization signal block, which includes primary synchronization signal, secondary synchronization signal, and PBCH). Here, DL beam indication is done via the transmission configuration indicator (TCI) field in DL-related DCI which includes an index to one (and only one) assigned reference RS. A set of hypotheses or the so-called TCI states is configured via higher-layer (RRC) signaling and, when applicable, a subset of those TCI states is selected/activated via MAC CE for the TCI field code points. For UL beam indication and measurement, the reference RS can be NZP CSI-RS, SSB, and/or SRS. Here, UL beam indication is done via the SRS resource indicator (SRI) field in UL-related DCI which is linked to one (and only one) reference RS. This linkage is configured via higher-layer signaling using the SpatialRelationInfo RRC parameter. Essentially, only one TX beam is indicated to the UE.

In one example pertinent to Rel.15/16 NR, beam management was designed to share the same framework as CSI acquisition. This, however, compromises the performance of beam management especially for FR2. This is because beam management operates mainly with analog beams (characteristic of FR2) which paradigmatically differ from CSI acquisition (designed with FR1 in mind). Consequently, Rel.15/16 beam management becomes cumbersome and is unlikely able to keep up with more aggressive use cases which require large number of beams and fast beam switching (e.g., higher frequency bands, high mobility, and/or larger number of narrower analog beams). In addition, Rel.15/16 was designed to accommodate a number of unknown or rudimentary capabilities (e.g., UEs not capable of beam correspondence). To be flexible, it results in a number of options. This becomes burdensome to L1 control signaling and therefore a number of reconfigurations are performed via RRC signaling (higher-layer configuration). While this avoids L1 control overhead, it either results in high latency (if reconfiguration is performed sparsely) or imposes high usage of PDSCH (since RRC signaling consumes PDSCH resources).

In one example pertinent to Rel.15/16 NR, when beam correspondence is utilized, UL beam selection can be performed via measuring DL RS (CSI-RS and/or SSB) and CRI reporting accompanied with corresponding beam metrics (e.g., RSRP, SINR). That is, based on the CRI/RSRP or CRI/SINR reporting from the UE, the network (NW) can assume that the UE performs UL transmission on PUSCH with the UL TX beam associated with one of the latest CRI reports (especially the one with the highest RSRP or/SINR). Likewise, the UE can assume that the NW knows about this UE selection. Therefore, there is no need for a separate UL beam indication (e.g., via SRI field or UL-TCI field in the respective UL grant).

In Rel.15/16 NR, when beam correspondence is not utilized, UL beam selection can be performed via the NW selecting the UL TX beam and indicating it to the UE via the UL grant (signaled via SRI field or UL-TCI field—essentially indicating the UL TCI state associated with the UL TX beam). This selection is enabled by measuring the SRS transmitted from the UE (configured by the NW).

In either case, when an event that results in the UE having to select an (alternate) UL TX beam or UL antenna panel(s) different from what the NW expects, some additional mechanisms are needed to ensure that (a) the UE has the alternate UL TX beam or antenna panel(s) available when the UE detects such an event and the next UL TX beam indication can only in a later time slot, and (b) the NW is aware of the UE decision. A few examples of such an event are as follows.

In one example, such as event can happen due to the Maximum Permissible Exposure (MPE) regulation, especially in North America, that restricts the UE transmission power in certain directions. That is, to prevent any excessive electromagnetic wave exposure on delicate soft tissues (e.g., brain tissues), the UE is to avoid transmitting high energy signal along some directions (e.g., toward the head). Unfortunately, such directions may correspond to the "best" UL TX beams (e.g., associated with the CRI of the highest reported RSRP/SINR, or associated with the SRS resource yielding the best measured SINR at the NW). When the "best" UL TX beams are not used for UL transmission, some loss of UL throughput (especially coverage) will occur.

In another example, such an event can happen due to hardware (HW) limitation at a UE equipped with multiple antenna panels, and in response to the event, the UE needs to select/switch antenna panel for UL transmission.

In yet another example, such an event can happen due to potential beam failure, and to avoid beam failure, the UE needs to select/switch antenna panel for UL transmission.

In yet another example, such an event can happen due to sudden change in channel conditions (e.g., due to high speed, antenna/panel blockage etc.) which may result in beam failure, and the UE needs to switch/change TX beam in order to continue UL transmission without interruptions/failures or having to wait for the next UL TX beam update/indication.

Various embodiments of the present disclosure recognize that there is a need for efficient designs for enabling UL TX beam and/or antenna panel selection in order to avoid outage (or beam failure), loss in UL throughput, loss in UL coverage, and issues related to HW, that may happen due to the events mentioned above. Accordingly, various embodiments of the present disclosure provide beam measurement and reporting in a beam-formed system. In various embodiments, SRS resource indication for a UE with multiple panels to facilitate panel selection is provided. In various embodiments, implicit ACK based on SRI indication in response to the UE reporting an information regarding the UL panel selection is provided. In various embodiments, details on SRI indication (payload, additional signaling) is provided. Embodiments disclosed provides for enabling UL TX beam and/or antenna panel selection and avoid beam failure.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), this invention can be extended to other OFDM-based transmission waveforms or multiple access schemes such as filtered OFDM (F-OFDM).

The present disclosure covers several components which can be used in conjunction or in combination with one another, or can operate as standalone schemes.

In the present disclosure, the term "activation" describes an operation wherein a UE receives and decodes a signal from the network (or gNB) that signifies a starting point in time. The starting point can be a present or a future slot/subframe or symbol—the exact location either implicitly or explicitly indicated, or otherwise fixed or higher-layer configured. Upon successfully decoding the signal, the UE responds accordingly. The term "deactivation" describes an operation wherein a UE receives and decodes a signal from the network (or gNB) that signifies a stopping point in time. The stopping point can be a present or a future slot/subframe or symbol—the exact location either implicitly or explicitly indicated, or otherwise fixed or higher-layer configured. Upon successfully decoding the signal, the UE responds accordingly.

Terminology such as TCI, TCI states, SpatialRelationInfo, target RS, reference RS, and other terms is used for illustrative purposes and therefore not normative. Other terms that refer to the same functions can also be used.

A "reference RS" corresponds to a set of characteristics of DL or UL TX beam, such as direction, precoding/beamforming, number of ports, etc. For instance, as the UE receives a reference RS index/ID in a DL assigned represented by a TCI state, the UE applies the known characteristics of the reference RS to the assigned DL transmission. The reference RS can be received and measured by the UE (in this case, the reference RS is a downlink signal such as NZP CSI-RS and/or SSB) with the result of the measurement used for calculating a beam report (in Rel.15 NR, at least one L1-RSRP accompanied by at least one CRI). As the NW/gNB receives the beam report, the NW can be better equipped with information to assign a particular DL TX beam to the UE. Optionally, the reference RS can be transmitted by the UE (in this case, the reference RS is a uplink signal such as SRS). As the NW/gNB receives the reference RS, the NW/gNB can measure and calculate the needed information to assign a particular DL TX beam to the UE. This option is applicable when DL-UL beam pair correspondence holds.

The reference RS can be dynamically triggered by the NW/gNB (e.g., via DCI in case of aperiodic RS), preconfigured with a certain time-domain behavior (such as periodicity and offset, in case of periodic RS), or a combination of such pre-configuration and activation/deactivation (in case of semi-persistent RS).

There are two types of frequency range (FR) defined in 3GPP NR specifications. The sub-6 GHz range is called frequency range 1 (FR1) and millimeter wave range is called frequency range 2 (FR2). An example of the frequency range for FR1 and FR2 is shown below.

| Frequency range designation | Corresponding frequency range |
|---|---|
| FR1 | 450 MHz-6000 MHz |
| FR2 | 24250 MHz-52600 MHz |

The following embodiment is an example of DL multi-beam operation that utilizes DL beam indication after the network (NW) receives some transmission from the UE. In the first example embodiment, aperiodic CSI-RS is transmitted by the NW and measured by the UE. Although aperiodic RS is used in these two examples, periodic or semi-persistent RS can also be used.

For mmWave (or FR2) or higher frequency bands (such as >52.6 GHz or FR4) where multi-beam operation is especially relevant, transmission-reception process includes the receiver to select a receive (RX) beam for a given TX beam. For UL multi-beam operation, the gNB selects an UL RX beam for every UL TX beam (which corresponds to a reference RS). Therefore, when UL RS (such as SRS and/or DMRS) is used as reference RS, the NW/gNB triggers or configures the UE to transmit the UL RS (which is associated with a selection of UL TX beam). The gNB, upon receiving and measuring the UL RS, selects an UL RX beam. As a result, a TX-RX beam pair is derived. The NW/gNB can perform this operation for all the configured reference RSs (either per reference RS or "beam sweeping") and determine all the TX-RX beam pairs associated with all the reference RSs configured to the UE. On the other hand, when DL RS (such as CSI-RS and/or SSB) is used as reference RS (pertinent when DL-UL beam correspondence or reciprocity holds), the NW/gNB transmit the RS to the UE (for UL and by reciprocity, this corresponds to an UL RX beam). In response, the UE measures the reference RS (and in the process selects an UL TX beam) and reports the beam metric associated with the quality of the reference RS. In this case, the UE determines the TX-RX beam pair for every configured (DL) reference RS. Therefore, although this knowledge is unavailable to the NW/gNB, the UE—upon receiving a reference RS (hence UL RX beam) indication from the NW/gNB—can select the UL TX beam from the knowledge on all the TX-RX beam pairs.

In the present disclosure, the term "Resource Indicator", also abbreviated as REI, is used to refer to an indicator of RS resource used for signal/channel and/or interference measurement. This term is used for illustrative purposes and hence can be substituted with any other term that refers to the same function. Examples of REI include the aforementioned CSI-RS resource indicator (CRI) and SSB resource indicator (SSB-RI). Any other RS can also be used for signal/channel and/or interference measurement such as DMRS.

Figure 9:
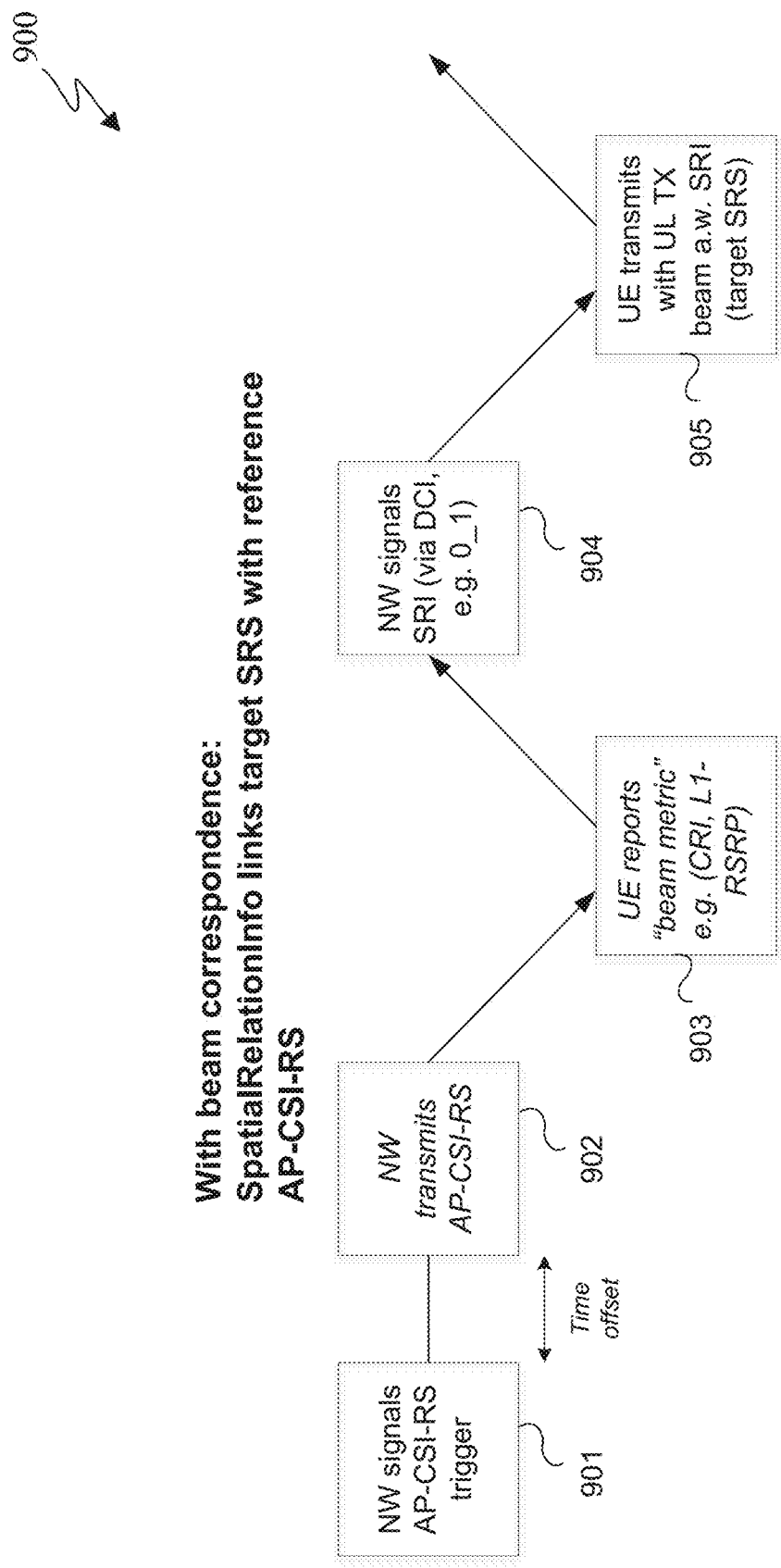
FIG. 9 illustrates an example UL multi-beam operation according to embodiments of the present disclosure.

FIG. 9 illustrates an example UL multi-beam operation 900 according to embodiments of the present disclosure. The embodiment of the UL multi-beam operation 900 illustrated in FIG. 9 is for illustration only. FIG. 9 does not limit the scope of this disclosure to any particular implementation of the UL multi-beam operation 900.

Figure 11:
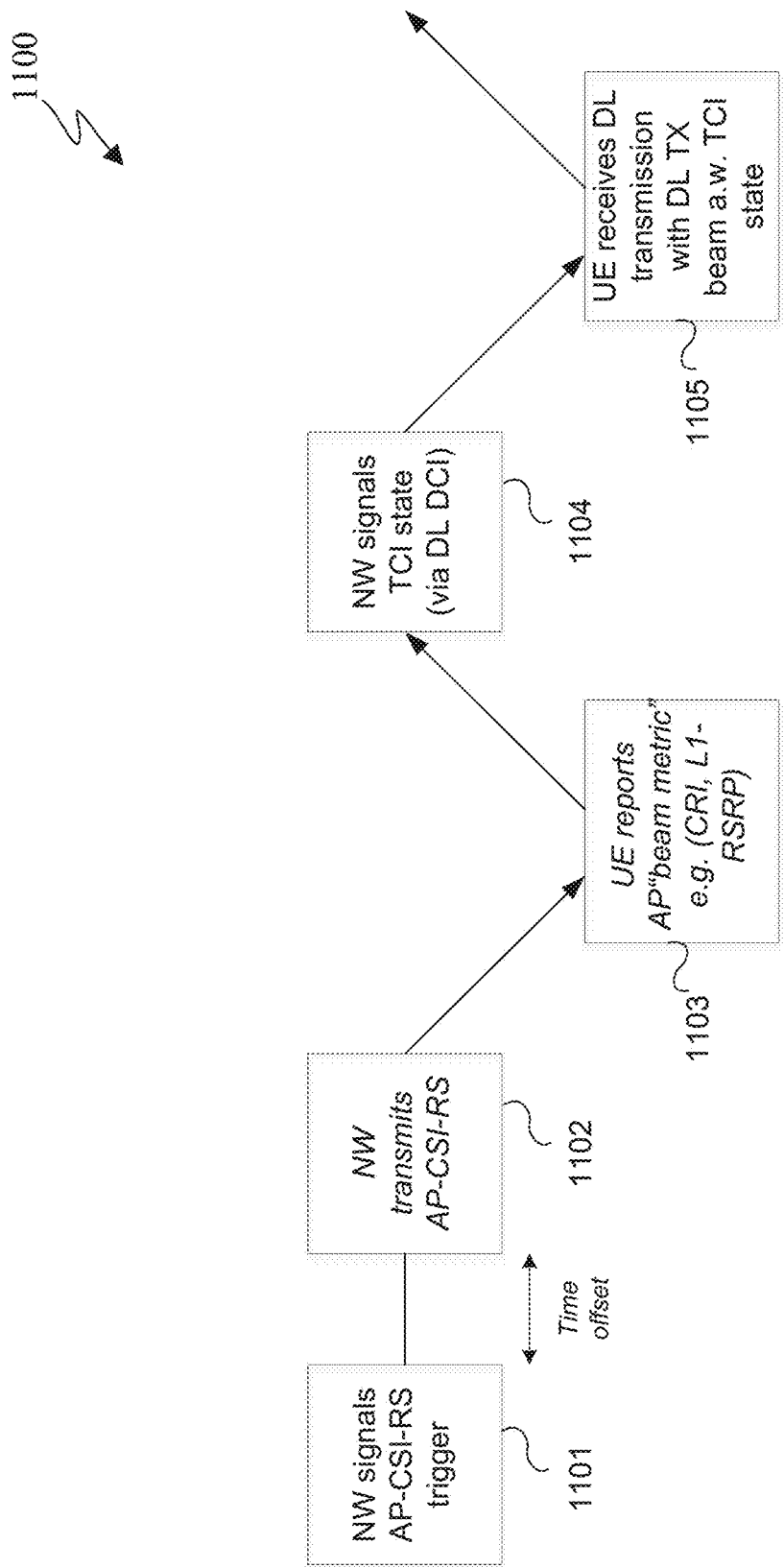
FIG. 11 illustrates an example downlink (DL) multi-beam operation according to embodiments of the present disclosure.

As illustrated in FIG. 11, an UL multi-beam operation 900 starts with the gNB/NW signaling to a UE an aperiodic CSI-RS (AP-CSI-RS) trigger or indication (block 901). This trigger or indication can be included in a DCI (either UL-related or DL-related, either separately or jointly signaled with an aperiodic CSI request/trigger) and indicate transmission of AP-CSI-RS in a same (zero time offset) or later slot/sub-frame (>0 time offset). Upon receiving the AP-CSI-RS transmitted by the gNB/NW (block 902), the UE measures the AP-CSI-RS and, in turn, calculates and reports a "beam metric" (indicating quality of a particular TX beam hypothesis) (block 903). Examples of such beam reporting are CSI-RS resource indicator (CRI) or SSB resource indicator (SSB-RI) coupled with its associated L1-RSRP/L1-RSRQ/L1-SINR/CQI. Upon receiving the beam report from the UE, the NW can use the beam report to select an UL TX beam for the UE and indicate the UL TX beam selection (block 904) using the SRI field in the UL-related DCI (that carries the UL grant, such as DCI format 0_1 in NR). The SRI corresponds to a "target" SRS resource that is linked to a reference RS (in this case, an AP-CSI-RS) via SpatialRelationInfo configuration. Upon successfully decoding the UL-related DCI with the SRI, the UE performs UL transmission (such as data transmission on PUSCH) with the UL TX beam associated with the SRI (block 905).

Figure 10:
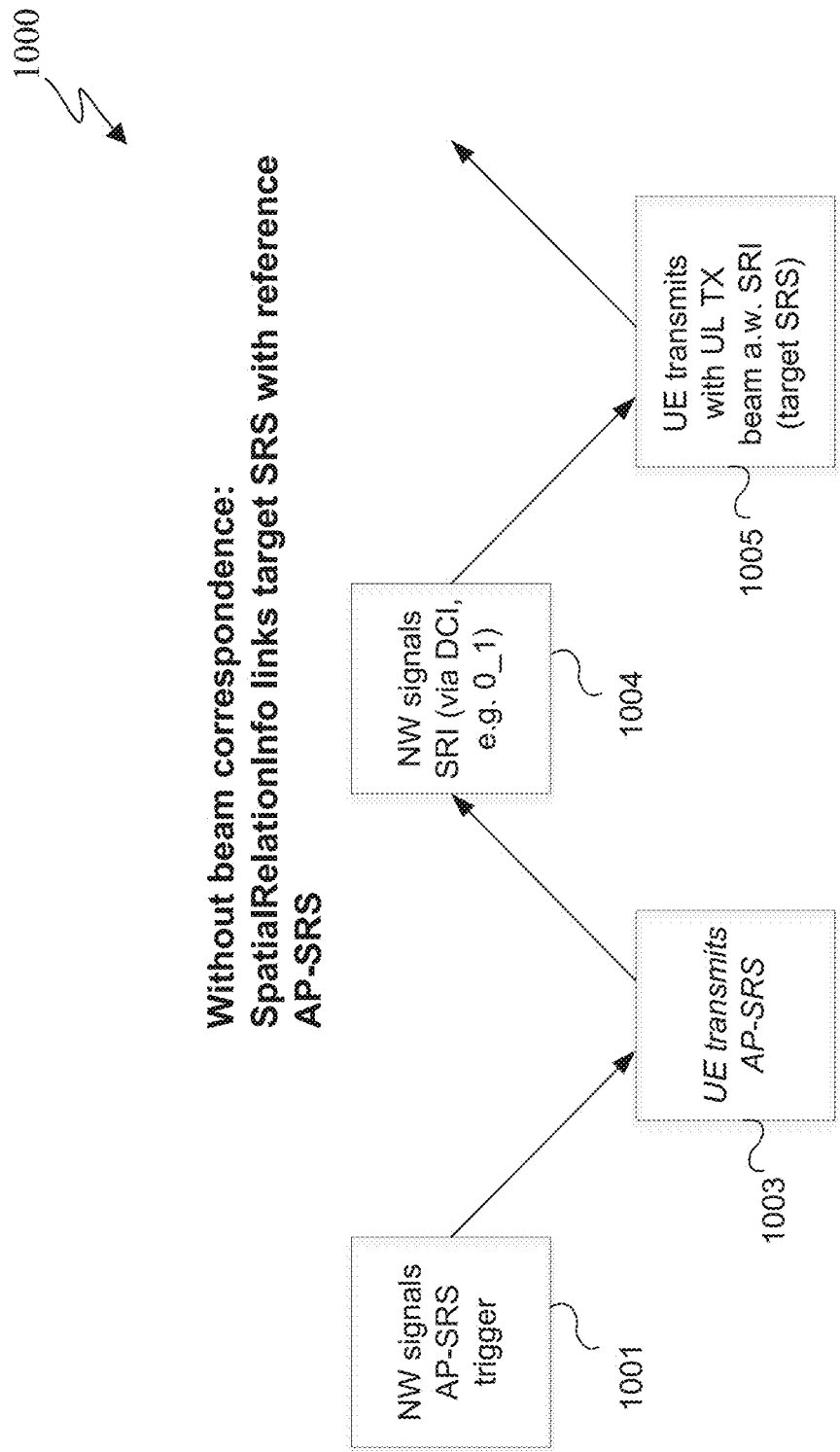
FIG. 10 illustrates an example UL multi-beam operation according to embodiments of the present disclosure.

FIG. 10 illustrates another example UL multi-beam operation 1000 according to embodiments of the present disclosure. The embodiment of the UL multi-beam operation 1000 illustrated in FIG. 10 is for illustration only. FIG. 10 does not limit the scope of this disclosure to any particular implementation of the UL multi-beam operation 1000.

As illustrated in FIG. 10, an UL multi-beam operation 1000 starts with the gNB/NW signaling to a UE an aperiodic SRS (AP-SRS) trigger or request (block 1001). This trigger can be included in a DCI (either UL-related or DL-related). Upon receiving and decoding the AP-SRS trigger (block 1002), the UE transmits AP-SRS to the gNB/NW (block 1003) so that the NW (or gNB) can measure the UL propagation channel and select an UL TX beam for the UE. The gNB/NW can then indicate the UL TX beam selection (block 1004) using the SRI field in the UL-related DCI (that carries the UL grant, such as DCI format 0_1 in NR). The SRI corresponds to a "target" SRS resource that is linked to a reference RS (in this case, an AP-SRS) via SpatialRelationInfo configuration. Upon successfully decoding the UL-related DCI with the SRI, the UE performs UL transmission (such as data transmission on PUSCH) with the UL TX beam associated with the SRI (block 1005).

FIG. 11 illustrates an example DL multi-beam operation 1100 according to embodiments of the present disclosure.

The embodiment of the DL multi-beam operation 1300 illustrated in FIG. 11 is for illustration only. FIG. 11 does not limit the scope of this disclosure to any particular implementation of the DL multi-beam operation 1100.

As illustrated in FIG. 11, wherein a UE is configured for measuring/receiving aperiodic CSI-RS (AP-CSI-RS) and reporting aperiodic CSI (AP CSI), a DL multi-beam operation 1100 starts with the gNB/NW signaling to a UE an aperiodic CSI-RS (AP-CSI-RS) trigger or indication (block 1101). This trigger or indication can be included in a DCI (either UL-related or DL-related, either separately or jointly signaled with an aperiodic CSI request/trigger) and indicate transmission of AP-CSI-RS in a same (zero time offset) or later slot/sub-frame (>0 time offset). Upon receiving the AP-CSI-RS transmitted by the gNB/NW (block 1102), the UE measures the AP-CSI-RS and, in turn, calculates and reports a "beam metric" (included in the CSI, indicating quality of a particular TX beam hypothesis) (block 1103). Examples of such beam reporting (supported in Rel.15/16 NR) are CSI-RS resource indicator (CRI) or SSB resource indicator (SSB-RI) coupled with its associated L1-RSRP and/or L1-SINR. Upon receiving the beam report from the UE, the NW/gNB can use the beam report to select a DL TX beam for the UE and indicate the DL TX beam selection (block 1104) using the TCI field in the DL-related DCI (that carries the DL assignment, such as DCI format 1_1 in NR). The TCI state corresponds to a reference RS (in this case, an AP-CSI-RS) defined/configured via the TCI state definition (higher-layer/RRC configured, from which a subset is activated via MAC CE for the DCI-based selection). Upon successfully decoding the DL-related DCI with the TCI field, the UE performs DL reception (such as data transmission on PDSCH) with the DL TX beam associated with the TCI field (block 1105). In this example embodiment, only one DL TX beam is indicated to the UE.

In the above two example embodiments, only one UL TX beam is indicated to the UE. Extension for multi panel UEs can be found in U.S. patent application Ser. No. 16/570,693 filed on Sep. 13, 2019, which is incorporated herein by reference in its entirety.

Figure 12:
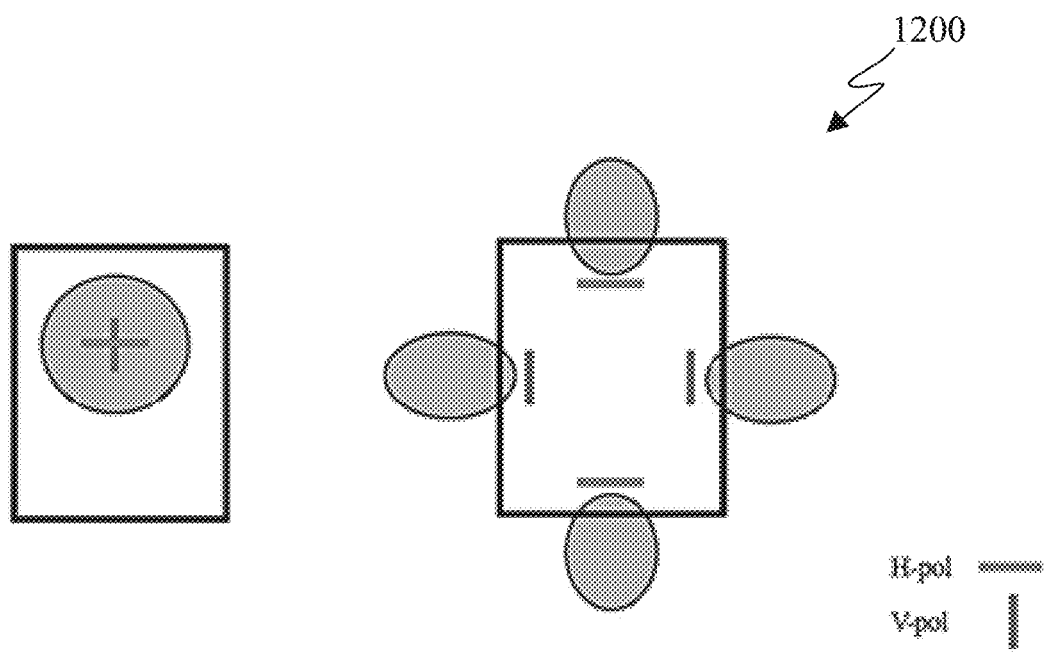
FIG. 12 illustrates an example antenna panel according to embodiments of the present disclosure.

The SRI used in the embodiments illustrated in FIGS. 11 and 12 can also be replaced with UL-TCI wherein an UL-TCI field can be introduced in the pertinent UL-related DCI(s), either in place of or in addition to the SRI field in Rel.15/16.

The aperiodic CSI-RS (along with the associated aperiodic reporting) illustrated in FIG. 9 and the aperiodic SRS illustrated in FIG. 10 can be substituted with that of another time-domain behavior such as semi-persistent (SP) or periodic (P).

In any of the embodiments or sub-embodiments or examples below, a flowchart is used for illustrative purposes. The present disclosure covers any possible variation of the flowchart as long as at least some of the components are included. Such components include the UL TX beam indication indicating multiple UL TX beams and the event-dependent UL TX beam switch from the indicated multiple UL TX beams.

In the rest of the disclosure, the term "beam", can be associated with a spatial transmission/reception of a resource signal (RS) from a "port", "antenna port", or "virtual antenna/port". Likewise, the term "transmit (TX) beam", can be associated with a spatial transmission of a resource signal (RS) or a channel from a "port", "antenna port", or "virtual antenna/port"; and the term "receive (RX) beam", can be associated with a spatial reception of a resource signal (RS) or a channel from a "port", "antenna port", or "virtual antenna/port". The spatial transmission/reception of a beam can be in a three-dimension (3D) space. In a beam-formed wireless system, the transmission and reception of wireless signal can be via multiple TX and multiple RX beams.

In NR, the UL transmission is configured to be either codebook-based or non-codebook-based via higher layer parameter txConfig in PUSCH-Config set to either 'codebook' or 'nonCodebook.'

According to Section 6.1.1.1 of REF9, the following is supported for codebook based UL transmission.

For codebook based transmission, the UE determines its codebook subsets based on TPMI and upon the reception of higher layer parameter ULCodebookSubset or codebookSubset in PUSCH-Config which may be configured with 'fullAndPartialAndNonCoherent', or 'partialAndNonCoherent', or 'nonCoherent' depending on the UE capability. The maximum transmission rank may be configured by the higher parameter ULmaxRank or maxRank in PUSCH-Config.

A UE reporting its UE capability of 'partialAndNonCoherent' transmission shall not expect to be configured by ULCodebookSubset with 'fullAndPartialAndNonCoherent'.

A UE reporting its UE capability of 'Non-Coherent' transmission shall not expect to be configured by ULCodebookSubset with 'fullAndPartialAndNonCoherent' or with 'partialAndNonCoherent'.

A UE shall not expect to be configured with the higher layer parameter ULCodebookSubset set to 'partialAndNonCoherent' when two antenna ports are configured.

In the present disclosure, 'fullAndPartialAndNonCoherent', 'partialAndNonCoherent', and 'Non-Coherent' are referred to as the three examples of coherence type/capability, where the term 'coherence' implies a subset of antenna ports at the UE that can be used to transmit a layer coherently, or that comprises an antenna panel.

FIG. 12 illustrates an example antenna panel 1200 according to embodiments of the present disclosure. The embodiment of the antenna panel 1200 illustrated in FIG. 12 is for illustration only. FIG. 12 does not limit the scope of this disclosure to any particular implementation of antenna panel 1200.

Figure 13:
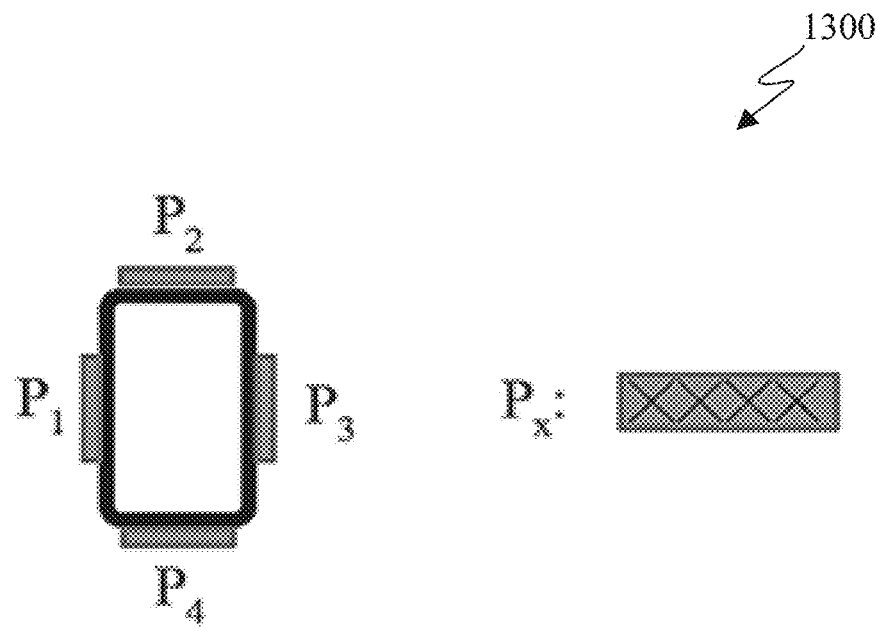
FIG. 13 illustrates another example antenna panel according to embodiments of the present disclosure.

FIG. 13 illustrates another example antenna panel 1300 according to embodiments of the present disclosure. The embodiment of the antenna panel 1300 illustrated in FIG. 13 is for illustration only. FIG. 13 does not limit the scope of this disclosure to any particular implementation of antenna panel 1300.

The term 'antenna panel' refers to a group of antenna ports or a group of antenna elements or a subset of antenna ports associated with a resource (e.g., SRS resource, CSI-RS resource, SSB block). Two examples are shown in FIG. 12, the first example (left) has a single panel comprising a dual-polarized (i.e., two) antennae/ports, and the second example has four panels each comprising a single antenna/ports (pointing in four different directions). Another example is shown in FIG. 13 wherein there are four antenna panels (on opposite sides), each comprising four dual-polarized antennae/ports.

In one embodiment, a UE reports via its capability reporting a list of UE capability values (or value set/sets), the UE capability value (or value set/sets) including an information based on the coherence type of its antenna ports (e.g., SRS antenna ports, or PUSCH antenna ports). In one example, the coherence type is one of 'fullAndPartialAndNonCoherent' (FC), 'partialAndNonCoherent' (PC), and 'nonCoherent' (NC) (cf. 6.1.1.1 of TS 38.214).

Figure 14:
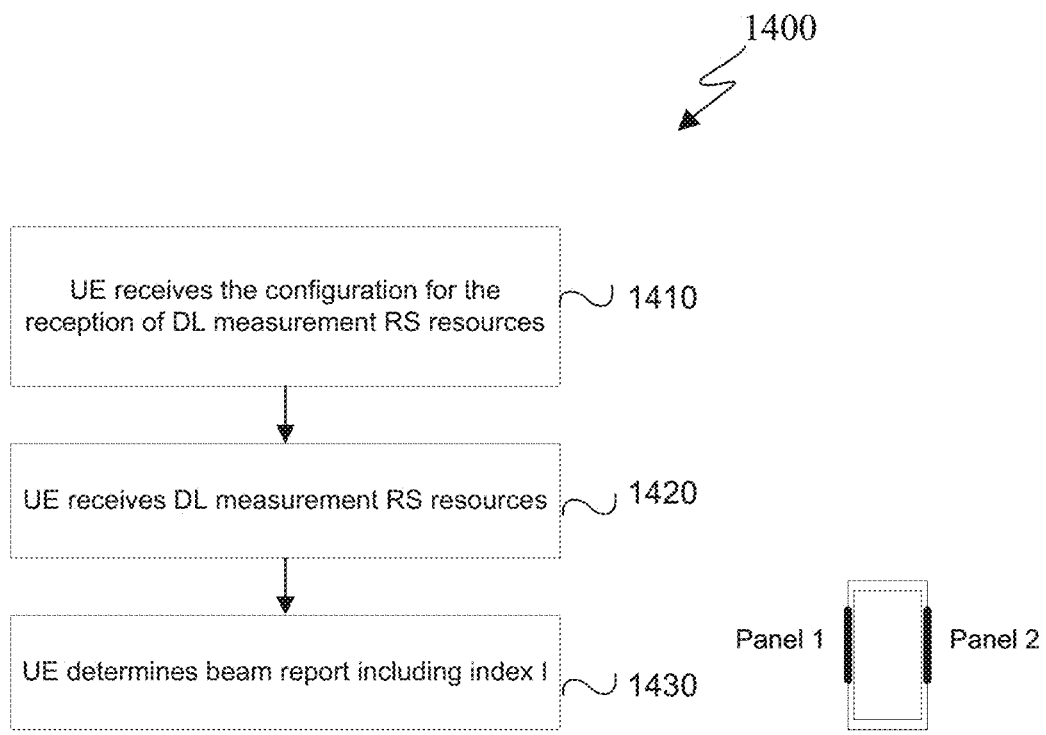
FIG. 14 illustrates a flowchart for a UE determining a beam report according to embodiments of the present disclosure.

FIG. 14 illustrates a flowchart for a UE determining a beam report 1400 according to embodiments of the present disclosure. The embodiment of the UE determining a beam report 1400 illustrated in FIG. 14 is for illustration only. FIG. 14 does not limit the scope of this disclosure to any particular implementation of the UE determining a beam report 1400.

As illustrated in FIG. 14, at block 1410, a UE receives the configuration for the reception of DL measurement resources. At block 1420, the UE is configured to measure (receive) $P_1$ DL measurement RS resources (such as CSI-RS or SSB), where $P_1 \geq 1$. This configuration can be transmitted by the NW/gNB (received by the UE) via higher-layer (RRC) signaling. Optionally, the NW/gNB can signal/update the (sub)set of DL measurement RS resources dynamically via L1 or L2 DL control (PDCCH or MAC CE). These resources are used by the UE and/or the NW/gNB to perform beam measurement along different beams or spatial directions (represented by the beamforming/precoding operation), and potentially using different antenna panels at the UE. The time-domain behavior of the DL measurement RS resources can be configured as aperiodic (AP), semi-persistent (SP), or periodic (P). In one example, each of the $P_1$ DL measurement RS resources is a one port resource. In one example, each of the $P_1$ DL measurement RS resources is a one or two port resource. In one example, the DL measurement RS resources include the path-loss (PL) RS resources. In one example, the DL measurement RS resources include (NZP) CSI-RS resources. In one example, the DL measurement RS resources include both PL RS resources and (NZP) CSI-RS resources. In one example, the DL measurement RS resources include the SSB resources.

At block 1430, the UE is further configured to use the measurement (based on the received DL measurement RS resources) to determine a beam report and report it via an UL channel (e.g., PUCCH or PUSCH), as configured by the higher layer parameter CSI-ReportConfig. Wherein the PUSCH can be one of dynamic grant PUSCH, Type 1 configured grant PUSCH, Type 2 configured grant PUSCH, MsgA PUSCH associated with Type 2 random access procedure or Msg3 PUSCH associated with Type 1 random access procedure.

The beam report includes $N \geq 1$ pairs of (R, I) where R is a resource indicator, and I is an index corresponding to the reported R. In one example, R is SSBRI indicating SSB index, or CRI indicating CSI-RS resource index. In one example, the beam report also include a beam metric corresponding to (or associated with) each reported resource indicator R. In one example, each beam metric is L1-RSRP (as in Rel. 15). In one example, each beam metric is L1-SINR (as in Rel. 16). In one example, each beam metric is L1-RSRP or L1-SINR based on configuration, which could be subject to UE capability reported by the UE. When $N>1$, the beam metrics are reported in a differential manner (as in Rel.15/16) with 7 bits for the first (absolute) beam metric and 4 bits for each of the remaining N−1 (differential) beam metrics with respect to the first beam metric, the details of this differential reporting is as described in Rel. 15/16 NR specification.

In one example, the index I indicates a correspondence between a CSI-RS and/or SSB resource index (indicated via R) and a UE capability value from a list of UE capability values (or value set/sets) reported by the UE (via UE capability signaling). In one example, the index I is an index of a UE capability value from a list of UE capability values (or value set/sets). The details of the list of UE capability values (or value set/sets) are described later in this disclosure. The UE shall not update or is expected to maintain the correspondence between (two consecutive) beam reporting instances (in time).

In one example, the beam report is configured via reportQuantity in CSI-ReportConfig that is set to an existing (Rel. 15/16) value, i.e., to 'cri-RSRP' or 'ssb-Index-RSRP' or 'cri-SINR', or 'ssb-Index-SINR'.

In one example, the beam report is configured via reportQuantity in CSI-ReportConfig that is set to a new value, i.e., 'cri-RSRP-r17' or 'ssb-Index-RSRP-r17' or 'cri-SINR-r17', or 'ssb-Index-SINR-r17', where the term 'cri' or 'ssb-Index' corresponds to the resource indicator, the term 'RSRP' or 'SINR' corresponds to the beam metric, and the term 'r17' corresponds to the index I. In one example,

- In one example, the term "r17" is replaced with 'CapabilityIndex', i.e., the new value is 'cri-RSRP-CapabilityIndex', 'ssb-Index-RSRP-CapabilityIndex', 'cri-SINR-CapabilityIndex', or 'ssb-Index-SINR-CapabilityIndex'.
- In one example, the term "r17" is replaced with 'SetIndex', i.e., the new value is 'cri-RSRP-SetIndex', 'ssb-Index-RSRP-SetIndex', 'cri-SINR-SetIndex', or 'ssb-Index-SINR-SetIndex'.
- In one example, the term "r17" is replaced with 'ValueIndex', i.e., the new value is 'cri-RSRP-ValueIndex', 'ssb-Index-RSRP-ValueIndex', 'cri-SINR-ValueIndex', 'ssb-Index-SINR-ValueIndex'
- In one example, the term "r17" is replaced with 'ValueSetIndex', i.e., the new value is 'cri-RSRP-ValueSetIndex', 'ssb-Index-RSRP-ValueSetIndex', 'cri-SINR-ValueSetIndex', 'ssb-Index-SINR-ValueSetIndex'
- In one example, the term "r17" is replaced with 'CapabilityValueSetIndex', i.e., the new value is 'cri-RSRP-CapabilityValueSetIndex', 'ssb-Index-RSRP-CapabilityValueSetIndex', 'cri-SINR-CapabilityValueSetIndex', 'ssb-Index-SINR-CapabilityValueSetIndex'.
- In one example, the term "r17" is replaced with 'CapabilityValueIndex', i.e., the new value is 'cri-RSRP-CapabilityValueIndex', 'ssb-Index-RSRP-CapabilityValueIndex', 'cri-SINR-CapabilityValueIndex', 'ssb-Index-SINR-CapabilityValueIndex'.
- In one example, the term "r17" is replaced with 'CapabilitySetIndex', i.e., the new value is 'cri-RSRP-CapabilitySetIndex', 'ssb-Index-RSRP-CapabilitySetIndex', 'cri-SINR-CapabilitySetIndex', 'ssb-Index-SINR-CapabilitySetIndex'.

The index I (or the correspondence) is determined/configured according to at least one of the following examples.

In one example, the index I indicates an information about the coherence type. For example, the index I indicates one of the following:

- Full-coherent (FC) indicating all SRS ports. In one example, this corresponds to the case of 1 antenna panel comprising all SRS ports. In one example, this corresponds to the case of all SRS ports being selected (or turned ON).
- Partial-coherent (PC) indicating a pair or subset of 2 SRS ports. In one example, this corresponds to the case of selecting 1 antenna panel (out of multiple panels each comprising a subset of SRS ports). In one example, this corresponds to the case of a subset of (e.g., or 2 SRS) ports being selected (or turned ON) out of >2 (e.g., 4) SRS antenna ports.

Non-coherent (NC) indicating 1 SRS port. In one example, this corresponds to the case of selecting 1 antenna panel (out of multiple panels each comprising 1 SRS port). In one example, this corresponds to the case of 1 SRS port being selected (or turned ON) out of >1 (e.g., 2 or 4) SRS antenna ports.

In one example, for an SRS resource with 4 SRS ports, the index I indicates one of the following.
- X1: FC (for 1 panel with 4 ports, or selecting 4 SRS ports)
- X2: PC (for 2 panels each with 2 ports, or selecting 2 SRS ports)
- X3: NC (for 4 panels each with 1 port or selecting 1 SRS port)

In one example, the index I depends on the coherence type reported by the UE.
- For a UE capable of NC and 4 ports, I is fixed to X3, hence may not be reported.
- For a UE capable of PC and 4 ports, I can be X2 or X3, hence may be reported (e.g., via a 1 bit reporting).
- For a UE capable of FC and 4 ports, I can be X1 or X2 or X3, hence may be reported (e.g., via a 2 bit reporting).

In one example, the index I does not depends on the coherence type reported by the UE.
- For a UE capable of 4 ports, I can be X1 or X2 or X3, hence may be reported (e.g., via a 2 bit reporting).

In one example, for an SRS resource with 4 SRS ports, the index I indicates one of the following.
- X1: FC (for 1 panel with 4 ports, or selecting 4 SRS ports)
- X2: PC (for 2 panels each with 2 ports, or selecting 2 SRS ports)
- X3: NC (for 4 panels each with 1 port or selecting 1 SRS port)
- X4: PC+NC (for 3 panels, 1 panel with 2 ports, or selecting 2 SRS ports and 2 panels each with 1 port or selecting 1 SRS port)

In one example, the index I depends on the coherence type reported by the UE.
- For a UE capable of NC and 4 ports, I is fixed to X3, hence may not be reported.
- For a UE capable of PC and 4 ports, I can be X2 or X3 hence may be reported (e.g., via a 1 bit reporting). Or for a UE capable of PC and 4 ports, I can be X2 or X3 or X4, hence may be reported (e.g., via a 2 bit reporting).
- For a UE capable of FC and 4 ports, I can be X1 or X2 or X3 or X4, hence may be reported (e.g., via a 2 bit reporting).

In one example, the index I does not depends on the coherence type reported by the UE.
- For a UE capable of 4 ports, I can be X1 or X2 or X3 or X4, hence may be reported (e.g., via a 2 bit reporting).

In one example, for an SRS resource with 2 SRS ports, the index I indicates one of the following.
- Y1: FC (for 1 panel with 2 ports, or selecting 2 SRS ports)
- Y3: NC (for 2 panels each with 1 port or selecting 1 SRS port)

In one example, the index I depends on the coherence type reported by the UE.
- For a UE capable of NC and 2 ports, I is fixed to Y3, hence may not be reported.
- For a UE capable of FC and 2 ports, I can be Y1 or Y3, hence may be reported (e.g., via a 1 bit reporting).

In one example, the index I does not depend on the coherence type reported by the UE.
- For a UE capable of 2 ports, I can be Y1 or Y3, hence may be reported (e.g., via a 1 bit reporting).

In one example, the NW configures the set of allowed values for the index I or the NW configures an association between the index I and coherence type or selection of SRS antenna ports. This configuration can be subject to UE capability reported by the UE, which for example can be a list of supported UE capability values (or value set/sets) including coherence types and/or selection of SRS antenna ports for the reporting of the index I. The UE determines the index I based on the NW configuration, and the bitwidth of index I reporting is 0, 1, 2, or 2 bits if the number of supported coherence types or selection of SRS antenna ports for the reporting of the index I is 1, 2, 3, or 4, respectively.

In one example, the index I indicates an information about the coherence type. The details are the same as described in another example described herein except that for 4 SRS ports, the index I is allowed to take a value indicating selection of 3 SRS ports.

For an SRS resource with 4 SRS ports, the index I indicates one of the following.
- X1: FC (for 1 panel with 4 ports, or selecting 4 SRS ports)
- X2: PC (for 2 panels each with 2 ports, or selecting 2 SRS ports)
- X3: NC (for 4 panels each with 1 port or selecting 1 SRS port)
- X4: PC_3port (for 1 panel each with 3 ports, or selecting 3 SRS ports)

In one example, the index I depends on the coherence type reported by the UE.
- For a UE capable of NC and 4 ports, I is fixed to X3, hence may not be reported.
- For a UE capable of PC and 4 ports, I can be X2 or X3, hence may be reported (e.g., via a 1 bit reporting).
- For a UE capable of FC and 4 ports, I can be X1 or X2 or X3 or X4, hence may be reported (e.g., via a 2 bit reporting).
- For a UE capable of PC_3port and 4 ports, I can be X2 or X3 or X4, hence may be reported (e.g., via a 2 bit reporting).

In one example, the index I does not depends on the coherence type reported by the UE.
- For a UE capable of 4 ports, I can be X1 or X2 or X3 or X4, hence may be reported (e.g., via a 2 bit reporting).

In one example, the NW configures the set of allowed values for the index I or the NW configures an association between the index I and coherence type or selection of SRS antenna ports. This configuration can be subject to UE capability reported by the UE, which for example can be a list of supported UE capability values (or value set/sets) including coherence types and/or selection of SRS antenna ports for the reporting of the index I. The UE determines the index I based on the NW configuration, and the bitwidth of index I reporting is 0, 1, 2, or 2 bits if the number of supported coherence types or selection of SRS antenna ports for the reporting of the index I is 1, 2, 3, or 4, respectively.

In one example, the index I indicates an information about the coherence type. The details are the same as described in another example described herein except that for 4 SRS ports, the index I is allowed to take a value indicating selection of 3 SRS ports.

For an SRS resource with 4 SRS ports, the index I indicates one of the following.
- X1: FC (for 1 panel with 4 ports, or selecting 4 SRS ports)
- X2: PC (for 2 panels each with 2 ports, or selecting 2 SRS ports)
- X3: NC (for 4 panels each with 1 port or selecting 1 SRS port)

X4: PC_3port (for 1 panel each with 3 ports, or selecting 3 SRS ports)

X5: PC+NC (for 3 panels, 1 panel with 2 ports, or selecting 2 SRS ports and 2 panels each with 1 port or selection 1 SRS port)

X6: PC_3port+NC (for 2 panels, 1 panel with 3 ports, or selecting 3 SRS ports and 1 panel with 1 port or selecting 1 SRS port)

In one example, the index I depends on the coherence type reported by the UE.

For a UE capable of NC and 4 ports, I is fixed to X3, hence may not be reported.

For a UE capable of PC and 4 ports, I can be X2 or X3 or X5, hence may be reported (e.g., via a 2 bit reporting).

For a UE capable of FC and 4 ports, I can be X1 or X2 or X3 or X4 or X5 or X6 hence may be reported (e.g., via a 3 bit reporting).

For a UE capable of PC_3port and 4 ports, I can be X2 or X3 or X4, or X5 or X6 hence may be reported (e.g., via a 3 bit reporting).

In one example, the index I does not depends on the coherence type reported by the UE.

For a UE capable of 4 ports, I can be X1 or X2 or X3 or X4 or X5 or X6, hence may be reported (e.g., via a 3 bit reporting).

In one example, the NW configures the set of allowed values for the index I or the NW configures an association between the index I and coherence type or selection of SRS antenna ports. This configuration can be subject to UE capability reported by the UE, which for example can be a list of supported UE capability values (or value set/sets) including coherence types and/or selection of SRS antenna ports for the reporting of the index I. The UE determines the index I based on the NW configuration, and the bitwidth of index I reporting is 0, 1, 2, or 2 bits if the number of supported coherence types or selection of SRS antenna ports for the reporting of the index I is 1, 2, 3, or 4, respectively.

In one example, the index I indicates an information about the coherence type and SRS antenna port(s). For example, the index I indicates one of the following:

Full-coherent (FC) indicating all SRS ports. In one example, this corresponds to the case of 1 antenna panel comprising all SRS ports. In one example, this corresponds to the case of all SRS ports being selected (or turned ON).

Partial-coherent (PC) indicating a pair or subset of 2 SRS ports. In one example, this corresponds to the case of selecting 1 antenna panel (out of multiple panels each comprising a subset of SRS ports). In one example, this corresponds to the case of a subset of (e.g., or 2 SRS) ports being selected (or turned ON) out of >2 (e.g., 4) SRS antenna ports. For 4 SRS antenna ports, since there are two SRS antenna port pairs, the index also indicates one of the two such pairs PC_PortPair1 indicating a first SRS port pair (a,b)

PC_PortPair2 indicating a second SRS port pair (c,d)

Non-coherent (NC) indicating 1 SRS port. In one example, this corresponds to the case of selecting 1 antenna panel (out of multiple panels each comprising 1 SRS port). In one example, this corresponds to the case of 1 SRS port being selected (or turned ON) out of >1 (e.g., 2 or 4) SRS antenna ports. For 2 SRS antenna ports, the index also indicates one of the two ports NC_Port1 indicating a first SRS port a NC_Port2 indicating a second SRS port b Likewise, for 4 SRS antenna ports, the index also indicates one of the four ports NC_Port1 indicating a first SRS port a NC_Port2 indicating a first SRS port b NC_Port3 indicating a first SRS port c NC_Port4 indicating a first SRS port d In one example, for an SRS resource with 4 SRS ports, the index I indicates one of the following.

X1: FC (for 1 panel with 4 ports, or selecting 4 SRS ports)

X2: PC_PortPair1 (first of the 2 panels each with 2 ports, or selecting 2 SRS ports)

X3: PC_PortPair2 (second of the 2 panels each with 2 ports, or selecting 2 SRS ports)

X4: NC_Port1 (first of the 4 panels each with 1 port or selecting 1 SRS port)

X5: NC_Port2 (second of the 4 panels each with 1 port or selecting 1 SRS port)

X6: NC_Port3 (third of the 4 panels each with 1 port or selecting 1 SRS port)

X7: NC_Port4 (fourth of the 4 panels each with 1 port or selecting 1 SRS port)

In one example, the index I depends on the coherence type reported by the UE.

For a UE capable of NC and 4 ports, I can be one of X4, . . . , X7, hence may be reported (e.g., via a 2 bit reporting).

For a UE capable of PC and 4 ports,

I can be one of X2, . . . , X7, hence may be reported (e.g., via a 3 bit reporting).

Or, I can be one of X2 and X3, hence may be reported (e.g., via a 1 bit reporting).

For a UE capable of FC and 4 ports,

I can be one of X1, . . . , X7, hence may be reported (e.g., via a 3 bit reporting).

Or, I can be one of X1, . . . , X3, hence may be reported (e.g., via a 2 bit reporting).

In one example, the index I does not depend on the coherence type reported by the UE.

For a UE capable of 4 ports, I can be one of X1, . . . , X7, hence may be reported (e.g., via a 3 bit reporting).

In one example, for an SRS resource with 4 SRS ports, the index I indicates one of the following.

X1 through X7 as described in another example described herein

X8: PC+NC_PortPair1=PC_PortPair1 (first of the 3 panels, 1 panel with 2 ports, or selecting 2 SRS ports and 2 panels each with 1 port or selecting 1 SRS port)

X9: PC+NC_Port3=NC_Port3 (second of the 3 panels, 1 panel with 2 ports, or selecting 2 SRS ports and 2 panels each with 1 port or selecting 1 SRS port)

X10: PC+NC_Port4=NC_Port4 (third of the 3 panels, 1 panel with 2 ports, or selecting 2 SRS ports and 2 panels each with 1 port or selecting 1 SRS port)

In one example, the index I depends on the coherence type reported by the UE.

For a UE capable of NC and 4 ports, I can be one of X4, . . . , X7, hence may be reported (e.g., via a 2 bit reporting).

For a UE capable of PC and 4 ports,

I can be one of X2, . . . , X7, hence may be reported (e.g., via a 3 bit reporting).

Or, I can be one of X2 and X3, hence may be reported (e.g., via a 1 bit reporting).

Or, I can be one of X2, . . . , X10, hence may be reported (e.g., via a 4 bit reporting)

For a UE capable of FC and 4 ports,
  I can be one of X1, . . . , X7, hence may be reported (e.g., via a 3 bit reporting).
  Or, I can be one of X1, . . . , X3, hence may be reported (e.g., via a 2 bit reporting).
  Or, I can be one of X1, . . . , X10, hence may be reported (e.g., via a 4 bit reporting).
In one example, the index I does not depends on the coherence type reported by the UE.
  For a UE capable of 4 ports, I can be one of X1, . . . , X10, hence may be reported (e.g., via a 4 bit reporting).
In one example, for an SRS resource with 2 SRS ports, the index I indicates one of the following.
  Y1: FC (for 1 panel with 2 ports, or selecting 2 SRS ports)
  Y3: NC_Port1 (first of the 2 panels each with 1 port or selecting 1 SRS port)
  Y4: NC_Port2 (second of the 2 panels each with 1 port or selecting 1 SRS port)
In one example, the index I depends on the coherence type reported by the UE.
  For a UE capable of NC and 2 ports, I is one of Y3 and Y4, hence may be reported (e.g., via a 1 bit reporting).
  For a UE capable of FC and 2 ports, I can be Y1 or Y3 or Y4, hence may be reported (e.g., via a 2 bit reporting).
In one example, the index I does not depend on the coherence type reported by the UE.
  For a UE capable of 2 ports, I can be Y1 or Y3 or Y4, hence may be reported (e.g., via a 2 bit reporting).
In one example, the NW configures the set of allowed values for the index I or the NW configures an association between the index I and coherence type or selection of SRS antenna ports. This configuration can be subject to UE capability reported by the UE, which for example can be a list of supported UE capability values (or value set/sets) including coherence types and/or selection of SRS antenna ports for the reporting of the index I. The UE determines the index I based on the NW configuration, and the bitwidth of index I reporting is 0, 1, 2, or 3 bits if the number of supported coherence types or selection of SRS antenna ports for the reporting of the index I is 1, between 2-3, between 4-7, or >=8, respectively.
In one example, the index I indicates an information about the coherence type and SRS antenna port(s). The details are the same as described in another example described herein except that for 4 SRS ports, the index I is allowed to take a value indicating selection of 3 SRS ports.
For an SRS resource with 4 SRS ports, the index I indicates one of the following.
  X1: Full-coherent (FC): as described in another example described herein
  Partial-coherent (PC):
    X2: PC_PortPair1, X3: PC_PortPair2 as described in another example described herein
  Non-coherent (NC): for 2 SRS antenna ports, the index also indicates one of the two ports
    NC_Port1, NC_Port2 as described in another example described herein Likewise, for 4 SRS antenna ports, the index also indicates one of the four ports
    X4: NC_Port1, X5: NC_Port2, X6: NC_Port3, X7: NC_Port4 as described in another example described herein
  PC+NC (for 2 panels, one with 3 ports, or selecting 3 SRS ports, another with 1 port): for 4 SRS antenna ports, the index indicates one of the following two
    X8: PC_Port123 indicating three SRS ports (a,b,c)
    X9: NC_Port4 indicating fourth SRS port d
In one example, the index I depends on the coherence type reported by the UE.
  For a UE capable of NC and 4 ports, I can be one of X4, . . . , X7, hence may be reported (e.g., via a 2 bit reporting).
  For a UE capable of PC and 4 ports,
    I can be one of X2, . . . , X7, hence may be reported (e.g., via a 3 bit reporting).
    Or, I can be one of X2 and X3, hence may be reported (e.g., via a 1 bit reporting).
  For a UE capable of FC and 4 ports,
    I can be one of X1, . . . , X7, hence may be reported (e.g., via a 3 bit reporting).
    Or, I can be one of X1, . . . , X3, hence may be reported (e.g., via a 2 bit reporting).
    Or, I can be one of X1, . . . , X9, hence may be reported (e.g., via a 3 bit reporting).
  For a UE capable of PC+NC and 4 ports,
    I can be X8 or X9, hence may be reported (e.g., via a 1 bit reporting).
    Or, I can be one of X2, . . . , X9, hence may be reported (e.g., via a 3 bit reporting).
    Or, I can be one of X2, X3, X8, and X9, hence may be reported (e.g., via a 2 bit reporting).
In one example, the index I does not depend on the coherence type reported by the UE.
  For a UE capable of 4 ports, I can be one of X1, . . . , X9, hence may be reported (e.g., via a 4 bit reporting).
In one example, the index I indicates an information about the coherence type. The details are the same as described in another example described herein except that for 4 SRS ports, the index I is allowed to take a value indicating selection of 3 SRS ports.
For an SRS resource with 4 SRS ports, the index I indicates one of the following.
  X1-X7 as described in another example described herein
  X8-X10 as described in another example described herein
  PC+NC (for 2 panels, one with 3 ports, or selecting 3 SRS ports, another with 1 port): for 4 SRS antenna ports, the index indicates one of the following two
    X11: PC_Port123 indicating three SRS ports (a,b,c)
    X12: NC_Port4 indicating fourth SRS port d
In one example, the index I depends on the coherence type reported by the UE.
  For a UE capable of NC and 4 ports, I can be one of X4, . . . , X7, hence may be reported (e.g., via a 2 bit reporting).
  For a UE capable of PC and 4 ports,
    I can be one of X2, . . . , X7, hence may be reported (e.g., via a 3 bit reporting).
    Or, I can be one of X2 and X3, hence may be reported (e.g., via a 1 bit reporting).
    Or, I can be one of X2, . . . , X12, hence may be reported (e.g., via a 4 bit reporting).
  For a UE capable of FC and 4 ports,
    I can be one of X1, . . . , X7, hence may be reported (e.g., via a 3 bit reporting).
    Or, I can be one of X1, . . . , X3, hence may be reported (e.g., via a 2 bit reporting).
    Or, I can be one of X1, . . . , X10, hence may be reported (e.g., via a 4 bit reporting).
    Or, I can be one of X1, . . . , X12, hence may be reported (e.g., via a 4 bit reporting).
  For a UE capable of PC+NC and 4 ports,
    I can be one of X8 . . . X10, hence may be reported (e.g., via a 2 bit reporting).
    Or, I can be X11 or X12, hence may be reported (e.g., via a 1 bit reporting).

Or, I can be one of X8 ... X12, hence may be reported (e.g., via a 3 bit reporting).

Or, I can be one of X2, ..., X10, hence may be reported (e.g., via a 4 bit reporting).

Or, I can be one of X2, X3, X8, ... X12, hence may be reported (e.g., via a 3 bit reporting).

In one example, the index I does not depend on the coherence type reported by the UE.

For a UE capable of 4 ports, I can be one of X1, ..., X12, hence may be reported (e.g., via a 4 bit reporting).

In one example, the index I indicates an information about one TPMI or multiple TPMIs (i.e., a TPMI group), where each TPMI indicates a precoding matrix W for UL transmission (e.g., PUSCH triggered by DCI or configured via RRC, for example, via higher layer PUSCH-Config). According to Section 6.3.1.5 of REF7, for non-codebook-based UL transmission, the precoding matrix w equals the identity matrix. For codebook-based UL transmission, the precoding matrix w is given by w=1 for single-layer transmission on a single antenna port, otherwise by Table 1 to Table 6, which are copied below. The subset of TPMI indices for the three coherence types are summarized in Table 7 and Table 8, where rank=r corresponds to (and is equivalent to) r layers.

The rank (or number of layers) and the corresponding precoding matrix w are indicated to the UE using TRI and TPMI, respectively. In one example, this indication is joint via a field 'Precoding information and number of layers' in DCI, e.g., using DCI format 0_1. In another example, this indication is via higher layer RRC signaling. In one example, the mapping between a field 'Precoding information and number of layers' and TRI/TPMI is according to Section 7.3.1.1.2 of [REF10].

TABLE 1

Precoding matrix W for single-layer transmission using two antenna ports.

| TPMI index | W (ordered from left to right in increasing order of TPMI index) |
|---|---|
| 0-5 | $\frac{1}{\sqrt{2}}\begin{bmatrix}1\\0\end{bmatrix}$ $\frac{1}{\sqrt{2}}\begin{bmatrix}0\\1\end{bmatrix}$ $\frac{1}{\sqrt{2}}\begin{bmatrix}1\\1\end{bmatrix}$ $\frac{1}{\sqrt{2}}\begin{bmatrix}1\\-1\end{bmatrix}$ $\frac{1}{\sqrt{2}}\begin{bmatrix}1\\j\end{bmatrix}$ $\frac{1}{\sqrt{2}}\begin{bmatrix}1\\-j\end{bmatrix}$ — — |

TABLE 2

Precoding matrix W for single-layer transmission using four antenna ports with transform precoding disabled.

| TPMI index | W (ordered from left to right in increasing order of TPMI index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\1\end{bmatrix}$ $\frac{1}{2}\begin{bmatrix}1\\1\\j\\j\end{bmatrix}$ $\frac{1}{2}\begin{bmatrix}1\\1\\-1\\-1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\-1\end{bmatrix}$ $\frac{1}{2}\begin{bmatrix}1\\j\\-1\\-j\end{bmatrix}$ $\frac{1}{2}\begin{bmatrix}1\\j\\-j\\1\end{bmatrix}$ $\frac{1}{2}\begin{bmatrix}1\\-1\\1\\-1\end{bmatrix}$ $\frac{1}{2}\begin{bmatrix}1\\-1\\j\\-j\end{bmatrix}$ $\frac{1}{2}\begin{bmatrix}1\\-1\\-1\\1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\1\end{bmatrix}$ $\frac{1}{2}\begin{bmatrix}1\\-j\\-1\\j\end{bmatrix}$ $\frac{1}{2}\begin{bmatrix}1\\-j\\-j\\-1\end{bmatrix}$ — — — — |

TABLE 3

Precoding matrix W for two-layer transmission using two antenna ports with ports with transform precoding disabled.

| TPMI index | W (ordered from left to right in increasing order of TPMI index) | | |
|---|---|---|---|
| 0-2 | $\frac{1}{\sqrt{2}}\begin{bmatrix} 1 & 0 \\ 0 & 1 \end{bmatrix}$ | $\frac{1}{2}\begin{bmatrix} 1 & 1 \\ 1 & -1 \end{bmatrix}$ | $\frac{1}{2}\begin{bmatrix} 1 & 1 \\ j & -j \end{bmatrix}$ |

TABLE 4

Precoding matrix W for two-layer transmission using four antenna ports with transform precoding disabled.

| TPMI index | W (ordered from left to right in increasing order of TPMI index) | | | |
|---|---|---|---|---|
| 0-3 | $\frac{1}{2}\begin{bmatrix} 1 & 0 \\ 0 & 1 \\ 0 & 0 \\ 0 & 0 \end{bmatrix}$ | $\frac{1}{2}\begin{bmatrix} 1 & 0 \\ 0 & 0 \\ 0 & 1 \\ 0 & 0 \end{bmatrix}$ | $\frac{1}{2}\begin{bmatrix} 1 & 0 \\ 0 & 0 \\ 0 & 0 \\ 0 & 1 \end{bmatrix}$ | $\frac{1}{2}\begin{bmatrix} 0 & 0 \\ 1 & 0 \\ 0 & 1 \\ 0 & 0 \end{bmatrix}$ |
| 4-7 | $\frac{1}{2}\begin{bmatrix} 0 & 0 \\ 1 & 0 \\ 0 & 0 \\ 0 & 1 \end{bmatrix}$ | $\frac{1}{2}\begin{bmatrix} 0 & 0 \\ 0 & 0 \\ 1 & 0 \\ 0 & 1 \end{bmatrix}$ | $\frac{1}{2}\begin{bmatrix} 1 & 0 \\ 0 & 1 \\ 1 & 0 \\ 0 & -j \end{bmatrix}$ | $\frac{1}{2}\begin{bmatrix} 1 & 0 \\ 0 & 1 \\ 1 & 0 \\ 0 & j \end{bmatrix}$ |
| 8-11 | $\frac{1}{2}\begin{bmatrix} 1 & 0 \\ 0 & 1 \\ -j & 0 \\ 0 & 1 \end{bmatrix}$ | $\frac{1}{2}\begin{bmatrix} 1 & 0 \\ 0 & 1 \\ -j & 0 \\ 0 & -1 \end{bmatrix}$ | $\frac{1}{2}\begin{bmatrix} 1 & 0 \\ 0 & 1 \\ -1 & 0 \\ 0 & -j \end{bmatrix}$ | $\frac{1}{2}\begin{bmatrix} 1 & 0 \\ 0 & 1 \\ -1 & 0 \\ 0 & j \end{bmatrix}$ |
| 12-15 | $\frac{1}{2}\begin{bmatrix} 1 & 0 \\ 0 & 1 \\ j & 0 \\ 0 & 1 \end{bmatrix}$ | $\frac{1}{2}\begin{bmatrix} 1 & 0 \\ 0 & 1 \\ j & 0 \\ 0 & -1 \end{bmatrix}$ | $\frac{1}{2\sqrt{2}}\begin{bmatrix} 1 & 1 \\ 1 & 1 \\ 1 & -1 \\ 1 & -1 \end{bmatrix}$ | $\frac{1}{2\sqrt{2}}\begin{bmatrix} 1 & 1 \\ 1 & 1 \\ j & -j \\ j & -j \end{bmatrix}$ |
| 16-19 | $\frac{1}{2\sqrt{2}}\begin{bmatrix} 1 & 1 \\ j & j \\ 1 & -1 \\ j & -j \end{bmatrix}$ | $\frac{1}{2\sqrt{2}}\begin{bmatrix} 1 & 1 \\ j & j \\ j & -j \\ -1 & 1 \end{bmatrix}$ | $\frac{1}{2\sqrt{2}}\begin{bmatrix} 1 & 1 \\ -1 & -1 \\ 1 & -1 \\ -1 & 1 \end{bmatrix}$ | $\frac{1}{2\sqrt{2}}\begin{bmatrix} 1 & 1 \\ -1 & -1 \\ j & -j \\ -j & j \end{bmatrix}$ |
| 20-21 | $\frac{1}{2\sqrt{2}}\begin{bmatrix} 1 & 1 \\ -j & -j \\ 1 & -1 \\ -j & j \end{bmatrix}$ | $\frac{1}{2\sqrt{2}}\begin{bmatrix} 1 & 1 \\ -j & -j \\ j & -j \\ 1 & -1 \end{bmatrix}$ | — | — |

TABLE 5

Precoding matrix W for three-layer transmission using four antenna ports with transform precoding disabled.

| TPMI index | W (ordered from left to right in increasing order of TPMI index) | | | |
|---|---|---|---|---|
| 0-3 | $\frac{1}{2}\begin{bmatrix} 1 & 0 & 0 \\ 0 & 1 & 0 \\ 0 & 0 & 1 \\ 0 & 0 & 0 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ | $\frac{1}{2\sqrt{3}}\begin{bmatrix} 1 & 1 & 1 \\ 1 & -1 & 1 \\ 1 & 1 & -1 \\ 1 & -1 & -1 \end{bmatrix}$ |
| 4-6 | $\frac{1}{2\sqrt{3}}\begin{bmatrix} 1 & 1 & 1 \\ 1 & -1 & 1 \\ j & j & -j \\ j & -j & -j \end{bmatrix}$ | $\frac{1}{2\sqrt{3}}\begin{bmatrix} 1 & 1 & 1 \\ -1 & 1 & -1 \\ 1 & 1 & -1 \\ -1 & 1 & 1 \end{bmatrix}$ | $\frac{1}{2\sqrt{3}}\begin{bmatrix} 1 & 1 & 1 \\ -1 & 1 & -1 \\ j & j & -j \\ -j & j & j \end{bmatrix}$ | — |

TABLE 6

Precoding matrix W for four-layer transmission using four antenna ports with transform precoding disabled.

| TPMI index | W (ordered from left to right in increasing order of TPMI index) | | | |
|---|---|---|---|---|
| 0-3 | $\frac{1}{2}\begin{bmatrix}1&0&0&0\\0&1&0&0\\0&0&1&0\\0&0&0&1\end{bmatrix}$ | $\frac{1}{2\sqrt{2}}\begin{bmatrix}1&0&0&0\\0&0&1&1\\1&-1&0&0\\0&0&1&-1\end{bmatrix}$ | $\frac{1}{2\sqrt{2}}\begin{bmatrix}1&1&0&0\\0&0&1&1\\j&-j&0&0\\0&0&j&-j\end{bmatrix}$ | $\frac{1}{4}\begin{bmatrix}1&1&1&1\\1&-1&1&-1\\1&1&-1&-1\\1&-1&-1&1\end{bmatrix}$ |
| 4 | $\frac{1}{4}\begin{bmatrix}1&1&1&1\\1&-1&1&-1\\j&j&-j&-j\\j&-j&-j&j\end{bmatrix}$ | — | — | — |

TABLE 7

TPMI indices for 2 antenna ports

| Rank | Non-Coherent | fullAndPartialAndNonCoherent |
|---|---|---|
| 1 | 0-1 | 0-5 |
| 2 | 0 | 0-2 |

TABLE 8

TPMI indices for 4 antenna ports

| Rank | Non-Coherent | partialAndNonCoherent | fullAndPartialAndNonCoherent |
|---|---|---|---|
| 1 | 0-3 | 0-11 | 0-27 |
| 2 | 0-5 | 0-13 | 0-21 |
| 3 | 0 | 0-2 | 0-6 |
| 4 | 0 | 0-2 | 0-4 |

For 2Tx or 2 SRS ports, the index I indicates a rank 1 TPMI for 2 antenna ports. Two examples are shown in Table 9:

Example 1: I=0 indicates selecting 1 SRS port (comprising an antenna panel), and I=1 indicates selecting 2 SRS ports (comprising an antenna panel)

Example 2: I=0 indicates selecting 1 SRS port (comprising an antenna panel with $1^{st}$ port), I=1 indicates selecting 1 SRS port (comprising an antenna panel with $2^{nd}$ port), and I=1 indicates selecting 2 SRS ports (comprising an antenna panel with both ports)

In one example, TPMI2 in example 1 and/or example 2 is replaced with any one of TPMI2-TPMI5 (in Table 9). In one example, TPMI2 in example 1 and/or example 2 is replaced with multiple TPMIs (or TPMI groups) from TPMI2-TPMI5 (in Table 9).

In one example, TPMI0 in example 1 is replaced with TPMI1 (in Table 9).

In one example, the index I depends on the coherence type reported by the UE. Hence, I can take a value, e.g., from Table 9, depending on the coherence type.

For a UE capable of NC and 2 ports, I can take I=0 for example 1 (hence need not be reported), and can take one of I=0 and I=1 for example 2 (hence can be reported via 1-bit reporting).

For a UE capable of FC and 2 ports, I can take any value, e.g., from Table 9, hence may be reported via 1-bit reporting for example 1 and 2-bit reporting for example 2.

In one example, the index I does not depend on the coherence type reported by the UE.

For a UE capable of 2 ports, I can take any value, e.g., from Table 9, hence may be reported via 1-bit reporting for example 1 and 2-bit reporting for example 2.

TABLE 9

Index I to TPMI mapping for 2 SRS ports

| | I = 0 | I = 1 | I = 2 |
|---|---|---|---|
| Example 1 | TPMI0: $\frac{1}{\sqrt{2}}\begin{bmatrix}1\\0\end{bmatrix}$ | TPMI2: $\frac{1}{\sqrt{2}}\begin{bmatrix}1\\1\end{bmatrix}$ | |
| Example 2 | TPMI0: $\frac{1}{\sqrt{2}}\begin{bmatrix}1\\0\end{bmatrix}$ | TPMI1: $\frac{1}{\sqrt{2}}\begin{bmatrix}0\\1\end{bmatrix}$ | TPMI2: $\frac{1}{\sqrt{2}}\begin{bmatrix}1\\1\end{bmatrix}$ |

For 4Tx or 4 SRS ports, the index I indicates a rank 1 TPMI for 4 antenna ports. Two examples are shown in Table 10:

Example 1: I=0 indicates selecting 1 SRS port (comprising an antenna panel), I=1 indicates selecting 2 SRS ports (comprising an antenna panel), and I=2 indicates selecting 4 SRS ports (comprising an antenna panel).

Example 2: I=0 indicates selecting 1 SRS port (comprising an antenna panel with $1^{st}$ port), I=1 indicates selecting 1 SRS port (comprising an antenna panel with $2^{nd}$ port), I=2 indicates selecting 1 SRS port (comprising an antenna panel with $3^{rd}$ port), I=3 indicates selecting 1 SRS port (comprising an antenna panel with 40 port), I=4 indicates selecting 2 SRS ports (comprising an antenna panel with $1^{st}$ and $2^{nd}$ ports), I=5 indicates selecting 2 SRS ports (comprising an antenna panel with $3^{rd}$ and 40 ports), and I=6 indicates selecting 4 SRS ports (comprising an antenna panel with all ports).

In one example, TPMI12 in example 1 and/or example 2 is replaced with any one of TPMI12-TPM27 (in Table 10). In one example, TPMI12 in example 1 and/or example 2 is replaced with multiple TPMIs (or TPMI groups) from TPMI12-TPMI27 (in Table 10).

In one example, TPMI4 in example 1 is replaced with TPMI8 (in Table 10). In one example, TPMI4 in example 1 is replaced with any one of TPMI4-7 (in Table 10). In one example, TPMI4 in example 1 is replaced with multiple TPMIs (or TPMI groups) from TPMI4-TPMI7 (in Table 10).

In one example, TPMI4 in example 1 is replaced with any one of TPMI4-11 (in Table 10). In one example, TPMI4 in example 1 is replaced with multiple TPMIs (or TPMI groups) from TPMI4-TPMI11 (in Table 10). In one example, TPMI4 in example 1 is replaced with any one of TPMI8-11 (in Table 10). In one example, TPMI4 in example 1 is replaced with multiple TPMIs (or TPMI groups) from TPMI8-TPMI11 (in Table 10).

In one example, TPMI4 in example 2 is replaced with any one of TPMI4-7 (in Table 10). In one example, TPMI4 in example 2 is replaced with multiple TPMIs (or TPMI groups) from TPMI4-TPMI7 (in Table 10). In one example, TPMI8 in example 2 is replaced with any one of TPMI8-11 (in Table 10). In one example, TPMI8 in example 2 is replaced with multiple TPMIs (or TPMI groups) from TPMI8-TPMI11 (in Table 10).

In one example, TPMI0 in example 1 is replaced with any one of TPMI1-3 (in Table 10).

In one example, the index I depends on the coherence type reported by the UE. Hence, I can take a value, e.g., from Table 10, depending on the coherence type.
- For a UE capable of NC and 4 ports, I can take I=0 for example 1 (hence need not be reported), and can take one of I=0 . . . 3 for example 2 (hence can be reported via 2-bit reporting).
- For a UE capable of PC and 4 ports, I can take I=0 or 1 for example 1 (hence can be reported via 1-bit reporting), and can take one of I=0 . . . 5 for example 2 (hence can be reported via 3-bit reporting).
- For a UE capable of FC and 4 ports, I can take any value, e.g., from Table 10, hence may be reported via 2-bit reporting for example 1 and 3-bit reporting for example 2.

In one example, the index I does not depend on the coherence type reported by the UE.
- For a UE capable of 4 ports, I can take any value, e.g., from Table 10, hence may be reported via 2-bit reporting for example 1 and 3-bit reporting for example 2.

In one example, the index I indicates an information about the TPMI or TPMI group, where the TPMI indicates a precoding matrix, whose number of columns indicates number of antenna panels at the UE, and each column indicates the antenna port index or indices comprising that antenna panel.

In one example, each column of the precoding matrix is a selection vector, comprising one '1' and remaining '0' entries, and the location (or row index) corresponding to the '1' indicates the antenna port comprising the panel. Three examples are shown in Table 11, Table 12, and Table 13.

TABLE 11

Index I to TPMI mapping for 2 SRS ports

| I = 0 | I = 1 |
|---|---|
| Rank 1 TPMI0: $\frac{1}{\sqrt{2}}\begin{bmatrix}1\\0\end{bmatrix}$ | Rank 2 TPMI0: $\frac{1}{\sqrt{2}}\begin{bmatrix}1&0\\0&1\end{bmatrix}$ |

TABLE 12

Index I to TPMI mapping for 4 SRS ports

| I = 0 | I = 1 | I = 2 |
|---|---|---|
| Rank 1 TPMI0: $\frac{1}{2}\begin{bmatrix}1\\0\\0\\0\end{bmatrix}$ | Rank 2 TPMI0: $\frac{1}{2}\begin{bmatrix}1&0\\0&1\\0&0\\0&0\end{bmatrix}$ | Rank 4 TPMI0: $\frac{1}{2}\begin{bmatrix}1&0&0&0\\0&1&0&0\\0&0&1&0\\0&0&0&1\end{bmatrix}$ |

TABLE 10

Index I to TPMI mapping for 4 SRS ports

| | I = 0 | I = 1 | I = 2 | I = 3 | I = 4 | I = 5 | I = 6 |
|---|---|---|---|---|---|---|---|
| Example 1 | TPMI0: $\frac{1}{2}\begin{bmatrix}1\\0\\0\\0\end{bmatrix}$ | TPMI4: $\frac{1}{2}\begin{bmatrix}1\\0\\1\\0\end{bmatrix}$ | TPMI12: $\frac{1}{2}\begin{bmatrix}1\\1\\1\\1\end{bmatrix}$ | | | | |
| Example 2 | TPMI0: $\frac{1}{2}\begin{bmatrix}1\\0\\0\\0\end{bmatrix}$ | TPMI1: $\frac{1}{2}\begin{bmatrix}0\\1\\0\\0\end{bmatrix}$ | TPMI2: $\frac{1}{2}\begin{bmatrix}0\\0\\1\\0\end{bmatrix}$ | TPMI3: $\frac{1}{2}\begin{bmatrix}0\\0\\0\\1\end{bmatrix}$ | TPMI4: $\frac{1}{2}\begin{bmatrix}1\\0\\1\\0\end{bmatrix}$ | TPMI8: $\frac{1}{2}\begin{bmatrix}0\\1\\0\\1\end{bmatrix}$ | TPMI12: $\frac{1}{2}\begin{bmatrix}1\\1\\1\\1\end{bmatrix}$ |

TABLE 13

Index I to TPMI mapping for 4 SRS ports

| I = 0 | I = 1 | I = 2 | I = 3 |
|---|---|---|---|
| Rank 1 TPMI0: | Rank 2 TPMI0: | Rank 3 TPMI0: | Rank 4 TPMI0: |
| $\frac{1}{2}\begin{bmatrix}1\\0\\0\\0\end{bmatrix}$ | $\frac{1}{2}\begin{bmatrix}1 & 0\\0 & 1\\0 & 0\\0 & 0\end{bmatrix}$ | $\frac{1}{2}\begin{bmatrix}1 & 0 & 0\\0 & 1 & 0\\0 & 0 & 1\\0 & 0 & 0\end{bmatrix}$ | $\frac{1}{2}\begin{bmatrix}1 & 0 & 0 & 0\\0 & 1 & 0 & 0\\0 & 0 & 1 & 0\\0 & 0 & 0 & 1\end{bmatrix}$ |

In one example, each column of the precoding matrix is either a selection vector selecting 1 port or more than 1 ports, comprises ones '1' and zeros '0' as entries, and the location (or row index or indices) corresponding to the '1' indicate(s) the antenna port(s) comprising the panel. Two examples are shown in Table 14 and Table 15 for 2 antenna ports.

TABLE 14

Index I to TPMI mapping for 2 SRS ports

| I = 0 | I = 1 | I = 2 |
|---|---|---|
| Rank 1 TPMI0: | Rank 1 TPMI2: | Rank 2 TPMI0: |
| $\frac{1}{\sqrt{2}}\begin{bmatrix}1\\0\end{bmatrix}$ | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |

TABLE 15

Index I to TPMI mapping for 2 SRS ports

| I = 0 | I = 1 | I = 2 | I = 3 |
|---|---|---|---|
| Rank 1 TPMI0: | Rank 1 TPMI1: | Rank 1 TPMI2: | Rank 2 TPMI0: |
| $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |

Three examples are shown in Table 16 through Table 18 for 4 antenna ports. In one example, I=5 in Table 18 indicates Rank 3 TPMI0:

$$\frac{1}{2}\begin{bmatrix}1 & 0 & 0\\0 & 1 & 0\\0 & 0 & 1\\0 & 0 & 0\end{bmatrix}$$

and Rank 1 TPMI0:

$$\frac{1}{2}\begin{bmatrix}1\\0\\0\\0\end{bmatrix}.$$

TABLE 16

Index I to TPMI mapping for 4 SRS ports

| I = 0 | I = 1 | I = 2 | I = 3 | I = 4 | I = 5 |
|---|---|---|---|---|---|
| Rank 1 TPMI0: | Rank 1 TPMI4: | Rank 1 TPMI12: | Rank 2 TPMI0: | Rank 2 TPMI6: | Rank 4 TPMI0: |
| $\frac{1}{2}\begin{bmatrix}1\\0\\0\\0\end{bmatrix}$ | $\frac{1}{2}\begin{bmatrix}1\\0\\1\\0\end{bmatrix}$ | $\frac{1}{2}\begin{bmatrix}1\\1\\1\\1\end{bmatrix}$ | $\frac{1}{2}\begin{bmatrix}1 & 0\\0 & 1\\0 & 0\\0 & 0\end{bmatrix}$ | $\frac{1}{2}\begin{bmatrix}1 & 0\\0 & 1\\1 & 0\\0 & -j\end{bmatrix}$ | $\frac{1}{2}\begin{bmatrix}1 & 0 & 0 & 0\\0 & 1 & 0 & 0\\0 & 0 & 1 & 0\\0 & 0 & 0 & 1\end{bmatrix}$ |

TABLE 17

Index I to TPMI mapping for 4 SRS ports

| I = 0 | I = 1 | I = 2 | I = 3 | I = 4 | I = 5 | I = 6 |
|---|---|---|---|---|---|---|
| Rank 1 TPMI0: | Rank 1 TPMI4: | Rank 1 TPMI12: | Rank 2 TPMI0: | Rank 2 TPMI6: | Rank 3 TPMI1: | Rank 4 TPMI0: |
| $\frac{1}{2}\begin{bmatrix}1\\0\\0\\0\end{bmatrix}$ | $\frac{1}{2}\begin{bmatrix}1\\0\\1\\0\end{bmatrix}$ | $\frac{1}{2}\begin{bmatrix}1\\1\\1\\1\end{bmatrix}$ | $\frac{1}{2}\begin{bmatrix}1&0\\0&1\\0&0\\0&0\end{bmatrix}$ | $\frac{1}{2}\begin{bmatrix}1&0\\0&1\\1&0\\0&-j\end{bmatrix}$ | $\frac{1}{2}\begin{bmatrix}1&0&0\\0&1&0\\1&0&0\\0&0&1\end{bmatrix}$ | $\frac{1}{2}\begin{bmatrix}1&0&0&0\\0&1&0&0\\0&0&1&0\\0&0&0&1\end{bmatrix}$ |

TABLE 18

Index I to TPMI mapping for 4 SRS ports

| I = 0 | I = 1 | I = 2 | I = 3 | I = 4 | I = 5 | I = 6 | I = 7 |
|---|---|---|---|---|---|---|---|
| Rank 1 + | Rank 1 | Rank 1 | Rank 2 | Rank 2 | Rank 3 | Rank 3 | Rank 4 |
| TPMI0: | TPMI4: | TPMI12: | TPMI0: | TPMI6: | TPMI0: | TPMI1: | TPMI0: |
| $\frac{1}{2}\begin{bmatrix}1\\0\\0\\0\end{bmatrix}$ | $\frac{1}{2}\begin{bmatrix}1\\0\\1\\0\end{bmatrix}$ | $\frac{1}{2}\begin{bmatrix}1\\1\\1\\1\end{bmatrix}$ | $\frac{1}{2}\begin{bmatrix}1&0\\0&1\\0&0\\0&0\end{bmatrix}$ | $\frac{1}{2}\begin{bmatrix}1&0\\0&1\\1&0\\0&-j\end{bmatrix}$ | $\frac{1}{2}\begin{bmatrix}1&0&0\\0&1&0\\0&0&1\\0&0&0\end{bmatrix}$ | $\frac{1}{2}\begin{bmatrix}1&0&0\\0&1&0\\1&0&0\\0&0&1\end{bmatrix}$ | $\frac{1}{2}\begin{bmatrix}1&0&0&0\\0&1&0&0\\0&0&1&0\\0&0&0&1\end{bmatrix}$ |

Two additional examples are shown in Table 19 and Table 20 for 4 antenna ports. In one example, I=14 in Table 19 indicates Rank 3 TPMI0:

$$\frac{1}{2}\begin{bmatrix}1&0&0\\0&1&0\\0&0&1\\0&0&0\end{bmatrix}$$

and Rank 1 TPMI0:

$$\frac{1}{2}\begin{bmatrix}1\\0\\0\\0\end{bmatrix}.$$

TABLE 19

Index I to TPMI mapping for 4 SRS ports

| | I = 0 | I = 1 | I = 2 | I = 3 | I = 4 | I = 5 | I = 6 |
|---|---|---|---|---|---|---|---|
| Rank 1 TPMI | TPMI0: $\frac{1}{2}\begin{bmatrix}1\\0\\0\\0\end{bmatrix}$ | TPMI1: $\frac{1}{2}\begin{bmatrix}0\\1\\0\\0\end{bmatrix}$ | TPMI2: $\frac{1}{2}\begin{bmatrix}0\\0\\1\\0\end{bmatrix}$ | TPMI3: $\frac{1}{2}\begin{bmatrix}0\\0\\0\\1\end{bmatrix}$ | TPMI4: $\frac{1}{2}\begin{bmatrix}1\\0\\1\\0\end{bmatrix}$ | TPMI8: $\frac{1}{2}\begin{bmatrix}0\\1\\0\\1\end{bmatrix}$ | TPMI12: $\frac{1}{2}\begin{bmatrix}1\\1\\1\\1\end{bmatrix}$ |
| | I = 7 | I = 8 | I = 9 | I = 10 | I = 11 | I = 12 | I = 13 |
| Rank 2 TPMI | TPMI0: $\frac{1}{2}\begin{bmatrix}1&0\\0&1\\0&0\\0&0\end{bmatrix}$ | TPMI1: $\frac{1}{2}\begin{bmatrix}1&0\\0&0\\0&1\\0&0\end{bmatrix}$ | TPMI2: $\frac{1}{2}\begin{bmatrix}1&0\\0&0\\0&0\\0&1\end{bmatrix}$ | TPMI3: $\frac{1}{2}\begin{bmatrix}0&0\\1&0\\0&1\\0&0\end{bmatrix}$ | TPMI4: $\frac{1}{2}\begin{bmatrix}0&0\\1&0\\0&0\\0&1\end{bmatrix}$ | TPMI5: $\frac{1}{2}\begin{bmatrix}0&0\\0&0\\1&0\\0&1\end{bmatrix}$ | TPMI6: $\frac{1}{2}\begin{bmatrix}1&0\\0&1\\1&0\\0&-j\end{bmatrix}$ |
| | I = 14 | I = 15 | | | | | |
| Rank 3 TPMI | TPMI0: $\frac{1}{2}\begin{bmatrix}1&0&0\\0&1&0\\0&0&1\\0&0&0\end{bmatrix}$ | TPMI1: $\frac{1}{2}\begin{bmatrix}1&0&0\\0&1&0\\1&0&0\\0&0&1\end{bmatrix}$ | | | | | |

TABLE 19-continued

Index I to TPMI mapping for 4 SRS ports

I = 16

| Rank 4 TPMI | TPMI0: $\frac{1}{2}\begin{bmatrix}1&0&0&0\\0&1&0&0\\0&0&1&0\\0&0&0&1\end{bmatrix}$ |
|---|---|

TABLE 20

Index I to TPMI mapping for 4 SRS ports

| | I = 0 | I = 1 | I = 2 | I = 3 | I = 4 | I = 5 | I = 6 |
|---|---|---|---|---|---|---|---|
| Rank 1 TPMI | TPMI0: $\frac{1}{2}\begin{bmatrix}1\\0\\0\\0\end{bmatrix}$ | TPMI1: $\frac{1}{2}\begin{bmatrix}0\\1\\0\\0\end{bmatrix}$ | TPMI2: $\frac{1}{2}\begin{bmatrix}0\\0\\1\\0\end{bmatrix}$ | TPMI3: $\frac{1}{2}\begin{bmatrix}0\\0\\0\\1\end{bmatrix}$ | TPMI4: $\frac{1}{2}\begin{bmatrix}1\\0\\1\\0\end{bmatrix}$ | TPMI8: $\frac{1}{2}\begin{bmatrix}0\\1\\0\\1\end{bmatrix}$ | TPMI12: $\frac{1}{2}\begin{bmatrix}1\\1\\1\\1\end{bmatrix}$ |

| | I = 7 | I = 8 | I = 9 | I = 10 | I = 11 | I = 12 | I = 13 |
|---|---|---|---|---|---|---|---|
| Rank 2 TPMI | TPMI0: $\frac{1}{2}\begin{bmatrix}1&0\\0&1\\0&0\\0&0\end{bmatrix}$ | TPMI1: $\frac{1}{2}\begin{bmatrix}1&0\\0&0\\0&1\\0&0\end{bmatrix}$ | TPMI2: $\frac{1}{2}\begin{bmatrix}1&0\\0&0\\0&0\\0&1\end{bmatrix}$ | TPMI3: $\frac{1}{2}\begin{bmatrix}0&0\\1&0\\0&1\\0&0\end{bmatrix}$ | TPMI4: $\frac{1}{2}\begin{bmatrix}0&0\\1&0\\0&0\\0&1\end{bmatrix}$ | TPMI5: $\frac{1}{2}\begin{bmatrix}0&0\\0&0\\1&0\\0&1\end{bmatrix}$ | TPMI6: $\frac{1}{2}\begin{bmatrix}1&0\\0&1\\1&0\\0&-j\end{bmatrix}$ |

I = 14

| Rank 3 TPMI | TPMI1: $\frac{1}{2}\begin{bmatrix}1&0&0\\0&1&0\\1&0&0\\0&0&1\end{bmatrix}$ |
|---|---|

I = 15

| Rank 4 TPMI | TPMI0: $\frac{1}{2}\begin{bmatrix}1&0&0&0\\0&1&0&0\\0&0&1&0\\0&0&0&1\end{bmatrix}$ |
|---|---|

In one embodiment, a UE reports via its capability reporting a list of UE capability values (or value set/sets), the UE capability value (or value set/sets) including an information about the supported rank value (or UL rank or number of UL transmission layers), and the UE, based on its reported capability, is configured with a reporting of a rank value or a maximum rank value (or UL rank or number of UL MIMO layers or number of PUSCH ports or number of SRS ports or max supported number of SRS ports) in the beam report. Note that a rank value is equivalent to a number of transmission layers for UL transmission (e.g., PUSCH).

As shown in FIG. 14, a UE is configured to measure (receive) $P_1$ DL measurement RS resources (such as CSI-RS or SSB), where $P_1 \geq 1$, details as explained herein.

The UE is further configured to use the measurement (based on the received DL measurement RS resources) to determine a beam report and report it via an UL channel (e.g., PUCCH or PUSCH), as configured by the higher layer parameter CSI-ReportConfig.

The beam report includes $N \geq 1$ pairs of (R, I) where R is a resource indicator, and I is an index corresponding to the reported R. In one example, R is SSBRI indicating SSB index, or CRI indicating CSI-RS resource index. In one example, the beam report also include a beam metric corresponding to (or associated with) each reported resource indicator R. In one example, each beam metric is L1-RSRP (as in Rel. 15). In one example, each beam metric is L1-SINR (as in Rel. 16). In one example, each beam metric is L1-RSRP or L1-SINR based on configuration, which could be subject to UE capability reported by the UE. When N>1, the beam metrics are reported in a differential manner (as in Rel.15/16) with 7 bits for the first (absolute) beam metric and 4 bits for each of the remaining N−1 (differential beam metrics with respect to the first beam metric, the details of this differential reporting is as described in Rel. 15/16 NR specification.

In one example, the index I indicates a correspondence between a CSI-RS and/or SSB resource index (indicated via R) and a UE capability value from a list of UE capability values (or value set/sets) reported by the UE (via UE capability signaling). In one example, the index I is an index of a UE capability value from a list of UE capability values (or value set/sets). The details of the list of UE capability values (or value set/sets) are described later in this disclosure. The UE shall not update or is expected to maintain the correspondence between beam reporting instances.

In one example, the beam report is configured via reportQuantity in CSI-ReportConfig that is set to an existing (Rel. 15/16) value, i.e., to 'cri-RSRP' or 'ssb-Index-RSRP' or 'cri-SINR', or 'ssb-Index-SINR'.

In one example, the beam report is configured via reportQuantity in CSI-ReportConfig that is set to a new value, i.e., 'cri-RSRP-r17' or 'ssb-Index-RSRP-r17' or 'cri-SINR-r17', or 'ssb-Index-SINR-r17', where the term 'cri' or 'ssb-Index' corresponds to the resource indicator, the term 'RSRP' or 'SINR' corresponds to the beam metric, and the term 'r17' corresponds to the index I. In one example,
- In one example, the term "r17" is replaced with 'CapabilityIndex', i.e., the new value is 'cri-RSRP-CapabilityIndex', 'ssb-Index-RSRP-CapabilityIndex', 'cri-SINR-CapabilityIndex', or 'ssb-Index-SINR-CapabilityIndex'.
- In one example, the term "r17" is replaced with 'SetIndex', i.e., the new value is 'cri-RSRP-SetIndex', 'ssb-Index-RSRP-SetIndex', 'cri-SINR-SetIndex', or 'ssb-Index-SINR-SetIndex'.
- In one example, the term "r17" is replaced with 'ValueIndex', i.e., the new value is 'cri-RSRP-ValueIndex', 'ssb-Index-RSRP-ValueIndex', 'cri-SINR-ValueIndex', 'ssb-Index-SINR-ValueIndex'
- In one example, the term "r17" is replaced with 'ValueSetIndex', i.e., the new value is 'cri-RSRP-ValueSetIndex', 'ssb-Index-RSRP-ValueSetIndex', 'cri-SINR-ValueSetIndex', 'ssb-Index-SINR-ValueSetIndex'.
- In one example, the term "r17" is replaced with 'CapabilityValueSetIndex', i.e., the new value is 'cri-RSRP-CapabilityValueSetIndex', 'ssb-Index-RSRP-CapabilityValueSetIndex', 'cri-SINR-CapabilityValueSetIndex', 'ssb-Index-SINR-CapabilityValueSetIndex'.
- In one example, the term "r17" is replaced with 'CapabilityValueIndex', i.e., the new value is 'cri-RSRP-CapabilityValueIndex', 'ssb-Index-RSRP-CapabilityValueIndex', 'cri-SINR-CapabilityValueIndex', 'ssb-Index-SINR-CapabilityValueIndex'.
- In one example, the term "r17" is replaced with 'CapabilitySetIndex', i.e., the new value is 'cri-RSRP-CapabilitySetIndex', 'ssb-Index-RSRP-CapabilitySetIndex', 'cri-SINR-CapabilitySetIndex', 'ssb-Index-SINR-CapabilitySetIndex'.

The index I (or the correspondence) is determined/configured according to at least one of the following examples.

In one example, the index I indicates a rank value or a maximum rank (or UL rank) value corresponding to a reported SSBRI/CRI in a beam reporting instance.

In one example, for an SRS resource with 4 SRS ports, the index I indicates one of the following.
- X1: rank 4 or max rank=4 (for 1 panel with 4 ports, or selecting 4 SRS ports)
- X2: rank 2 or max rank=2 (for 2 panels each with 2 ports, or selecting 2 SRS ports)
- X3: rank 1 or max rank=1 (for 4 panels each with 1 port or selecting 1 SRS port)

In one example, the index I depends on the coherence type reported by the UE.
- For a UE capable of NC and 4 ports, I is fixed to X3, hence may not be reported.
- For a UE capable of PC and 4 ports, I can be X2 or X3, hence may be reported (e.g., via a 1 bit reporting).
- For a UE capable of FC and 4 ports, I can be X1 or X2 or X3, hence may be reported (e.g., via a 2 bit reporting).

In one example, the index I does not depend on the coherence type reported by the UE.
- For a UE capable of 4 ports, I can be X1 or X2 or X3, hence may be reported (e.g., via a 2 bit reporting).

In one example, for an SRS resource with 4 SRS ports, the index I indicates one of the following.
- X1: rank 4 or max rank=4 (for 1 panel with 4 ports, or selecting 4 SRS ports)
- X2: rank 2 or max rank=2 (for 2 panels each with 2 ports, or selecting 2 SRS ports)
- X3: rank 1 or max rank=1 (for 4 panels each with 1 port or selecting 1 SRS port)
- X4: rank 4 or max rank=4 (for 3 panels one panel with 2 ports, or selection 2 SRS ports and 2 panels each with 1 port, or selecting 1 SRS ports)

In one example, the index I depends on the coherence type reported by the UE.
- For a UE capable of NC and 4 ports, I is fixed to X3, hence may not be reported.
- For a UE capable of PC and 4 ports, I can be X2 or X3 or X4, hence may be reported (e.g., via a 2 bit reporting).
- For a UE capable of FC and 4 ports, I can be X1 or X2 or X3, hence may be reported (e.g., via a 2 bit reporting).

In one example, the index I does not depend on the coherence type reported by the UE.
- For a UE capable of 4 ports, I can be X1 or X2 or X3 or X4, hence may be reported (e.g., via a 2 bit reporting).

In one example, for an SRS resource with 2 SRS ports, the index I indicates one of the following.
- Y1: rank 2 or max rank=2 (for 1 panel with 2 ports, or selecting 2 SRS ports)
- Y3: rank 1 or max rank=1 (for 2 panels each with 1 port or selecting 1 SRS port)

In one example, the index I depends on the coherence type reported by the UE.
- For a UE capable of NC and 2 ports, I is fixed to Y3, hence may not be reported.
- For a UE capable of FC and 2 ports, I can be Y1 or Y3, hence may be reported (e.g., via a 1 bit reporting).

In one example, the index I does not depends on the coherence type reported by the UE.
- For a UE capable of 2 ports, I can be Y1 or Y3, hence may be reported (e.g., via a 1 bit reporting).

In one example, the NW configures the set of allowed rank values for the index I or the NW configures an association between the index I and rank values (for selection of SRS antenna ports or for the selection of panel). This configuration can be subject to UE capability reported by the UE, which for example can be a list of supported UE capability values (or value set/sets) including rank values. The UE determines the index I based on the NW configuration, and the bitwidth of index I reporting is 0, 1, 2, or 2 bits if the number of supported rank values for the reporting of the index I is 1, 2, 3, or 4, respectively.

In one example, the index I indicates a rank value corresponding to a reported SSBRI/CRI in a beam reporting instance. The details are the same as another example described herein except that for 4 SRS ports, the index I is allowed to take a value indicating rank 3 (or selection of 3 SRS ports or selection of a panel with 3 ports).

For an SRS resource with 4 SRS ports, the index I indicates one of the following.
- X1: rank 4 or max rank=4 (for 1 panel with 4 ports, or selecting 4 SRS ports)
- X2: rank 2 or max rank=2 (for 2 panels each with 2 ports, or selecting 2 SRS ports)
- X3: rank 1 or max rank=1 (for 4 panels each with 1 port or selecting 1 SRS port)
- X4: rank 3 or max rank=3 (for 1 panel each with 3 ports, or selecting 3 SRS ports)

In one example, the index I depends on the coherence type reported by the UE.
- For a UE capable of NC and 4 ports, I is fixed to X3, hence may not be reported.
- For a UE capable of PC and 4 ports, I can be X2 or X3, hence may be reported (e.g., via a 1 bit reporting).
- For a UE capable of FC and 4 ports, I can be X1 or X2 or X3 or X4, hence may be reported (e.g., via a 2 bit reporting).

In one example, the index I does not depends on the coherence type reported by the UE.
- For a UE capable of 4 ports, I can be X1 or X2 or X3 or X4, hence may be reported (e.g., via a 2 bit reporting).

In one example, the NW configures the set of allowed rank values for the index I or the NW configures an association between the index I and rank values (for selection of SRS antenna ports or for the selection of panel). This configuration can be subject to UE capability reported by the UE, which for example can be a list of supported UE capability values (or value set/sets) including rank values. The UE determines the index I based on the NW configuration, and the bitwidth of index I reporting is 0, 1, 2, or 2 bits if the number of supported rank values for the reporting of the index I is 1, 2, 3, or 4, respectively.

In one example, the index I indicates a rank value corresponding to a reported SSBRI/CRI in a beam reporting instance. The details are the same as another example described herein except that for 4 SRS ports, the index I is allowed to take a value indicating rank 3 (or selection of 3 SRS ports or selection of a panel with 3 ports).

For an SRS resource with 4 SRS ports, the index I indicates one of the following.
- X1: rank 4 or max rank=4 (for 1 panel with 4 ports, or selecting 4 SRS ports)
- X2: rank 2 or max rank=2 (for 2 panels each with 2 ports, or selecting 2 SRS ports)
- X3: rank 1 or max rank=1 (for 4 panels each with 1 port or selecting 1 SRS port)
- X4: rank 3 or max rank=3 (for 1 panel each with 3 ports, or selecting 3 SRS ports)
- X5: rank 2+1 or max rank=2+1 (for 3 panels, 1 panel with 2 ports, or selecting 2 SRS ports and 2 panels each with 1 port or selection 1 SRS port)
- X6: rank 3+1 or max rank=3+1 (for 2 panels, 1 panel with 3 ports, or selecting 3 SRS ports and 1 panel with 1 port or selecting 1 SRS port)

In one example, the index I depends on the coherence type reported by the UE.
- For a UE capable of NC and 4 ports, I is fixed to X3, hence may not be reported.
- For a UE capable of PC and 4 ports, I can be X2 or X3, X5 hence may be reported (e.g., via a 2 bit reporting).
- For a UE capable of FC and 4 ports, I can be X1 or X2 or X3 or X4 or X5 or X6 hence may be reported (e.g., via a 3 bit reporting).

In one example, the index I does not depends on the coherence type reported by the UE.
- For a UE capable of 4 ports, I can be X1 or X2 or X3 or X4 or X5 or X6, hence may be reported (e.g., via a 3 bit reporting).

In one example, the NW configures the set of allowed rank values for the index I or the NW configures an association between the index I and rank values (for selection of SRS antenna ports or for the selection of panel). This configuration can be subject to UE capability reported by the UE, which for example can be a list of supported UE capability values (or value set/sets) including rank values. The UE determines the index I based on the NW configuration, and the bitwidth of index I reporting is 0, 1, 2, or 2 bits if the number of supported coherence types or selection of SRS antenna ports for the reporting of the index I is 1, 2, 3, or 4, respectively.

In one embodiment, a UE reports via its capability reporting a list of UE capability values (or value set/sets), the UE capability value (or value set/sets) including an information about the supported number of SRS antenna ports, and the UE, based on its reported capability, is configured with a reporting of a number of SRS antenna ports or a maximum number of SRS antenna ports in the beam report.

As shown in FIG. 14, a UE is configured to measure (receive) $P_1$ DL measurement RS resources (such as CSI-RS or SSB), where $P_1 \geq 1$, details as explained herein.

The UE is further configured to use the measurement (based on the received DL measurement RS resources) to determine a beam report and report it via an UL channel (e.g., PUCCH or PUSCH), as configured by the higher layer parameter CSI-ReportConfig.

The beam report includes $N \geq 1$ pairs of (R, I) where R is a resource indicator, and I is an index corresponding to the reported R. In one example, R is SSBRI indicating SSB index, or CRI indicating CSI-RS resource index. In one example, the beam report also include a beam metric corresponding to (or associated with) each reported resource indicator R. In one example, each beam metric is L1-RSRP (as in Rel. 15). In one example, each beam metric is L1-SINR (as in Rel. 16). In one example, each beam metric is L1-RSRP or L1-SINR based on configuration, which could be subject to UE capability reported by the UE. When N>1, the beam metrics are reported in a differential manner (as in Rel.15/16) with 7 bits for the first (absolute) beam metric and 4 bits for each of the remaining N−1 (differential) beam metrics with respect to the first beam metric, the details of this differential reporting is as described in Rel. 15/16 NR specification.

In one example, the index I indicates a correspondence between a CSI-RS and/or SSB resource index (indicated via R) and a UE capability value from a list of UE capability values (or value set/sets) reported by the UE (via UE capability signaling). In one example, the index I is an index of a UE capability value from a list of UE capability values (or value set/sets). The details of the list of UE capability values (or value set/sets) are described later in this disclosure. The UE shall not update or is expected to maintain the correspondence between beam reporting instances.

In one example, the beam report is configured via reportQuantity in CSI-ReportConfig that is set to an existing (Rel. 15/16) value, i.e., to 'cri-RSRP' or 'ssb-Index-RSRP' or 'cri-SINR', or 'ssb-Index-SINR'.

In one example, the beam report is configured via reportQuantity in CSI-ReportConfig that is set to a new value, i.e., 'cri-RSRP-r17' or 'ssb-Index-RSRP-r17' or 'cri-SINR-r17', or 'ssb-Index-SINR-r17', where the term 'cri' or 'ssb-Index' corresponds to the resource indicator, the term 'RSRP' or 'SINR' corresponds to the beam metric, and the term 'r17' corresponds to the index I.

- In one example, the term "r17" is replaced with 'CapabilityIndex', i.e., the new value is 'cri-RSRP-CapabilityIndex', 'ssb-Index-RSRP-CapabilityIndex', 'cri-SINR-CapabilityIndex', or 'ssb-Index-SINR-CapabilityIndex'.
- In one example, the term "r17" is replaced with 'SetIndex', i.e., the new value is 'cri-RSRP-SetIndex', 'ssb-Index-RSRP-SetIndex', 'cri-SINR-SetIndex', or 'ssb-Index-SINR-SetIndex'.
- In one example, the term "r17" is replaced with 'ValueIndex', i.e., the new value is 'cri-RSRP-ValueIndex', 'ssb-Index-RSRP-ValueIndex', 'cri-SINR-ValueIndex', 'ssb-Index-SINR-ValueIndex'.
- In one example, the term "r17" is replaced with 'ValueSetIndex', i.e., the new value is 'cri-RSRP-ValueSetIndex', 'ssb-Index-RSRP-ValueSetIndex', 'cri-SINR-ValueSetIndex', 'ssb-Index-SINR-ValueSetIndex'.
- In one example, the term "r17" is replaced with 'CapabilityValueSetIndex', i.e., the new value is 'cri-RSRP-CapabilityValueSetIndex', 'ssb-Index-RSRP-CapabilityValueSetIndex', 'cri-SINR-CapabilityValueSetIndex', 'ssb-Index-SINR-CapabilityValueSetIndex'.
- In one example, the term "r17" is replaced with 'CapabilityValueIndex', i.e., the new value is 'cri-RSRP-CapabilityValueIndex', 'ssb-Index-RSRP-CapabilityValueIndex', 'cri-SINR-CapabilityValueIndex', 'ssb-Index-SINR-CapabilityValueIndex'.
- In one example, the term "r17" is replaced with 'CapabilitySetIndex', i.e., the new value is 'cri-RSRP-CapabilitySetIndex', 'ssb-Index-RSRP-CapabilitySetIndex', 'cri-SINR-CapabilitySetIndex', 'ssb-Index-SINR-CapabilitySetIndex'.

The index I is determined/configured according to at least one of the following examples.

In one example, the index I indicates a number of SRS antenna ports or a maximum number of SRS antenna ports corresponding to a reported SSBRI/CRI in a beam reporting instance.

In one example, for an SRS resource with 4 SRS ports, the index I indicates one of the following.
- X1: number of SRS antenna ports=4 or maximum number of SRS antenna ports=4 (for 1 panel with 4 ports, or selecting 4 SRS ports)
- X2: number of SRS antenna ports=2 or max number of SRS antenna ports=2 (for 2 panels each with 2 ports, or selecting 2 SRS ports)
- X3: number of SRS antenna ports=1 or max number of SRS antenna ports=1 (for 4 panels each with 1 port or selecting 1 SRS port)

In one example, the index I depends on the coherence type reported by the UE.
- For a UE capable of NC and 4 ports, I is fixed to X3, hence may not be reported.
- For a UE capable of PC and 4 ports, I can be X2 or X3, hence may be reported (e.g., via a 1 bit reporting).
- For a UE capable of FC and 4 ports, I can be X1 or X2 or X3, hence may be reported (e.g., via a 2 bit reporting).

In one example, the index I does not depend on the coherence type reported by the UE.
- For a UE capable of 4 ports, I can be X1 or X2 or X3, hence may be reported (e.g., via a 2 bit reporting).

In one example, for an SRS resource with 4 SRS ports, the index I indicates one of the following.
- X1: number of SRS antenna ports=4 or maximum number of SRS antenna ports=4 (for 1 panel with 4 ports, or selecting 4 SRS ports)
- X2: number of SRS antenna ports=2 or max number of SRS antenna ports=2 (for 2 panels each with 2 ports, or selecting 2 SRS ports)
- X3: number of SRS antenna ports=1 or max number of SRS antenna ports=1 (for 4 panels each with 1 port or selecting 1 SRS port)
- X4: number of SRS antenna ports=4 or maximum number of SRS antenna ports=4 (for 3 panels one panel with 2 ports, or selection 2 SRS ports and 2 panels each with 1 port, or selecting 1 SRS ports)

In one example, the index I depends on the coherence type reported by the UE.
- For a UE capable of NC and 4 ports, I is fixed to X3, hence may not be reported.
- For a UE capable of PC and 4 ports, I can be X2 or X3 or X4, hence may be reported (e.g., via a 2 bit reporting).
- For a UE capable of FC and 4 ports, I can be X1 or X2 or X3, hence may be reported (e.g., via a 2 bit reporting).

In one example, the index I does not depend on the coherence type reported by the UE.
- For a UE capable of 4 ports, I can be X1 or X2 or X3 or X4, hence may be reported (e.g., via a 2 bit reporting).

In one example, for an SRS resource with 2 SRS ports, the index I indicates one of the following.
- Y1: number of SRS antenna ports=2 or max number of SRS antenna ports=2 (for 1 panel with 2 ports, or selecting 2 SRS ports)
- Y3: number of SRS antenna ports=1 or max number of SRS antenna ports=1 (for 2 panels each with 1 port or selecting 1 SRS port)

In one example, the index I depends on the coherence type reported by the UE.
- For a UE capable of NC and 2 ports, I is fixed to Y3, hence may not be reported.
- For a UE capable of FC and 2 ports, I can be Y1 or Y3, hence may be reported (e.g., via a 1 bit reporting).

In one example, the index I does not depends on the coherence type reported by the UE.
- For a UE capable of 2 ports, I can be Y1 or Y3, hence may be reported (e.g., via a 1 bit reporting).

In one example, the NW configures the set of allowed number of SRS antenna ports for the index I or the NW configures an association between the index I and number of SRS antenna ports. This configuration can be subject to UE capability reported by the UE, which for example can be a list of supported UE capability values (or value set/sets) including number of SRS antenna ports. The UE determines the index I based on the NW configuration, and the bitwidth of index I reporting is 0, 1, 2, or 2 bits if the number SRS antenna ports for the reporting of the index I is 1, 2, 3, or 4, respectively.

In one example, the index I indicates a number of SRS antenna ports or a maximum number of SRS antenna ports corresponding to a reported SSBRI/CRI in a beam reporting instance. The details are the same as examples described herein except that for 4 SRS ports, the index I is allowed to take a value indicating number of SRS antenna ports 3 or max number of SRS antenna ports=3 (or selection of 3 SRS ports or selection of a panel with 3 ports).

For an SRS resource with 4 SRS ports, the index I indicates one of the following.

X1: number of SRS antenna ports=4 or max number of SRS antenna ports=4 (for 1 panel with 4 ports, or selecting 4 SRS ports)

X2: number of SRS antenna ports 2 or max number of SRS antenna ports=2 (for 2 panels each with 2 ports, or selecting 2 SRS ports)

X3: number of SRS antenna ports 1 or max number of SRS antenna ports=1 (for 4 panels each with 1 port or selecting 1 SRS port)

X4: number of SRS antenna ports 3 or max number of SRS antenna ports=3 (for 1 panel each with 3 ports, or selecting 3 SRS ports)

In one example, the index I depends on the coherence type reported by the UE.

For a UE capable of NC and 4 ports, I is fixed to X3, hence may not be reported.

For a UE capable of PC and 4 ports, I can be X2 or X3, hence may be reported (e.g., via a 1 bit reporting).

For a UE capable of FC and 4 ports, I can be X1 or X2 or X3 or X4, hence may be reported (e.g., via a 2 bit reporting).

In one example, the index I does not depends on the coherence type reported by the UE.

For a UE capable of 4 ports, I can be X1 or X2 or X3 or X4, hence may be reported (e.g., via a 2 bit reporting).

In one example, the NW configures the set of allowed number of SRS antenna ports for the index I or the NW configures an association between the index I and number of SRS antenna ports. This configuration can be subject to UE capability reported by the UE, which for example can be a list of supported UE capability values (or value set/sets) including number of SRS antenna ports. The UE determines the index I based on the NW configuration, and the bitwidth of index I reporting is 0, 1, 2, or 2 bits if the number SRS antenna ports for the reporting of the index I is 1, 2, 3, or 4, respectively.

In one example, the index I indicates a number of SRS antenna ports or a maximum number of SRS antenna ports corresponding to a reported SSBRI/CRI in a beam reporting instance. The details are the same as examples described herein except that for 4 SRS ports, the index I is allowed to take a value indicating number of SRS antenna ports 3 or max number of SRS antenna ports=3 (or selection of 3 SRS ports or selection of a panel with 3 ports).

For an SRS resource with 4 SRS ports, the index I indicates one of the following.

X1: number of SRS antenna ports=4 or max number of SRS antenna ports=4 (for 1 panel with 4 ports, or selecting 4 SRS ports)

X2: number of SRS antenna ports 2 or max number of SRS antenna ports=2 (for 2 panels each with 2 ports, or selecting 2 SRS ports)

X3: number of SRS antenna ports 1 or max number of SRS antenna ports=1 (for 4 panels each with 1 port or selecting 1 SRS port)

X4: number of SRS antenna ports 3 or max number of SRS antenna ports=3 (for 1 panel each with 3 ports, or selecting 3 SRS ports)

X5: number of SRS antenna ports 2+1 or max number of SRS antenna ports=2+1 (for 3 panels, 1 panel with 2 ports, or selecting 2 SRS ports and 2 panels each with 1 port or selection 1 SRS port)

X6: number of SRS antenna ports 3+1 or max number of SRS antenna ports=3+1 (for 2 panels, 1 panel with 3 ports, or selecting 3 SRS ports and 1 panel with 1 port or selecting 1 SRS port)

In one example, the index I depends on the coherence type reported by the UE.

For a UE capable of NC and 4 ports, I is fixed to X3, hence may not be reported.

For a UE capable of PC and 4 ports, I can be X2 or X3, X5 hence may be reported (e.g., via a 2 bit reporting).

For a UE capable of FC and 4 ports, I can be X1 or X2 or X3 or X4 or X5 or X6 hence may be reported (e.g., via a 3 bit reporting).

In one example, the index I does not depends on the coherence type reported by the UE.

For a UE capable of 4 ports, I can be X1 or X2 or X3 or X4 or X5 or X6, hence may be reported (e.g., via a 3 bit reporting).

In one example, the NW configures the set of allowed number of SRS antenna ports for the index I or the NW configures an association between the index I and number of SRS antenna ports. This configuration can be subject to UE capability reported by the UE, which for example can be a list of supported UE capability values (or value set/sets) including number of SRS antenna ports. The UE determines the index I based on the NW configuration, and the bitwidth of index I reporting is 0, 1, 2, or 2 bits if the number SRS antenna ports for the reporting of the index I is 1, 2, 3, or 4, respectively.

In one embodiment, a UE reports via its capability reporting a list of UE capability values (or value set/sets), the UE capability value (or value set/sets) including an information about the supported number of SRS resources, and the UE, based on its reported capability, is configured with a reporting of a number of SRS resources or a maximum number of SRS resources in the beam report. In one example, each SRS resource is a 1-port resource. The rest of the embodiment is the same as described herein except that number of SRS antenna ports is replaced with number of SRS resources.

In one embodiment, the indication of coherence type, the rank value, or number of SRS antenna ports can be extended from one to multiple reporting quantities where a reporting quantity is either coherence type, the rank value, or number of SRS antenna ports.

In one example, the beam report includes (R, I), where R is a resource indicator (SSBRI/CRI) and the index I is a joint index indicating N>1 reporting quantities.

In one example, the beam report includes (R, I), where R is a resource indicator (SSBRI/CRI) and the index I=[$I_1$, . . . $I_N$] comprises N indices, and i-th index $I_i$ corresponds to i-th reporting quantity.

In one example, the beam report includes (R, I), where R is a joint indicator indicating N>1 resource indicators (each either SSBRI or CRI) and the index I is a joint index indicating N>1 reporting quantities.

In one example, the beam report includes (R, I), where R is a joint indicator indicating N>1 resource indicators (each either SSBRI or CRI) and the index I=[$I_1$, . . . $I_N$] comprises N indices, and i-th index $I_i$ corresponds to i-th reporting quantity.

In one example, the beam report includes (R, I), where R=[$R_1$, . . . $R_N$] comprises N resource indicators, and i-th indicator $R_i$ is a resource indicator (SSBRI or CRI) and the index I is a joint index indicating N>1 reporting quantities.

In one example, the beam report includes (R, I), where R=[$R_1, \ldots R_N$] Comprises, and i-th indicator $R_i$ is a resource indicator (SSBRI or CRI) and the index I=[$I_1, \ldots I_N$] comprises N indices, and i-th index $I_i$ corresponds to i-th reporting quantity.

At least one of the following is used/configured regarding N.

In one example, N is fixed (e.g., N=2).

In one example, N depends on the max number of SRS ports supported by the UE.

In one example, N is configured, e.g., from {1,2} or {1,2,4} or {1,2,3,4}.

In one example, N is configured from {1,2} or {1,2,4} or {1,2,3,4} if the UE supports a maximum of 4 SRS ports, and from {1,2} if the UE supports a maximum of 2 SRS ports, where the maximum number of supported SRS ports is reported by the UE as part of UE capability.

In one example, N is reported by the UE as part of the beam report, or as part of the UE capability reporting. When N is reported as part of the beam report, then a two-part UCI can be used, wherein UCI part 1 include beam report for a fixed number (e.g., 1) reporting quantities, and UCI part 2 includes the remaining (e.g., N−1) reporting quantities, and the information about the remaining reporting quantities can be included in UCI part 1.

In one embodiment, a UE can be configured with multiple SRS resource sets with different number of SRS antenna ports, where the SRS resources in a SRS resource set have the same number of SRS antenna ports. In one example, multiple SRS resource sets can be used to distinguish multiple antenna panels at the UE.

Or, a UE can be configured with multiple SRS resource sets with different number of SRS antenna ports, where the SRS resources in an SRS resource set have different number of SRS antenna ports. In one example, multiple SRS resource sets can be used to distinguish multiple antenna panels at the UE.

Or, a UE can be configured with multiple SRS resource sets with different number of SRS antenna ports, where the SRS resources in an SRS resource set have the same or different number of SRS antenna ports. In one example, multiple SRS resource sets can be used to distinguish multiple antenna panels at the UE.

Alternatively, a UE can be configured with multiple SRS resources with different number of SRS antenna ports, where the multiple SRS resources are within the same SRS resource set. In one example, multiple SRS resources can be used to distinguish multiple antenna panels at the UE.

In one example, this can be configured only when the UE is configured with a codebook-based UL transmission (e.g., via the higher layer parameter txConfig set to 'codebook').

In one example, this can be configured only when the UE is configured with a non-codebook-based UL transmission (e.g., via the higher layer parameter txConfig set to 'nonCodebook').

In one example, this can be configured for both cases when the UE is configured with a codebook-based UL transmission (e.g., via the higher layer parameter txConfig set to 'codebook') or when the UE is configured with a non-codebook-based UL transmission (e.g., via the higher layer parameter txConfig set to 'nonCodebook').

The number (M) of SRS resource sets or SRS resources can be equal to number of panel entities (M), where a panel entity is functionally equivalent to any of the following.

A transmit-receive (Tx-Rx) entity such as antenna panel, transmit-receive point (TRP), antenna port, antenna, antenna group, antenna port group, remote radio head (RRH).

A resource set comprising one or multiple resources (SRS resource set, CSI-resource set).

A resource or resources (SRS, CSI-RS, SSB).

A transmission process.

The value M is according to at least one of the following example.

In one example, it is fixed, e.g., 2, 3, or 4. The fixed value may depend on the number of antenna ports at the UE.

In one example, it is based on UE capability from {1,2}, {1,2,3}, {1,2,3,4}, {2,3}, {2,3,4}, or {2,4}.

In one example, it is based on UE capability which is in terms of number of different max number of SRS ports.

For 2 SRS ports, {1_2} or {1_2, 2_2}, where x_y indicates the UE can be configured with two SRS resources or resource sets with x and y SRS ports.

For 4 SRS ports, {1_2, 1_4, 2_4, 1_2_4} or {1_2, 1_3, 1_4, 2_3, 3_4, 2_4, 1_2_4, 1_2_3, 1_3_4, 2_3_4, 1_2_3_4}, x_y_z indicates the UE can be configured with three SRS resources or resource sets with x, y and z SRS ports In one example, the number or the maximum number (M) of SRS resource sets with different number of SRS antenna ports depends on the number of antenna ports (Tx-Rx or RF chains or power amplifiers) at the UE. For example, M=2 for a UE with 2 antenna ports, and M=2 or 3 for a UE with 4 antenna ports.

For 2 sets, the different number of SRS antenna ports can be (N1, N2)=(2,1), (4,1), or (4,2).

For 3 sets, the different number of SRS antenna ports can be (N1, N2, N3)=(4,2,1).

For a UE with 2 antenna ports, (N1, N2)=(2,1).

For a UE with 4 antenna ports, (N1, N2)=(2,1), (4,1), (4,2) and (N1, N2, N3)=(4,2,1).

The number ($N_{SRS}$) of SRS resources in each SRS resource set can be according to at least one of the following examples.

In one example, $N_{SRS}$ is fixed, e.g., 2.

In one example, $N_{SRS}$ E {1, ..., m} where m is a maximum value which can be determined based on UE capability reporting. In one example, m is fixed to 2. In one example, m can be reported from {2,3}, {2,3}, {2,4}, {3,4} etc.

In one example, the maximum value m is the same for all resource sets. In one example, the maximum value m is separate for each set.

In one example, the total number of SRS resources across all SRS resource sets can be a maximum value n which can be fixed (e.g., 4) or can be determined based on UE capability reporting. The number of SRS resources in each resource set can be any value {1,2, ... } as long as the total number of SRS resources across all resource sets is less or equal to n.

In one embodiment, the UE is further indicated with a SRS resource indicator (SRI), e.g., via UL-related DCI, which is based on the SRS resources corresponding to one SRS resource set (S) among the multiple SRS resource sets (S1, S2, ... ), where the SRS resource set (S) can be aligned with the UE reported information corresponding to the index I. In one example, the information about the SRS resource set (S) that is aligned with the UE reported information is provided according to at least one of the following examples.

In one example, an SRS resource set indicator is provided/indicated via UL-DCI (e.g., DCI format 0_1 or 0_2 in NR) that indicates the information (e.g., index) about the SRS resource set (S).

In one example, the information (e.g., index) about the SRS resource set (S) is provided/indicated jointly with the SRI. For example, SRI can indicate an index pair (a,b), where a=an index of the SRS resource set, and b=an index of an SRS resource within the SRS resource set with index a. An example is illustrated in Table 21. The payload of SRI indication is then $\lceil \log_2(\Sigma_{i=1}^{t} N_i) \rceil$ bits, where t is the number of SRS resource sets, and $N_i$ is the number of SRS resources in the i-th SRS resource set.

In one example, the information (e.g., index) about the SRS resource set (S) is provided/indicated via UL BWP switch. For instance, the UE can be configured with multiple UL BWPs, each with different number of SRS ports, and the information (e.g., index) about the SRS resource set (S) is provided/indicated by updating/indicating an index of one of the configured UL BWPs (e.g., whose number of SRS ports is aligned with the UE reported information). Such UL BWP switch/update can be indicated via UL-DCI (e.g., DCI format 0_1 or 0_2 in NR).

TABLE 21

| SRI | SRS resource set index (a) | SRS resource index (b) |
|---|---|---|
| 0 | 0 | 0 |
| 1 | 0 | 1 |
| ... | ... | ... |
| $N_1 - 1$ | 0 | $N_1 - 1$ |
| $N_1$ | 1 | 0 |
| $N_1 + 1$ | 1 | 1 |
| ... | ... | ... |
| $N_1 + N_2 - 1$ | 1 | $N_2 - 1$ |

In one embodiment, which is similar to another embodiment described herein except that a different number of SRS antenna ports is replaced with one of the following.
different maximum number of SRS antenna ports
different rank (or UL rank)
different maximum rank (or UL rank)
different number of UL MIMO layers
different maximum number of UL MIMO layers
different maximum number of antenna ports
different maximum number of RF chains
different maximum number of PUSCH ports
different maximum number of PUCCH ports In one embodiment, a panel entity corresponds to a reported CSI-RS and/or SSB resource index in a beam reporting instance. The correspondence between a panel entity and a reported CSI-RS and/or SSB resource index is informed to NW. Note that the correspondence between a CSI-RS and/or SSB resource index and a panel entity is determined by the UE (analogous to Rel-15/16). The UE reports a maximum number of SRS ports for each panel entity (e.g., as part of UE capability).

The UE can be configured with multiple SRS resources or resources sets with different Z, where Z is one of maximum number of UL MIMO layers or (max supported) number of SRS ports or number of resources (e.g., SRS, CSI-RS, SSB) or one of the quantities described herein.

The UE is further indicated with a SRS resource indicator (SRI), e.g., via UL-related DCI, which is based on the SRS resources corresponding to one SRS resource set among the multiple SRS resource sets, where the SRS resource set can be aligned with the UE capability for the panel entity.

The UE is further configured to perform measurement, and report a beam report as described herein.

In one embodiment, the UE is configured with multiple SRS resources with the same number of SRS ports (e.g., 1-port SRS resources for non-codebook-based UL transmission) or different number of SRS ports (e.g., for codebook-based UL transmission) within an SRS resource set (cf. ul-FullPowerTransmission=fullPowerMode2 in Rel. 16 NR specification). In one example, such a configuration is configured when the UE is equipped with multiple antenna panels, or when the UE reports (e.g., via UE capability reporting) that it is capable of supporting panel selection/activation or capable of supporting/reporting different values for the max supported number of SRS ports (as described in this disclosure). In one example, the SRS resource set is configured with higher layer parameter usage set to 'codebook' indicating codebook-based UL transmission (cf. section 6.1.1.1 of REF9). In one example, the SRS resource set is configured with higher layer parameter usage set to 'codebook' indicating codebook-based UL transmission (cf. section 6.1.1 of REF9) or 'nonCodebook' indicating non-codebook-based UL transmission (cf. section 6.1.1.2 of REF9).

For such as UE, an SRI field in UL-related DCI (e.g., DCI format 0_1 or 0_2 in NR specification) can be used to indicate one of the multiple SRS resources (e.g., for the case of codebook-based UL transmission). In particular, the SRI can indicate both (A) implicit acknowledgment (ACK) that NW successfully receives and follows the reported capability (correspondence index) and (B) an SRS resource from the multiple SRS resources that is aligned with (or corresponding to) a reported capability index, where the reported capability index indicates one of the capability types as described in this disclosure. For example, the one of the capability type can be max supported number of SRS ports reported by the UE together with the beam report. For the case of codebook-based UL transmission, the payload of the SRI field indication is $\lceil \log_2 N_{SRS} \rceil$ bits, where $N_{SRS}$ is the number of SRS resources in the configured SRS resource set.

For the case of non-codebook-based UL transmission, the SRI can indicate both (A) implicit acknowledgment (ACK) and (B) L SRS resource(s) from the multiple SRS resources that is (are) aligned with (or corresponding to) a reported capability index, where the reported capability index indicates one of the capability types as described in this disclosure. For example, the one of the capability type can be max supported number of SRS ports reported by the UE together with the beam report. Here, L is the number of layers (or rank value) for the non-codebook-based UL transmission). In one example, $1 \leq L \leq N_{SRS,x}$, where $N_{SRS,x}$ is the value of the max supported number of SRS ports reported by the UE. Also, for non-codebook-based UL transmission, each SRS resource can be a 1-port SRS resource.

At least one of the following examples is used/configured for the case of codebook-based UL transmission.

In one example, when the number of SRS resources is 2, one SRS resource with $n_1$ SRS ports and another SRS resource with $n_2$ SRS ports, the SRI field value can indicate one SRS resource and implicit ACK as described in Table 22. In one example, $(n_1, n_2)=(1,2)$ or $(2,1)$ for a UE with a maximum (or total) of 2 antenna ports (across all antenna panels). In one example, $(n_1, n_2)=(1,2)$ or $(2,1)$, $(1,4)$ or $(4,1)$, $(4,2)$ or $(2,4)$ for a UE with a maximum (or total) of 4 antenna ports (across all antenna panels).

TABLE 22

| SRI bit field mapped to index | SRS resource | Implicit ACK (UE interpretation/assumption) |
|---|---|---|
| 0 | $n_1$-port SRS resource | SRI = 0 is indicated if UE reports max supported number of SRS ports = $n_1$ → UE assumes NW successfully receives and follows the capability correspondence report.<br>Else, either NW doesn't follow or NW fails to receive (or both). |
| 1 | $n_2$-port SRS resource | SRI = 1 is indicated if UE reports max supported number of SRS ports = $n_2$ → UE assumes NW successfully receives and follows the capability correspondence report.<br>Else, either NW doesn't follow or NW fails to receive (or both) |

In one example, the number of SRS resources is 3. In one example, the number of SRS resources can be 3 only when the UE supports a maximum of 4 antenna ports.

In one example, when there are two SRS resources with $n_1$ SRS ports and one SRS resource with $n_2$ SRS ports, the SRI field value can indicate one SRS resource and implicit ACK as described in Table 23. In one example, $(n_1, n_2)=(1,2)$ or $(2,1)$ for a UE with a maximum (or total) of 2 antenna ports (across all antenna panels). In one example, $(n_1, n_2)\_(1,2)$ or $(2,1)$, $(1,4)$ or $(4,1)$, $(4,2)$ or $(2,4)$ for a UE with a maximum (or total) of 4 antenna ports (across all antenna panels).

In one example, when there are one SRS resource with $n_1$ SRS ports, one SRS resource with $n_2$ SRS ports, and one SRS resource with $n_3$ SRS ports, the SRI field value can indicate one SRS resource and implicit ACK as described in Table 24. In one example, $(n_1, n_2, n_3)=(1, 2,4), (1,4,2), (2,1,4), (2,4,1), (4,1,2),$ or $(4,2, 1)$.

TABLE 23

| SRI bit field mapped to index | SRS resource | Implicit ACK (UE interpretation/assumption) |
|---|---|---|
| 0 | $n_1$-port SRS resource 1 | SRI = 0 or 1 is indicated if UE reports max supported number of SRS ports = $n_1$ → UE assumes NW successfully receives and follows the capability correspondence report.<br>Else, either NW doesn't follow or NW fails to receive (or both) |
| 1 | $n_1$-port SRS resource 2 | |
| 2 | $n_2$-port SRS resource 1 | SRI = 2 is indicated if UE reports max supported number of SRS ports = $n_2$ → UE assumes NW successfully receives and follows the capability correspondence report.<br>Else, either NW doesn't follow or NW fails to receive (or both) |

TABLE 24

| SRI bit field mapped to index | SRS resource | Implicit ACK (UE interpretation/assumption) |
|---|---|---|
| 0 | $n_1$-port SRS resource 1 | SRI = 0 is indicated if UE reports max supported number of SRS ports = $n_1$ → UE assumes NW successfully receives and follows the capability correspondence report.<br>Else, either NW doesn't follow or NW fails to receive (or both) |
| 1 | $n_2$-port SRS resource 1 | SRI = 1 is indicated if UE reports max supported number of SRS ports = $n_2$ → UE assumes NW successfully receives and follows the capability correspondence report.<br>Else, either NW doesn't follow or NW fails to receive (or both) |
| 2 | $n_3$-port SRS resource 1 | SRI = 2 is indicated if UE reports max supported number of SRS ports = $n_3$ → UE assumes NW successfully receives and follows the capability correspondence report.<br>Else, either NW doesn't follow or NW fails to receive (or both) |

In one example, the number of SRS resources is 4. In one example, the number of SRS resources can be 4 only when the UE supports a maximum of 4 antenna ports.

In one example, when there are two SRS resources with $n_1$ SRS ports and two SRS resources with $n_2$ SRS ports, the SRI field value can indicate one SRS resource and implicit ACK as described in Table 25. In one example, $(n_1, n_2)=(1,2)$ or $(2,1)$ for a UE with a maximum (or total) of 2 antenna ports (across all antenna panels). In one example, $(n_1, n_2)=(1,2)$ or $(2,1)$, $(1,4)$ or $(4,1)$, $(4,2)$ or $(2,4)$ for a UE with a maximum (or total) of 4 antenna ports (across all antenna panels).

In one example, when there are three SRS resources with $n_1$ SRS ports and one SRS resource with $n_2$ SRS ports, the SRI field value can indicate one SRS resource and implicit ACK as described in Table 26. In one example, $(n_1, n_2)=(1,2)$ or $(2,1)$ for a UE with a maximum (or total) of 2 antenna ports (across all antenna panels). In one example, $(n_1, n_2)=(1,2)$ or $(2,1)$, $(1,4)$ or $(4,1)$, $(4,2)$ or $(2,4)$ for a UE with a maximum (or total) of 4 antenna ports (across all antenna panels).

In one example, when there are two SRS resources with $n_1$ SRS ports, one SRS resource with $n_2$ SRS ports, and one SRS resource with $n_3$ SRS ports, the SRI field value can indicate one SRS resource and implicit ACK as described in Table 27. In one example, $(n_1, n_2, n_3)=(1, 2, 4)$, $(1,4,2)$, $(2,1,4)$, $(2,4,1)$, $(4,1,2)$, or $(4,2,1)$.

TABLE 25

| SRI bit field mapped to index | SRS resource | Implicit ACK (UE interpretation/assumption) |
| --- | --- | --- |
| 0 | $n_1$-port SRS resource 1 | SRI = 0 or 1 is indicated if UE reports max supported number of SRS ports = $n_1$ → UE assumes NW successfully receives and follows the capability correspondence report. Else, either NW doesn't follow or NW fails to receive (or both) |
| 1 | $n_1$-port SRS resource 2 | |
| 2 | $n_2$-port SRS resource 1 | SRI = 2 or 3 is indicated if UE reports max supported number of SRS ports = $n_2$ → UE assumes NW successfully receives and follows the capability correspondence report. Else, either NW doesn't follow or NW fails to receive (or both) |
| 3 | $n_2$-port SRS resource 2 | |

TABLE 26

| SRI bit field mapped to index | SRS resource | Implicit ACK (UE interpretation/assumption) |
| --- | --- | --- |
| 0 | $n_1$-port SRS resource 1 | SRI = 0 or 1 or 2 is indicated if UE reports max supported number of SRS ports = $n_1$ → UE assumes NW successfully receives and follows the capability correspondence report. Else, either NW doesn't follow or NW fails to receive (or both) |
| 1 | $n_1$-port SRS resource 2 | |
| 2 | $n_1$-port SRS resource 3 | |
| 3 | $n_2$-port SRS resource 1 | SRI = 3 is indicated if UE reports max supported number of SRS ports = $n_2$ → UE assumes NW successfully receives and follows the capability correspondence report. Else, either NW doesn't follow or NW fails to receive (or both) |

TABLE 27

| SRI bit field mapped to index | SRS resource | Implicit ACK (UE interpretation/assumption) |
| --- | --- | --- |
| 0 | $n_1$-port SRS resource 1 | SRI = 0 or 1 is indicated if UE reports max supported number of SRS ports = $n_1$ → UE assumes NW successfully receives and follows the capability correspondence report. Else, either NW doesn't follow or NW fails to receive (or both) |
| 1 | $n_1$-port SRS resource 2 | |
| 2 | $n_2$-port SRS resource 1 | SRI = 2 is indicated if UE reports max supported number of SRS ports = $n_2$ → UE assumes NW successfully receives and follows the capability correspondence report. Else, either NW doesn't follow or NW fails to receive (or both) |

TABLE 27-continued

| SRI bit field mapped to index | SRS resource | Implicit ACK (UE interpretation/assumption) |
|---|---|---|
| 3 | $n_3$-port SRS resource 1 | SRI = 3 is indicated if UE reports max supported number of SRS ports = $n_3$ → UE assumes NW successfully receives and follows the capability correspondence report.<br>Else, either NW doesn't follow or NW fails to receive (or both) |

In one embodiment, which is a variation of another embodiment described herein, the ACK mechanism is explicit via a dedicated signaling.

In one example, a higher layer (RRC) parameter (new or existing parameter) is used to indicate the ACK.

In one example, a MAC CE indication (new or existing MAC CE) is used to indicate the ACK.

In one example, a DCI-based indication is used to indicate the ACK. For example, a 1-bit DCI field (or a code point value) in DCI (e.g., UL-DCI format 0_1 and 0_2) or in a dedicated DCI (separate from the UL-DCI) is used for this indication.

In this case, the payload of SRI indication depends on the explicit ACK. In particular, For the case of codebook-based UL transmission, the SRI payload is $\lceil \log_2 N_{SRS,x} \rceil$ bits, where $N_{SRS,x}$ is the number of SRS resources with x SRS ports in the configured SRS resource set. The bit field (or index) of the SRI indication is mapped to the indices of SRS resources in the SRS resource set whose number of SRS ports equals x.

In one embodiment, a UE is configured with multiple SRS resource sets (e.g., two SRS resource sets) wherein each SRS resource set includes SRS resource(s) with the same number of SRS ports, but the number of SRS ports is different across SRS resources sets. For instance, the UE is configured with two SRS resource sets, S1 and S2, where S1 includes SRS resource(s) with $n_1$ SRS ports and S2 includes SRS resource(s) with $n_2$ SRS ports, and $n_1 \neq n_2$. In one example, $n_1$ and $n_2$ belong to {1,2} for a UE with a total of 2 antenna ports, and belong to {1,2,4} or {2,4} for a UE with a total of 4 antenna ports. Note that the number of SRS ports is the same for all SRS resources within a SRS resource set, but it is different from one resource set to another (i.e., across sets). In one example, each SRS resource set includes only one SRS resource. In one example, each SRS resource set can include only one SRS resource or multiple SRS resources. In one example, the SRS resource sets correspond to (or associated with) the antenna panels at the UE. In one example, such a configuration of multiple SRS resource sets is configured when the UE is equipped with multiple antenna panels, or when the UE reports (e.g., via UE capability reporting) that it is capable of supporting panel selection/activation or capable of supporting/reporting different values for the max supported number of SRS ports (as described in this disclosure). In one example, the SRS resource sets are configured with higher layer parameter usage set to 'codebook' indicating codebook-based UL transmission (cf. section 6.1.1.1 of REF9).

For such as UE, an SRI field in UL-related DCI (e.g., DCI format 0_1 or 0_2 in NR specification) can be used to indicate one of the multiple SRS resources (e.g., for the case of codebook-based UL transmission). In particular, the SRI can indicate (A) implicit acknowledgment (ACK) that NW successfully receives and follows the reported capability (correspondence index), (B) one SRS resource set from the multiple SRS resource sets, and (C) a SRS resource from the SRS resource(s) within the indicated SRS resource set, where the indicated SRS resource set and SRS resource (B and C) are aligned with (or corresponding to) a reported capability index, where the reported capability index indicates one of the capability types as described in this disclosure. For example, the one of the capability type can be max supported number of SRS ports reported by the UE together with the beam report. For the case of codebook-based UL transmission, the payload of the SRI field indication is $\lceil \log_2 N_{SRS,tot} \rceil$ bits, where $N_{SRS,tot}$ is the total number of SRS resources across all configured SRS resource sets.

At least one of the following examples is used/configured for the case of codebook-based UL transmission.

In one example, when the number of SRS resource sets is 2, one SRS resource set with $n_1$-port SRS resource(s) and another SRS resource set with $n_2$-port SRS resource(s), the SRI field value can indicate one SRS resource set, one SRS resource, and implicit ACK as described in Table 28. In one example, $(n_1, n_2) = (1,2)$ or $(2,1)$ for a UE with a maximum (or total) of 2 antenna ports (across all antenna panels). In one example, $(n_1, n_2) = (1,2)$ or $(2,1)$, $(1,4)$ or $(4,1)$, $(4,2)$ or $(2,4)$ for a UE with a maximum (or total) of 4 antenna ports (across all antenna panels).

TABLE 28

| SRI bit field mapped to index | SRS resource set | SRS resource | Implicit ACK (UE interpretation/assumption) |
|---|---|---|---|
| 0 | 0 | $n_1$-port SRS resource | SRI = 0 is indicated if UE reports max supported number of SRS ports = $n_1$ → UE assumes NW successfully receives and follows the capability correspondence report.<br>Else, either NW doesn't follow or NW fails to receive (or both). |
| 1 | 1 | $n_2$-port SRS resource | SRI = 1 is indicated if UE reports max supported number of SRS ports = $n_2$ → UE assumes NW successfully receives |

TABLE 28-continued

| SRI bit field mapped to index | SRS resource set | SRS resource | Implicit ACK (UE interpretation/assumption) |
|---|---|---|---|
| 0 | 0 | 1 port resource | and follows the capability correspondence report. Else, either NW doesn't follow or NW fails to receive (or both) SRI = 0 is indicated if UE reports max supported number of SRS ports = 1→ UE assumes NW successfully receives and follows the capability correspondence report Else, either NW doesn't follow or NW fails to receive (or both) |
| 1 | 1 | 2 ports resource | SRI = 1 is indicated if UE reports max supported number of SRS ports = 2 → UE assumes NW successfully receives and follows the capability correspondence report Else, either NW doesn't follow or NW fails to receive (or both) |

In one example, the number of SRS resource sets is 2 and the number of SRS resources in each set is 2. There are two SRS resources with $n_1$ SRS ports in the first set and two SRS resources with $n_2$ SRS ports in the second set. The SRI field value can indicate one SRS resource set, one SRS resource, and implicit ACK as described in Table 29. In one example, $(n_1, n_2) = (1,2)$ or $(2,1)$ for a UE with a maximum (or total) of 2 antenna ports (across all antenna panels). In one example, $(n_1, n_2) = (1,2)$ or $(2,1)$, $(1,4)$ or $(4,1)$, $(4,2)$ or $(2,4)$ for a UE with a maximum (or total) of 4 antenna ports (across all antenna panels).

TABLE 29

| SRI bit field mapped to index | SRS resource set | SRS resource | Implicit ACK (UE interpretation/assumption) |
|---|---|---|---|
| 0 | 0 | $n_1$-port SRS resource 1 | SRI = 0 or 1 is indicated if UE reports max supported number of SRS ports = |
| 1 | | $n_1$-port SRS resource 2 | $n_1$ → UE assumes NW successfully receives and follows the capability correspondence report. Else, either NW doesn't follow or NW fails to receive (or both) |
| 2 | 1 | $n_2$-port SRS resource 1 | SRI = 2 or 3 is indicated if UE reports max supported number of SRS ports = |
| 3 | | $n_2$-port SRS resource 2 | $n_2$ → UE assumes NW successfully receives and follows the capability correspondence report. Else, either NW doesn't follow or NW fails to receive (or both) |

In one embodiment, a UE is configured with multiple SRS resource sets (e.g., two SRS resource sets) wherein each SRS resource set includes multiple SRS resource with the same number of SRS ports (e.g., 1-port SRS resources), but the number of SRS resources is different across SRS resources sets. In one example, the SRS resource sets are configured with higher layer parameter usage set to 'non-Codebook' indicating non-codebook-based UL transmission (cf. section 6.1.1.2 of REF9).

For the case of non-codebook-based UL transmission, the SRI can indicate (A) implicit acknowledgment (ACK), (B) one SRS resource set from the multiple SRS resource sets, and (C) L SRS resource(s) from the SRS resource(s) within the indicated SRS resource set, where the indicated SRS resource set and L SRS resources(s) (B and C) are aligned is (are) aligned with (or corresponding to) a reported capability index, where the reported capability index indicates one of the capability types as described in this disclosure. For example, the one of the capability type can be max supported number of SRS ports reported by the UE together with the beam report. Here, L is the number of layers (or rank value) for the non-codebook-based UL transmission). In one example, $1 \leq L \leq N_{SRS,x}$, where $N_{SRS,x}$ is the value of the max supported number of SRS ports reported by the UE. Also, for non-codebook-based UL transmission, each SRS resource can be a 1-port SRS resource.

In one embodiment, which is a variation of embodiments described herein, the ACK mechanism is explicit via a dedicated signaling.

In one example, a higher layer (RRC) parameter (new or existing parameter) is used to indicate the ACK.

In one example, a MAC CE indication (new or existing MAC CE) is used to indicate the ACK.

In one example, a DCI-based indication is used to indicate the ACK. For example, a 1-bit DCI field (or a code point value) in DCI (e.g., UL-DCI format 0_1 and 0_2) or in a dedicated DCI (separate from the UL-DCI) is used for this indication.

In this case, the payload of SRI indication depends on the explicit ACK. In particular, For the case of codebook-based UL transmission, the SRI payload is $\lceil \log_2 N_{SRS,x} \rceil$ bits, where $N_{SRS,x}$ is the total number of SRS resources with x SRS ports across all of the configured SRS resource sets. The bit field (or index) of the SRI indication is mapped to the indices of SRS resources across all the SRS resource sets whose number of SRS ports equals x.

In one embodiment, a UE equipped with multiple antenna panel is configured (by the NW) with $N_{SRS}>1$ SRS resources with different number of SRS ports within a SRS resource set (details as described herein). This configuration can be via higher layer (RRC) signaling. In one example, such an SRS resource set can be configured when the UE is further configured with at least one of the following examples regarding the UL transmission (e.g., of PUSCH).

In one example, the UL transmission corresponds to a full power transmission mode (e.g., full power mode 2 from Rel. 16 NR specification). An existing RRC parameter can be used for this purpose. One example of the existing RRC parameter is FullPowerTransmission-r16 being set to 'fullpowerMode2' (as supported in Rel.16 NR specification). According to this example, for a multi-panel UE, the UL transmission is configured by setting FullPowerTransmission-r16 to 'fullpowerMode2'.

In one example, the UL transmission configured via a new RRC parameter. One example of the new RRC parameter is FullPowerTransmission-r17 or MPUETransmission-r17.

In one example, the UL transmission configured via a new RRC parameter, however, the Rel.16 RRC parameter FullPowerTransmission-r16 is expected to be set to 'fullpowerMode2' when this new parameter is configured.

In one example, the above configuration examples can be used for codebook-based UL transmission only. In one example, they can be used for both codebook-based and non-codebook-based UL transmissions.

The payload (number of bits) of SRI indication (indicating one of the $N_{SRS}>1$ SRS resources) can be according to at least one of the following examples.

In one example, the SRI payload remains the same, i.e., $\lceil \log_2 N_{SRS} \rceil$ bits, regardless of the reported capability, i.e., a value v=max supported number of SRS ports reported by the UE together with the beam report.

In example, the SRI payload depends and is determined based on the reported capability i.e., a value v=max supported number of SRS ports reported by the UE together with the beam report.

When there is only one SRS resource (within the SRS resource set) that has the number of SRS ports equal to the reported value (v), then at least one of the following examples is used/configured.

In one example, the SRI payload=0, implying that the SRI field is absent (not indicated/configured). In this case, there is no signaling/indication/ACK (from NW to UE) regarding whether the NW received the beam report with the value v or whether it acknowledges the received value.

In one example, the SRI payload=0, implying that the SRI field is absent (not indicated/configured). The absence of the SRI field is indicated/ACKed (from NW to UE) via a medium/channel. The medium/channel can be RRC, or MAC CE, or a DCI (dedicated DCI different from UL-DCI, e.g., format 0_1 and 0_2). Alternatively, the medium/channel is a two-part DCI comprising DCI part 1 and DCI part 2, wherein the DCI part 1 includes an information (e.g., 1-bit field) to indicate whether the SRI field is absent (not indicated) or present (indicated) via the DCI part 2, and the DCI part 2 includes the SRI field when indicated so.

In one example, the SRI payload is 1-bit to indicate (or acknowledge) that the NW received the value v. In one example, the SRI value=0 is used for this ACK. In one example, the SRI value=1 is used for this ACK. In one example, the other SRI value (that is not used for ACK) is used for NACK (indicating that the NW either didn't receive the value v or doesn't follow the value v or both.

In one example, when the value v is less than the total number of antenna ports (across panels), the SRI payload is according to one or more examples described herein, and otherwise (when v=the total number of antenna ports (across panels), the SRI payload is according to another example described herein.

When there are more than one SRS resources (within the SRS resource set) with the number of SRS ports equal to the reported value (v), then the SRI is indicated, and it's payload (number of) is determined based on the number of such SRS resources (with v SRS ports). Let $N_{SRS,v}$ be the number of such SRS resources. At least one of the following examples is used/configured.

In one example, the SRI payload is $\lceil \log_2 N_{SRS,v} \rceil$ bits, and it indicates one of the $N_{SRS,v}$ SRS resources with v SRS ports.

In one example, the SRI payload is $\lceil \log_2 N_{SRS,v} \rceil+1$ bits, which indicates both ACK (from NW to UE in response to the reported v value) and one of the $N_{SRS,v}$ SRS resources with v SRS ports. In one example, 1-bit is used for the indication of ACK, and $\lceil \log_2 N_{SRS,v} \rceil$ bit is used for the indication of one of the $N_{SRS,v}$ SRS resources with v SRS ports. In one example, the SRI indication comprises two separate parts (sub-fields), one for ACK and another for the SRS resource indication.

In one example, the SRI payload is $\lceil \log 2(N_{SRS,v}+1) \rceil$ bits, where the $N_{SRS,v}$ SRI values (e.g., 0,1, ..., $N_{SRS,v}-1$) are used for the joint indication of the ACK and one of the SRS resources with v SRs ports, and one SRI value (e.g., SRI=$N_{SRS,v}$) is used for indicating NACK (indicating that the NW either didn't receive the value v or doesn't follow the value v or both.

In one example, whether the SRI payload remains the same ($\lceil \log_2 N_{SRS} \rceil$ bits) or changes ($\lceil \log_2 N_{SRS,v} \rceil$ bits as in examples described herein or $\lceil \log_2 N_{SRS,v} \rceil+1$ bits as in examples described herein or $\lceil \log_2(N_{SRS,v}+1) \rceil$ bits as in examples described herein according to the reported value v is indicated/configured (from NW to the UE) via a medium/channel. The medium/channel can be RRC, or MAC CE, or a DCI (dedicated DCI different from UL-DCI, e.g., format 0_1 and 0_2). Alternatively, the medium/channel is a two-part DCI comprising DCI part 1 and DCI part 2, wherein the DCI part 1 includes an information (e.g., 1-bit field) to indicate the SRI payload remains the same or changes, and the DCI part 2 includes the SRI field with the indicated payload.

In one example, the SRI indication and its payload is determined/configured according to an example which is a combination of examples described herein (when $N_{SRS,v}=1$) and (when $N_{SRS,v}>1$), where (a, b) is fixed or configured from {(1,4), (1,5), (1,6), (1,7), (2,4), (2,5), (2,6), (2,7), (3 or 3A, 4), (3 or 3A, 5), (3 or 3A, 6), (3 or 3A, 7)}.

In one example, the configuration as described above is subject to (condition on) a UE capability reporting.

In one example, the UE capability reporting include a feature group (FG) comprising a component indicating a multi-panel UE (MPUE) or a UE equipped with multiple antenna panels (Rel. 17). In one example such a UE must also support (hence report) the support for the full power mode 2 from Rel. 16 NR specification (ul-FullPwrMode2-MaxSRS-ResInSet-r16 and/or ul-FullPwrMode2-SRSConfig-diffNumSRSPorts-r16, TS 38.306).

In one example, the UE capability reporting include 2 FGs, one FG for the support of the MPUE and another FG for the support of the full power mode 2.

In one example, the UE capability reporting include 1 FG with 2 components, one component for the support of the MPUE and another component for the support of the full power mode 2.

May also include details from FG on SRS resource with different number of SRS ports In one example, the max value for the number of SRS resources $N_{SRS}$ (as in this embodiment) is fixed, e.g., $N_{SRS}=2$ or $N_{SRS}=3$ or $N_{SRS}=4$. In one example, the max value for the number of SRS resources $N_{SRS}$ can be up to x, where x can be configured or can be subject to a UE capability reporting (e.g., ul-FullPwrMode2-MaxSRS-ResInSet-r16). In one example, x=4. In one example, the UE report the value of x via UE capability reporting or via dynamic beam or CSI reporting.

In one example, the mapping between the SRI (bit field) or index and the indices of the SRS resources within the SRS resource set is one-to-one in increasing order, i.e., the lowest SRI (bit field) or index value (e.g., 0) is mapped to the SRS resource with the smallest resource ID and the smaller number of SRS ports. Three examples are shown in Table 30 through Table 32, where $n_1 < n_2$ and $I_{i,1} < I_{i,2}$ for i=1,2.

TABLE 30

$N_{SRS} = 2$

| Bit field mapped to index | SRI(S), $N_{SRS} = 2$ | (number of SRS ports, SRS resource ID) |
| --- | --- | --- |
| 0 | 0 | $(n_1, I_{1,1})$ |
| 1 | 1 | $(n_2, I_{2,1})$ |

TABLE 31

$N_{SRS} = 3$

| Bit field mapped to index | SRI(s), $N_{SRS} = 3$ | (number of SRS ports, SRS resource ID) |
| --- | --- | --- |
| 0 | 0 | $(n_1, I_{1,1})$ |
| 1 | 1 | $(n_1, I_{1,2})$ |
| 2 | 2 | $(n_2, I_{2,1})$ |
| 3 | Reserved | |

TABLE 32

$N_{SRS} = 4$

| Bit field mapped to index | SRI(S), $N_{SRS} = 4$ | (number of SRS ports, SRS resource ID) |
| --- | --- | --- |
| 0 | 0 | $(n_1, I_{1,1})$ |
| 1 | 1 | $(n_1, I_{1,2})$ |
| 2 | 2 | $(n_2, I_{2,1})$ |
| 3 | 3 | $(n_2, I_{2,2})$ |

In one embodiment, a UE equipped with multiple antenna panel is configured (by the NW) with $N_{SRS}>1$ SRS resources with different number of SRS ports within an SRS resource set (details as described herein).

The payload (number of bits) of TPMI/TRI indication can be according to at least one of the following examples.

In one example, the TPMI/TRI payload remains the same, regardless of the reported capability, i.e., a value v=max supported number of SRS ports reported by the UE together with the beam report.

In one example, the TPMI/TRI payload depends and is determined based on the reported capability i.e., a value v=max supported number of SRS ports reported by the UE together with the beam report.

In one embodiment, a UE equipped with multiple antenna panel is configured (by the NW) with $N_{SRS}>1$ SRS resources with different number of SRS ports within a SRS resource set (details as described herein).

The payload (number of bits) of both SRI and TPMI/TRI indication can be fixed or changing depending on the value of v, where the details are according to at least one of the examples described herein.

Various embodiments of the present disclosure recognize that when the UE equipped with multiple antenna panels, there could be a misalignment issue about the UL panel assumptions (i.e., UE panel(s) used for the UL transmission) between the joint-TCI or UL-TCI state update and the SRI indication when they are carried/indicated via two separate DCIs (e.g., joint/UL-TCI state indication via DL-DCI, and SRI indication via UL-DCI). For instance, the UE may determine its UL panel(s) depending on the joint/UL-TCI state update via a DL-DCI (e.g., format 1_1 or 1_2 with or without DL assignment). If an UL-DCI (e.g., format 0_1 or 1_1) indicates the SRI indicating an SRS resource which corresponds to the UL panel(s) that are not aligned with the UL panel(s) corresponding to (or indicated via or determined based on) the joint/UL-TCI state update, whether or not the UE may (or is desired to) switch the UL panel(s) according to the SRI indication is unclear and may lead to misalignment. If the UE switches the UL panel(s) according to the SRI indication, the UL spatial relation (or UL Tx beam(s)) for the switched UE panel(s) may be different from that for the indicated UL spatial relation via the joint/UL-TCI state indication.

Various embodiments of the present disclosure recognize that when the UE is configured to use PUSCH antenna ports that are the same as the SRS ports of the SRS resource(s) indicated via the SRI, both PUSCH and SRS ports are expected or desired to use the same UL spatial relation (or UL Tx beam). When the PUSCH follows the joint-UL-TCI state update, the SRS resource(s) indicated via the SRI are desired to follow the indicated joint/UL-TCI state.

Here, the UL spatial relation (or UL Tx beams(s)) is assumed to be configured/indicated via the Rel.17 unified TCI state definition wherein a joint-TCI or a UL-DCI state is indicated (e.g., via DL-DCI) to provide a source RS or source RSs that serve(s) as the UL spatial relation(s) for the UL transmission.

Accordingly, various embodiments of the present disclosure provide that the indicated SRS resource (via SRI) is aligned with the panel(s) associated with the source RS(s) contained in the indicated joint/UL-TCI state. Further, various embodiments of the present disclosure provide that the SRS resource(s) for the UL transmission (e.g., codebook-based or non-codebook-based) follow(s) the Rel.17 unified TCI state definition, i.e., joint/UL-TCI state.

In one embodiment, the joint/UL-TCI state update and the SRI indication are provided/indicated together in the same time slot. Since they are together in the same slot, the UL panel(s) are expected (or desired) to be the same or aligned for both joint/UL-TCI state update and SRI indications, i.e., the source RS indicated via the joint/UL-TCI state update and the SRS resource(s) indicated via the SRI indication are expected to correspond to the same UL panel(s).

In one example, the joint/UL-TCI state update is indicated via a DL-DCI (e.g., format 1_1 or 1_2 with or without DL assignment, and when higher layer TCIPresentInDCI is configured/enabled) and the SRI indication are provided/indicated via a UL-DCI (e.g., DCI format 0_1 or 0_2), and the two DCIs (DL-DCI and UL-DCI) can be present in the same time slot (e.g., when there is a need for UL panel switching).

In one example, the joint/UL-TCI state update is indicated via a UL-DCI (e.g., DCI format 0_1 or 0_2) which also indicates the SRI indication. Both joint/UL-TCI state update and SRI indication indicating UL spatial relation and SRS resource(s), respectively are indicated via two separate DCI fields. Alternatively, both joint/UL-TCI state update and SRI indication indicating UL spatial relation and SRS resource(s), respectively are indicated via a single (joint) DCI field. In one example, this single field corresponds to an existing DCI field (e.g., SRI or joint/UL-TCI field) or a new DCI field. In yet another example, a joint DCI indication (field) indicates UL spatial relation and SRS resource(s). In one example, this single field corresponds to an existing DCI field (e.g., SRI or joint/UL-TCI field) or a new DCI field.

In one example, the joint/UL-TCI state update is indicated via a DL-DCI (e.g., format 1_1 or 1_2 with or without DL assignment, and when higher layer TCIPresentInDCI is configured/enabled) which also indicated the SRI indication. Both joint/UL-TCI state update and SRI indication indicating UL spatial relation and SRS resource(s), respectively are indicated via two separate DCI fields. Alternatively, both joint/UL-TCI state update and SRI indication indicating UL spatial relation and SRS resource(s), respectively are indicated via a single (joint) DCI field. In one example, this single field corresponds to an existing DCI field (e.g., SRI or joint/UL-TCI field) or a new DCI field. In yet another example, a joint DCI indication (field) indicates UL spatial relation and SRS resource(s). In one example, this single field corresponds to an existing DCI field (e.g., SRI or joint/UL-TCI field) or a new DCI field.

In one embodiment, which is a variation of embodiments described herein, except that either the SRI is replaced with or indicates SRS resource(s) that correspond to another quantity or capability type (included in the beam report as explained in this disclosure) that can correspond to or associated with UE antenna panels. In one example, the another quantity or the capability type corresponds to at least one of the following examples.

PanelID(s)
SRS resource set ID(s)
SRS resource ID(s)
SRS port group ID(s)
Number of UL layers or rank
Coherence type
TPMI group(s)

In one embodiment, which is an extension of explicit ACK described herein, a UE is provided with a linkage (or association or alignment) between the SRI indication (via UL-DCI, e.g., format 0_1 or 0_2) and the joint/UL-TCI state update indication (via DL-DCI, e.g., format 1_1 or 1_2 when higher layer TCIPresentInDCI is enabled/provided). The linkage enables/facilitates harmonization/alignment of UE and NW assumptions on joint/UL-TCI state and/or selected UL panels (via SRI). The SRI indication and the joint/UL-TCI state indication follows (based on) the signaled linkage. The linkage is provided via a quantity/entity. An example is illustrated in Table 33.

TABLE 33

| Linkage (ID) | Quantity index (ID) |
|---|---|
| 0 | 0 |
| 1 | 2 |
| 2 | 3 |
| 3 | 5 |

In one example, at least one of the following examples is used/configured regarding the quantity/entity.

In one example, the quantity/entity corresponds to a number of SRS ports (x) or a set of values for the number of SRS ports (e.g., {2,4}).

In one example, the quantity/entity corresponds to a SRS resource or multiple SRS resources (within a SRS resource set) with a same number of SRS ports (x).

In one example, the quantity/entity corresponds to a SRS resource or multiple SRS resources (within a SRS resource set) with a same or different number of SRS ports (x).

In one example, the quantity/entity corresponds to a SRS resource set with one SRS resource or multiple SRS resources, each with a same number of SRS ports (x).

In one example, the quantity/entity corresponds to a SRS resource set with one SRS resource or multiple SRS resources same or different number of number of SRS ports (x).

In one example, the quantity/entity corresponds to an index or ID or multiple indices or IDs (e.g., panel ID or capability value index or SRS port group ID) which corresponds to a number of SRS ports (x).

In one example, the quantity/entity corresponds to one or multiple capability types, where capability types are as described above.

In one example, the quantity/entity corresponds to one or multiple joint/UL-TCI states. In one example, the one or multiple joint/UL-TCI states corresponds to a number of SRS ports (x).

In one example, the quantity/entity corresponds to one or multiple UL spatial relations. In one example, the one or multiple UL spatial relations corresponds to a number of SRS ports (x).

In one example, the quantity/entity corresponds to one or multiple source RSs for joint/UL-TCI states. In one example, each source RS=CSI-RS or SSB indicated with a reported capability index. In one example, each source RS is linked to (determined), e.g., via a reference RS, which is determined based on CSI-RS or SSB indicated with a reported capability index. In one example, the one or multiple source RSs corresponds to a number of SRS ports (x).

In one example, the quantity/entity corresponds to one or multiple CSI-RS resource (or CRI values) reported with a reported capability index. In one example, the one or multiple CSI-RS resource (or CRI values) corresponds to a number of SRS ports (x).

In one example, the quantity/entity corresponds to one or multiple SSB resource (or SSBRI values) reported with a reported capability index. In one example, the one or multiple SSB resource (or SSBRI values) corresponds to a number of SRS ports (x).

In one example, x can be based on (or subject to) a capability value reported via the beam report (as described in this disclosure), where the capability value corresponds to max supported number of SRS ports (y), i.e., x is such that x=y or x≤y. In one example, x may or may not be based on (or subject to) a capability value reported via the beam report (as described in this disclosure), where the capability value corresponds to max supported number of SRS ports (y), i.e., x can be x=y, or x<y, or x>y.

The signaling of the linkage can be based on (or subject to) the beam report including CRI/SSBRI, L1-RSRS/L1-RSRP, and a capability index.

In one example, at least one of the following examples is used/configured regarding the channel/medium for signaling of the linkage.

In one example, the channel/medium corresponds to higher layer (RRC), and a new or an existing higher layer parameter is used to provide/signal the information about the linkage. In one example (A1), an existing parameter for a TCI state pool (e.g., JointAndDLT-CIStatePool or ULTCIStatePool) is used. In one example (B1), an existing parameter for a SRS resource set is used.

In one example, the channel/medium corresponds to MAC CE, and a new or an existing MAC CE is used to provide/signal the information about the linkage. In one example (A2), an existing MAC CE for TCI state activation is used. In one example (B2), an existing MAC CE for activating a subset of aperiodic SRS resources is used.

In one example, the channel/medium corresponds to a combination of higher layer (RRC) and MAC CE, and a new or existing RRC and/or a new or existing MAC CE are used to provide/signal the information about the linkage. In one example, one of A1+B1, A1+B2, A2+B1, or A2+A2 is used. In one example, higher layer RRC configures a set of values for the linkage, and the MAC CE activates/indicates one (or multiple) from the configured set of values.

In one embodiment, which is an extension of explicit ACK in embodiments described herein, a UE is provided with a linkage (or association or alignment) between two quantities, a first quantity/entity is for the SRI indication (via UL-DCI, e.g., format 0_1 or 0_2) and a second quantity/entity is for the joint/UL-TCI state update indication (via DL-DCI, e.g., format 1_1 or 1_2 when higher layer TCIP-resentInDCI is enabled/provided). The linkage enables/facilitates harmonization/alignment of UE and NW assumptions on joint/UL-TCI state and/or selected UL panels (via SRI). The SRI indication and the joint/UL-TCI state indication follows (based on) the signaled linkage. An example is illustrated in Table 34.

TABLE 34

| Linkage (ID) | First quantity index (ID) | Second quantity index (ID) |
|---|---|---|
| 0 | 0 | 2 |
| 1 | 2 | 2 |
| 2 | 3 | 3 |
| 3 | 5 | 4 |

In one example, at least one of the following examples is used/configured regarding the first and second quantities/entities.

In one example, the first quantity comprises of a number of SRS ports (x) or a set of values for the number of SRS ports (e.g., {2,4}) and the second quantity comprises one or multiple joint/UL-TCI states or spatial relations.

In one example, the first quantity comprises SRS resource(s) and the second quantity comprises one or multiple joint/UL-TCI states or spatial relations. In one example, SRS resource(s) have the same number of SRS ports (x). In one example, SRS resource(s) have the same or different number of SRS ports (x).

In one example, the first quantity comprises a SRS resource set (or set ID) and the second quantity comprises one or multiple joint/UL-TCI states or spatial relations. In one example, the SRS resource set comprises SRS resource(s) having the same number of SRS ports (x). In one example, the SRS resource set comprises SRS resource(s) having the same or different number of SRS ports (x).

In one example, the first quantity comprises an index or ID or multiple indices or IDs (e.g., panel ID or capability value index or SRS port group ID) and the second quantity comprises one or multiple joint/UL-TCI states or spatial relations.

In one example, the first quantity comprises one or multiple groups of SRS ports and the second quantity comprises one or multiple joint/UL-TCI states or spatial relations.

In one example, the first quantity comprises one or multiple groups of SRS resources and the second quantity comprises one or multiple joint/UL-TCI states or spatial relations.

In one example, the first quantity comprises one or multiple panel IDs and the second quantity comprises one or multiple joint/UL-TCI states or spatial relations.

In the above examples, the first quantity can be associated with (or corresponds to) a number of SRS ports (x). In one example, x can be based on (or subject to) a capability value reported via the beam report (as described in this disclosure), where the capability value corresponds to max supported number of SRS ports (y), i.e., x is such that x=y or x≤y. In one example, x may or may not be based on (or subject to) a capability value reported via the beam report (as described in this disclosure), where the capability value corresponds to max supported number of SRS ports (y), i.e., x can be x=y, or x<y, or x>y.

The signaling of the linkage can be based on (or subject to) the beam report including CRI/SSBRI, L1-RSRS/L1-RSRP, and a capability index.

At least one of the examples described herein above is used/configured regarding the channel/medium for signaling of the linkage.

In one embodiment, a UE reports via its capability reporting a list of UE capability values (or value set/sets), the UE capability value (or value set/sets) including an information about the max supported number of SRS antenna ports, and the UE, based on its reported capability, is configured with a reporting of a number of SRS antenna ports or a maximum number of SRS antenna ports in the beam report.

As shown in FIG. 14, a UE is configured to measure (receive) $P_1$ DL measurement RS resources (such as CSI-RS or SSB), where $P_1 \geq 1$. The UE is further configured to use the measurement (based on the received DL measurement RS resources) to determine a beam report and report it via an UL channel (e.g., PUCCH or PUSCH), as configured by the higher layer parameter CSI-ReportConfig.

The beam report includes $N \geq 1$ pairs of (R, I) where R is a resource indicator, and I is an index corresponding to the reported R. In one example, R is SSBRI indicating SSB index, or CRI indicating CSI-RS resource index. In one example, the beam report also include a beam metric corresponding to (or associated with) each reported resource indicator R. In one example, each beam metric is L1-RSRP (as in Rel. 15). In one example, each beam metric is L1-SINR (as in Rel. 16). In one example, each beam metric is L1-RSRP or L1-SINR based on configuration, which could be subject to UE capability reported by the UE. When N>1, the beam metrics are reported in a differential manner (as in Rel.15/16), e.g., with 7 bits for the first (absolute) beam metric and 4 bits for each of the remaining N−1 (differential) beam metrics with respect to the first beam metric, the details of this differential reporting is as described in Rel. 15/16 NR specification.

In one example, the index I indicates a correspondence between a CSI-RS and/or SSB resource index (indicated via R) and a UE capability value from a list of UE capability values (or value set/sets) reported by the UE (via UE capability signaling). In one example, the index I is an index of a UE capability value from a list of UE capability values (or value set/sets). The details of the list of UE capability values (or value set/sets) are described later in this disclosure. The UE may not update or is expected to maintain the correspondence between beam reporting instances.

In one example, the beam report is configured via reportQuantity in CSI-ReportConfig that is set to an existing (Rel. 15/16) value, i.e., to 'cri-RSRP' or 'ssb-Index-RSRP' or 'cri-SINR', or 'ssb-Index-SINR'.

In one example, the beam report is configured via reportQuantity in CSI-ReportConfig that is set to a new value, i.e., 'cri-RSRP-r17' or 'ssb-Index-RSRP-r17' or 'cri-SINR-r17', or 'ssb-Index-SINR-r17', where the term 'cri' or 'ssb-Index' corresponds to the resource indicator, the term 'RSRP' or 'SINR' corresponds to the beam metric, and the term 'r17' corresponds to the index I. In one example, In one example, the term "r17" is replaced with 'CapabilityIndex', i.e., the new value is 'cri-RSRP-CapabilityIndex', 'ssb-Index-RSRP-CapabilityIndex', 'cri-SINR-CapabilityIndex', or 'ssb-Index-SINR-CapabilityIndex'.

In one example, the term "r17" is replaced with 'SetIndex', i.e., the new value is 'cri-RSRP-SetIndex', 'ssb-Index-RSRP-SetIndex', 'cri-SINR-SetIndex', or 'ssb-Index-SINR-SetIndex'.

In one example, the term "r17" is replaced with 'ValueIndex', i.e., the new value is 'cri-RSRP-ValueIndex', 'ssb-Index-RSRP-ValueIndex', 'cri-SINR-ValueIndex', 'ssb-Index-SINR-ValueIndex'.

In one example, the term "r17" is replaced with 'ValueSetIndex', i.e., the new value is 'cri-RSRP-ValueSetIndex', 'ssb-Index-RSRP-ValueSetIndex', 'cri-SINR-ValueSetIndex', 'ssb-Index-SINR-ValueSetIndex'.

In one example, the term "r17" is replaced with 'CapabilityValueSetIndex', i.e., the new value is 'cri-RSRP-CapabilityValueSetIndex', 'ssb-Index-RSRP-CapabilityValueSetIndex', 'cri-SINR-CapabilityValueSetIndex', 'ssb-Index-SINR-CapabilityValueSetIndex'.

In one example, the term "r17" is replaced with 'CapabilityValueIndex', i.e., the new value is 'cri-RSRP-CapabilityValueIndex', 'ssb-Index-RSRP-CapabilityValueIndex', 'cri-SINR-CapabilityValueIndex', 'ssb-Index-SINR-CapabilityValueIndex'.

In one example, the term "r17" is replaced with 'CapabilitySetIndex', i.e., the new value is 'cri-RSRP-CapabilitySetIndex', 'ssb-Index-RSRP-CapabilitySetIndex', 'cri-SINR-CapabilitySetIndex', 'ssb-Index-SINR-CapabilitySetIndex'.

The index I is determined/configured according to at least one of the following examples.

In one example, the index I indicates a number of SRS antenna ports or a maximum number of SRS antenna ports corresponding to a reported SSBRI/CRI in a beam reporting instance.

In one example, for an SRS resource with 4 SRS ports, the index I indicates one of the following.
    X:1 number of SRS antenna ports=4 or maximum number of SRS antenna ports=4 (for 1 panel with 4 ports, or selecting 4 SRS ports)
    X2: number of SRS antenna ports=2 or max number of SRS antenna ports=2 (for 2 panels each with 2 ports, or selecting 2 SRS ports)
    X3: number of SRS antenna ports=1 or max number of SRS antenna ports=1 (for 4 panels each with 1 port or selecting 1 SRS port)
In one example, the index I depends on the coherence type reported by the UE.
    For a UE capable of NC and 4 ports, I is fixed to X3, hence may not be reported.
    For a UE capable of PC and 4 ports, I can be X2 or X3, hence may be reported (e.g., via a 1 bit reporting).
    For a UE capable of FC and 4 ports, I can be X1 or X2 or X3, hence may be reported (e.g., via a 2 bit reporting).
In one example, the index I does not depend on the coherence type reported by the UE.
    For a UE capable of 4 ports, I can be X1 or X2 or X3, hence may be reported (e.g., via a 2 bit reporting).
In one example, for a SRS resource with 4 SRS ports, the index I indicates one of the following.
    X1: number of SRS antenna ports=4 or maximum number of SRS antenna ports=4 (for 1 panel with 4 ports, or selecting 4 SRS ports)
    X2: number of SRS antenna ports=2 or max number of SRS antenna ports=2 (for 2 panels each with 2 ports, or selecting 2 SRS ports)
    X3: number of SRS antenna ports=1 or max number of SRS antenna ports=1 (for 4 panels each with 1 port or selecting 1 SRS port)
    X4: number of SRS antenna ports=4 or maximum number of SRS antenna ports=4 (for 3 panels one panel with 2 ports, or selection 2 SRS ports and 2 panels each with 1 port, or selecting 1 SRS ports)
In one example, the index I depends on the coherence type reported by the UE.
    For a UE capable of NC and 4 ports, I is fixed to X3, hence may not be reported.
    For a UE capable of PC and 4 ports, I can be X2 or X3 or X4, hence may be reported (e.g., via a 2 bit reporting).
    For a UE capable of FC and 4 ports, I can be X1 or X2 or X3, hence may be reported (e.g., via a 2 bit reporting).
In one example, the index I does not depend on the coherence type reported by the UE.
    For a UE capable of 4 ports, I can be X1 or X2 or X3 or X4, hence may be reported (e.g., via a 2 bit reporting).
In one example, for an SRS resource with 2 SRS ports, the index I indicates one of the following.
    Y1: number of SRS antenna ports=2 or max number of SRS antenna ports=2 (for 1 panel with 2 ports, or selecting 2 SRS ports)
    Y3: number of SRS antenna ports=1 or max number of SRS antenna ports=1 (for 2 panels each with 1 port or selecting 1 SRS port)

In one example, the index I depends on the coherence type reported by the UE.
For a UE capable of NC and 2 ports, I is fixed to Y3, hence may not be reported.
For a UE capable of FC and 2 ports, I can be Y1 or Y3, hence may be reported (e.g., via a 1 bit reporting).

In one example, the index I does not depends on the coherence type reported by the UE.
For a UE capable of 2 ports, I can be Y1 or Y3, hence may be reported (e.g., via a 1 bit reporting).

In one example, the NW configures the set of allowed number of SRS antenna ports for the index I or the NW configures an association between the index I and number of SRS antenna ports. This configuration can be subject to UE capability reported by the UE, which for example can be a list of supported UE capability values (or value set/sets) including number of SRS antenna ports. The UE determines the index I based on the NW configuration, and the bitwidth of index I reporting is 0, 1, 2, or 2 bits if the number SRS antenna ports for the reporting of the index I is 1, 2, 3, or 4, respectively.

In one example, the index I indicates a number of SRS antenna ports or a maximum number of SRS antenna ports corresponding to a reported SSBRI/CRI in a beam reporting instance. The details are the same as described herein except that for 4 SRS ports, the index I is allowed to take a value indicating number of SRS antenna ports 3 or max number of SRS antenna ports=3 (or selection of 3 SRS ports or selection of a panel with 3 ports).

For an SRS resource with 4 SRS ports, the index I indicates one of the following.
X1: number of SRS antenna ports=4 or max number of SRS antenna ports=4 (for 1 panel with 4 ports, or selecting 4 SRS ports)
X2: number of SRS antenna ports 2 or max number of SRS antenna ports=2 (for 2 panels each with 2 ports, or selecting 2 SRS ports)
X3: number of SRS antenna ports 1 or max number of SRS antenna ports=1 (for 4 panels each with 1 port or selecting 1 SRS port)
X4: number of SRS antenna ports 3 or max number of SRS antenna ports=3 (for 1 panel each with 3 ports, or selecting 3 SRS ports)

In one example, the index I depends on the coherence type reported by the UE.
For a UE capable of NC and 4 ports, I is fixed to X3, hence may not be reported.
For a UE capable of PC and 4 ports, I can be X2 or X3, hence may be reported (e.g., via a 1 bit reporting).
For a UE capable of FC and 4 ports, I can be X1 or X2 or X3 or X4, hence may be reported (e.g., via a 2 bit reporting).

In one example, the index I does not depends on the coherence type reported by the UE.
For a UE capable of 4 ports, I can be X1 or X2 or X3 or X4, hence may be reported (e.g., via a 2 bit reporting).

In one example, the NW configures the set of allowed number of SRS antenna ports for the index I or the NW configures an association between the index I and number of SRS antenna ports. This configuration can be subject to UE capability reported by the UE, which for example can be a list of supported UE capability values (or value set/sets) including number of SRS antenna ports. The UE determines the index I based on the NW configuration, and the bitwidth of index I reporting is 0, 1, 2, or 2 bits if the number SRS antenna ports for the reporting of the index I is 1, 2, 3, or 4, respectively.

In one example, the index I indicates a number of SRS antenna ports or a maximum number of SRS antenna ports corresponding to a reported SSBRI/CRI in a beam reporting instance. The details are the same as described herein except that for 4 SRS ports, the index I is allowed to take a value indicating number of SRS antenna ports 3 or max number of SRS antenna ports=3 (or selection of 3 SRS ports or selection of a panel with 3 ports).

For an SRS resource with 4 SRS ports, the index I indicates one of the following.
X1: number of SRS antenna ports=4 or max number of SRS antenna ports=4 (for 1 panel with 4 ports, or selecting 4 SRS ports)
X2: number of SRS antenna ports 2 or max number of SRS antenna ports=2 (for 2 panels each with 2 ports, or selecting 2 SRS ports)
X3: number of SRS antenna ports 1 or max number of SRS antenna ports=1 (for 4 panels each with 1 port or selecting 1 SRS port)
X4: number of SRS antenna ports 3 or max number of SRS antenna ports=3 (for 1 panel each with 3 ports, or selecting 3 SRS ports)
X5: number of SRS antenna ports 2+1 or max number of SRS antenna ports=2+1 (for 3 panels, 1 panel with 2 ports, or selecting 2 SRS ports and 2 panels each with 1 port or selection 1 SRS port)
X6: number of SRS antenna ports 3+1 or max number of SRS antenna ports=3+1 (for 2 panels, 1 panel with 3 ports, or selecting 3 SRS ports and 1 panel with 1 port or selecting 1 SRS port)

In one example, the index I depends on the coherence type reported by the UE.
For a UE capable of NC and 4 ports, I is fixed to X3, hence may not be reported.
For a UE capable of PC and 4 ports, I can be X2 or X3, X5 hence may be reported (e.g., via a 2 bit reporting).
For a UE capable of FC and 4 ports, I can be X1 or X2 or X3 or X4 or X5 or X6 hence may be reported (e.g., via a 3 bit reporting).

In one example, the index I does not depends on the coherence type reported by the UE.
For a UE capable of 4 ports, I can be X1 or X2 or X3 or X4 or X5 or X6, hence may be reported (e.g., via a 3 bit reporting).

In one example, the NW configures the set of allowed number of SRS antenna ports for the index I or the NW configures an association between the index I and number of SRS antenna ports. This configuration can be subject to UE capability reported by the UE, which for example can be a list of supported UE capability values (or value set/sets) including number of SRS antenna ports. The UE determines the index I based on the NW configuration, and the bitwidth of index I reporting is 0, 1, 2, or 2 bits if the number SRS antenna ports for the reporting of the index I is 1, 2, 3, or 4, respectively.

In one embodiment, a UE reports via its capability reporting a list of UE capability values (or value set/sets), the UE capability value (or value set/sets) including an information about the supported number of SRS resources, and the UE, based on its reported capability, is configured with a reporting of a number of SRS resources or a maximum number of SRS resources in the beam report. In one example, each SRS resource is a 1-port resource. The rest of the embodiment is the same as described herein except that number of SRS antenna ports is replaced with number of SRS resources.

In one embodiment, the indication of coherence type, the rank value, or number of SRS antenna ports can be extended from one to multiple reporting quantities where a reporting quantity is either coherence type, the rank value, or number of SRS antenna ports.

In one example, the beam report includes (R, I), where R is a resource indicator (SSBRI/CRI) and the index I is a joint index indicating N>1 reporting quantities.

In one example, the beam report includes (R, I), where R is a resource indicator (SSBRI/CRI) and the index I=[$I_1$, . . . $I_N$] comprises N indices, and i-th index $I_i$ corresponds to i-th reporting quantity.

In one example, the beam report includes (R, I), where R is a joint indicator indicating N>1 resource indicators (each either SSBRI or CRI) and the index I is a joint index indicating N>1 reporting quantities.

In one example, the beam report includes (R, I), where R is a joint indicator indicating N>1 resource indicators (each either SSBRI or CRI) and the index I=[$I_1$, . . . $R_N$] comprises N indices, and i-th index $I_i$ corresponds to i-th reporting quantity.

In one example, the beam report includes (R, I), where R=[$R_1$, . . . $R_N$] comprises N resource indicators, and i-th indicator $R_i$ is a resource indicator (SSBRI or CRI) and the index I is a joint index indicating N>1 reporting quantities.

In one example, the beam report includes (R, I), where R=[$R_1$, . . . $R_N$] Comprises, and i-th indicator $R_i$ is a resource indicator (SSBRI or CRI) and the index I=[$I_1$, . . . $R_N$] comprises N indices, and i-th index $I_i$ corresponds to i-th reporting quantity.

At least one of the following is used/configured regarding N.
  In one example, N is fixed (e.g., N=2).
  In one example, N depends on the max number of SRS ports supported by the UE.
  In one example, N is configured, e.g., from {1,2} or {1,2,4} or {1,2,3,4}.
  In one example, N is configured from {1,2} or {1,2,4} or {1,2,3,4} if the UE supports a maximum of 4 SRS ports, and from {1,2} if the UE supports a maximum of 2 SRS ports, where the maximum number of supported SRS ports is reported by the UE as part of UE capability.
  In one example, N is reported by the UE as part of the beam report, or as part of the UE capability reporting. When N is reported as part of the beam report, then a two-part UCI can be used, wherein UCI part 1 include beam report for a fixed number (e.g., 1) reporting quantities, and UCI part 2 includes the remaining (e.g., N−1) reporting quantities, and the information about the remaining reporting quantities can be included in UCI part 1.

In one embodiment, a UE can be configured with multiple SRS resource sets with different number of SRS antenna ports, where the SRS resources in a SRS resource set have the same number of SRS antenna ports. In one example, multiple SRS resource sets can be used to distinguish multiple antenna panels at the UE.

Or, a UE can be configured with multiple SRS resource sets with different number of SRS antenna ports, where the SRS resources in a SRS resource set have different number of SRS antenna ports. In one example, multiple SRS resource sets can be used to distinguish multiple antenna panels at the UE.

Or, a UE can be configured with multiple SRS resource sets with different number of SRS antenna ports, where the SRS resources in a SRS resource set have the same or different number of SRS antenna ports. In one example, multiple SRS resource sets can be used to distinguish multiple antenna panels at the UE.

Alternatively, a UE can be configured with multiple SRS resources with different number of SRS antenna ports, where the multiple SRS resources are within the same SRS resource set. In one example, multiple SRS resources can be used to distinguish multiple antenna panels at the UE.

In one example, this can be configured only when the UE is configured with a codebook-based UL transmission (e.g., via the higher layer parameter txConfig set to 'codebook').

In one example, this can be configured only when the UE is configured with a non-codebook-based UL transmission (e.g., via the higher layer parameter txConfig set to 'non-Codebook').

In one example, this can be configured for both cases when the UE is configured with a codebook-based UL transmission (e.g., via the higher layer parameter txConfig set to 'codebook') or when the UE is configured with a non-codebook-based UL transmission (e.g., via the higher layer parameter txConfig set to 'nonCodebook').

The number (M) of SRS resource sets or SRS resources can be equal to or can map to (number of) panel entities (M), where a panel entity is functionally equivalent to any of the following.
  A transmit-receive (Tx-Rx) entity such as antenna panel, transmit-receive point (TRP), antenna port, antenna, antenna group, antenna port group, remote radio head (RRH), where an antenna port can correspond to an SRS port or a PUSCH port.
  A resource set comprising one or multiple resources (SRS resource set, CSI-resource set)
  A resource or resources (SRS, CSI-RS, SSB).
  A transmission process.

The value M is according to at least one of the following example.
  In one example, it is fixed, e.g., 2, 3, or 4. The fixed value may depend on the number of antenna ports at the UE.
  In one example, it is based on UE capability from {1,2}, {1,2,3}, {1,2,3,4}, {2,3}, {2,3,4}, or {2,4}.
  In one example, it is based on UE capability which is in terms of number of different max number of SRS ports.
    For 2 SRS ports, {1_2} or {1_2, 2_2}, where x_y indicates the UE can be configured with two SRS resources or resource sets with x and y SRS ports.
    For 4 SRS ports, {1_2, 1_4, 2_4, 1_2_4} or {1_2, 1_3, 1_4, 2_3, 3_4, 2_4, 1_2_4, 1_2_3, 1_3_4, 2_3_4, 1_2_3_4}, x_y_z indicates the UE can be configured with three SRS resources or resource sets with x, y and z SRS ports.

In one example, the number or the maximum number (M) of SRS resource sets with different number of SRS antenna ports depends on the number of antenna ports (Tx-Rx or RF chains or power amplifiers) at the UE. For example, M=2 for a UE with 2 antenna ports, and M=2 or 3 for a UE with 4 antenna ports.
  For 2 sets, the different number of SRS antenna ports can be (N1, N2)=(2,1), (4,1), or (4,2).
  For 3 sets, the different number of SRS antenna ports can be (N1, N2, N3)=(4,2,1).
  For a UE with 2 antenna ports, (N1, N2)=(2,1).
  For a UE with 4 antenna ports, (N1, N2)=(2,1), (4,1), (4,2) and (N1, N2, N3)=(4,2,1).

The number ($N_{SRS}$) of SRS resources in each SRS resource set can be according to at least one of the following examples.

In one example, $N_{SRS}$ is fixed, e.g., 2.

In one example, $N_{SRS}$ E $\{1, \ldots, m\}$ where m is a maximum value which can be determined based on UE capability reporting. In one example, m is fixed to 2. In one example, m can be reported from $\{2,3\}$, $\{2,3\}$, $\{2,4\}$, $\{3,4\}$ etc.

In one example, the maximum value m is the same for all resource sets. In one example, the maximum value m is separate for each set.

In one example, the total number of SRS resources across all SRS resource sets can be a maximum value n which can be fixed (e.g., 4) or can be determined based on UE capability reporting. The number of SRS resources in each resource set can be any value $\{1,2, \ldots \}$ as long as the total number of SRS resources across all resource sets is less or equal to n.

In one embodiment, the UE is further indicated with an SRS resource indicator (SRI), e.g., via UL-related DCI, which is based on the SRS resources corresponding to one SRS resource set (S) among the multiple SRS resource sets (S1, S2, . . . ), where the SRS resource set (S) can be aligned with the UE reported information corresponding to the index I. In one example, the information about the SRS resource set (S) that is aligned with the UE reported information is provided according to at least one of the following examples.

In one example, a SRS resource set indicator is provided/indicated via UL-DCI (e.g., DCI format 0_1 or 0_2 in NR) that indicates the information (e.g., index) about the SRS resource set (S).

In one example, the information (e.g., index) about the SRS resource set (S) is provided/indicated jointly with the SRI. For example, SRI can indicate an index pair (a,b), where a=an index of the SRS resource set, and b=an index of an SRS resource within the SRS resource set with index a. An example is illustrated in Table 35. The payload of SRI indication is then $\lceil \log_2(\Sigma_{i=1}^{t} N_i) \rceil$ bits, where t is the number of SRS resource sets, and $N_i$ is the number of SRS resources in the i-th SRS resource set.

In one example, the information (e.g., index) about the SRS resource set (S) is provided/indicated via UL BWP switch. For instance, the UE can be configured with multiple UL BWPs, each with different number of SRS ports, and the information (e.g., index) about the SRS resource set (S) is provided/indicated by updating/indicating an index of one of the configured UL BWPs (e.g., whose number of SRS ports is aligned with the UE reported information). Such UL BWP switch/update can be indicated via UL-DCI (e.g., DCI format 0_1 or 0_2 in NR).

TABLE 35

| SRI | SRS resource set index (a) | SRS resource index (b) |
| --- | --- | --- |
| 0 | 0 | 0 |
| 1 | 0 | 1 |
| ... | ... | ... |
| $N_1 - 1$ | 0 | $N_1 - 1$ |
| $N_1$ | 1 | 0 |
| $N_1 + 1$ | 1 | 1 |
| ... | ... | ... |
| $N_1 + N_2 - 1$ | 1 | $N_2 - 1$ |

In one embodiment, same as one or more embodiments described herein except that a different number of SRS antenna ports is replaced with one of the following.

different maximum number of SRS antenna ports
different rank (or UL rank)
different maximum rank (or UL rank)
different number of UL MIMO layers
different maximum number of UL MIMO layers
different maximum number of antenna ports
different maximum number of RF chains
different maximum number of PUSCH ports
different maximum number of PUCCH ports In one embodiment, a panel entity corresponds to a reported CSI-RS and/or SSB resource index in a beam reporting instance. The correspondence between a panel entity and a reported CSI-RS and/or SSB resource index is informed to NW. Note that the correspondence between a CSI-RS and/or SSB resource index and a panel entity is determined by the UE (analogous to Rel-15/16). The UE reports a maximum number of SRS ports for each panel entity (e.g., as part of UE capability).

The UE can be configured with multiple SRS resources or resources sets with different Z, where Z is one of maximum number of UL MIMO layers or (max supported) number of SRS ports or number of resources (e.g., SRS, CSI-RS, SSB) or one of the quantities described herein.

The UE is further indicated with a SRS resource indicator (SRI), e.g., via UL-related DCI, which is based on the SRS resources corresponding to one SRS resource set among the multiple SRS resource sets, where the SRS resource set can be aligned with the UE capability for the panel entity.

The UE is further configured to perform measurement, and report a beam report as described herein.

Various embodiments of the present disclosure recognize that when the UE is equipped with multiple antenna panels, there could be a misalignment issue about the UL panel assumptions (i.e., UE panel(s) used for the UL transmission) between the joint-TCI or UL-TCI state update (e.g., based on TCI state definition in Rel. 17 NR specification i.e., a TCI state associated with both DL and UL, or a pair of TCI states, one TCI state associated with DL and one TCI state associated with UL) and the SRI indication when they are carried/indicated via two separate DCIs (e.g., joint/UL-TCI state indication via DL-DCI, and SRI indication via UL-DCI). For instance, the UE may determine its UL panel(s) depending on the joint/UL-TCI state update via a DL-DCI (e.g., format 1_1 or 1_2 with or without DL assignment). If an UL-DCI (e.g., format 0_1 or 1_1) indicates the SRI indicating an SRS resource which corresponds to the UL panel(s) that are not aligned with the UL panel(s) corresponding to (or indicated via or determined based on) the joint/UL-TCI state update, whether or not the UE may (or is desired to) switch the UL panel(s) according to the SRI indication is unclear and may lead to misalignment. If the UE switches the UL panel(s) according to the SRI indication, the UL spatial relation (or UL Tx beam(s)) for the switched UE panel(s) may be different from that for the indicated UL spatial relation via the joint/UL-TCI state indication.

Various embodiments of the present disclosure recognize that when the UE is configured to use PUSCH antenna ports that are the same as the SRS ports of the SRS resource(s) indicated via the SRI, both PUSCH and SRS ports are expected or desired to use the same UL spatial relation (or UL Tx beam). When the PUSCH follows the joint-UL-TCI state update, the SRS resource(s) indicated via the SRI are desired to follow the indicated joint/UL-TCI state.

Here, the UL spatial relation (or UL Tx beams(s)) is assumed to be configured/indicated via the TCI state definition (e.g., in Rel. 17 NR specification) wherein a joint-TCI or a UL-DCI state is indicated (e.g., via DL-DCI) to provide a source RS or source RSs that serve(s) as the UL spatial relation(s) for the UL (e.g., PUCCH, PUSCH, SRS) transmission.

Accordingly, various embodiments of the present disclosure provide that the indicated SRS resource is aligned with the panel(s) associated with the source RS(s) contained in the indicated joint/UL-TCI state. Further, various embodiments of the present disclosure provide that the SRS resource(s) for the UL transmission (e.g., codebook-based or non-codebook-based) follow(s) the TCI state definition, i.e., joint/UL-TCI state (i.e., when a TCI state associated with both DL and UL, or a pair of TCI states, one TCI state associated with DL and one TCI state associated with UL).

In Rel.15, UL Tx beam (or RRC parameter spatialRelatioInfo) is configured via higher layer SRS-Resource, and the SRI in UL-DCI (format 0_0 or 0_1) indicates a SRS resource and hence also indicates an UL Tx beam (or spatialRelationInfo).

```
Section 6.3.2, TS 38.331
SRS-Resource {
...
spatialRelationInfo   SRS-SpatialRelationInfo   OPTIONAL, - Need R
...
}
SRS-SpatialRelationInfo ::=    SEQUENCE {
  servingCellId   ServCellIndex   OPTIONAL, - Need S
  referenceSignal    CHOICE {
    ssb-Index     SSB-Index,
    csi-RS-Index    NZP-CSI-RS-ResourceId,
    srs   SEQUENCE {
      resurceId     SRS-ResourceId,
      uplinkBWP         BWP-Id
    }
  }
}
```

TABLE 36

```
UL-TCIState-r18 ::=  SEQUENCE {
  UL-TCIState-Id-r18   UL-TCIState-Id-r18,
  Component (A)
      Component (B)
  ...
}
Component (A) ::= {
    referenceSignal-r17      CHOICE {
      ssb-Index-r17     SSB-Index-r17,
      csi-RS-Index-r17      NZP-CSI-RS-ResourceId-r17,
      srs-r17     PUCCH-SRS-r17
    }
  }
Component (B) ::= {
    Resource   SRS-ResourceId
}
OR
Component (B) ::= {
    Resource   SEQUENCE (SIZE (1 . . . N)) OF SRS-ResourceId
}
```

TABLE 37

```
DLorJoint-TCIState-r18 ::=  SEQUENCE {
  Tci-StateUnifiedStateId-r18      TCIState-Id,
  Component (A)
  Component (B)
  ...
}
Component (A) ::= {
```

TABLE 37-continued

```
  qcl-Type1-r17   QCL-Info-r17,
  qel-Type2-r17   QCL-Info-r17
}
Component (B) ::= {
    Resource   SRS-ResourceId
}
OR
Component (B) ::= {
    Resource   SEQUENCE (SIZE (1 . . . N)) OF SRS-ResourceId
}
```

TABLE 38

```
UL-TCIState-r18 ::=  SEQUENCE {
  UL-TCIState-Id-r18   UL-TCIState-Id-r18,
  Component (A)
      Component (B)
  ...
}
Component (A) ::= {
    referenceSignal-r17      CHOICE {
      ssb-Index-r17     SSB-Index-r17,
      csi-RS-Index-r17      NZP-CSI-RS-ResourceId-r17,
      srs-r17   PUCCH-SRS-r17
    }
  }
Component (B) ::= {
    srs-Info   SRS-Info
}
OR
Component (B) ::= {
    srs-Info   SEQUENCE (SIZE (1 . . . N)) OF SRS-Info
}
```

TABLE 39

```
DLorJoint-TCIState-r18 ::=  SEQUENCE {
  Tci-StateUnifiedStateId-r18     TCIState-Id,
  Component (A)
      Component (B)
  ...
}
Component (A) ::= {
    qcl-Type1-r17   QCL-Info-r17,
    qcl-Type2-r17   QCL-Info-r17
}
Component (B) ::= {
    srs-Info   SRS-Info
}
OR
Component (B) ::= {
    srs-Info   SEQUENCE (SIZE (1 . . . N)) OF SRS-Info
}
```

In one embodiment, a UE can be configured with an UL beam (or TCI state) indication based on a 'new' TCI state definition wherein a TCI state includes and/or is associated with information about both (A) a source RS for providing a reference for determining UL Tx beam (or UL Tx spatial relation/filter) for UL transmission (e.g., for dynamic-grant and configured-grant based PUSCH and PUCCH resource in a CC, and SRS), and (B) a single SRS related information, abbreviated as SRS-Info. That is, one SRS-Info is included in and/or associated with each TCI state. The SRS-Info can be used for UL panel selection (when the UE is equipped with multiple UE panels). The information about (B) could be explicitly included in a TCI state, or could be associated with a TCI state via separate IE.

The UE can be configured with a list/pool/set of up to T (e.g., T=64 or 128) TCI-State configurations, within the higher layer parameter PDSCH-Config, with IDs (tci- StateId-r18), each providing information about (A) and (B). In one example, this list/pool/set of up to T TCI state configurations can be dedicated, i.e., UL-TCI states for UL only (e.g., via higher layer ul-TCIState-ToAddModList-r18 in ul-TCIState-r18). Two examples are shown in Table 36, wherein the 'new' TCI state is labelled as UL-TCIState-r18. In one example, this list/pool/set of up to T TCI state configurations can be joint, i.e., J-TCI states for DL and UL (e.g., via higher layer dl-orJoint-TCIState-ToAddModList-r18 in dl-orJoint-TCIState-r18). Two examples are shown in Table 37, wherein the 'new' TCI state is labelled as DLor-Joint-TCIState-r18. Here, SRS-info can correspond to SRS port(s), SRS port group(s), SRS resource(s), SRS resource group(s), and/or SRS resource set(s). In one example, the pool of UL-TCI states can be configured in IE associated with UL-BWP or BWP-UplinkDedicated. In one example, the pool of DL/Joint-TCI states can be configured in IE PDSCH-Config.

The UE can also receive an activation command (e.g., via MAC CE), as described in TS 38.321, used to map up to S (e.g., S=a value from 8, 9 . . . 16) TCI states (e.g., in case of J-TCI state) and/or pairs of TCI states, with one TCI state for DL channels/signals and one TCI state for UL channels/signals (e.g., in case of separate DL/UL TCI states) to the codepoints of the DCI field 'Transmission Configuration Indication' for one or for a set of CCs/DL BWPs, and if applicable, for one or for a set of CCs/UL BPWs. In case of J-TCI state configurations, the S TCI states can correspond to the 'new' TCI states providing components (A) and (B) as described above. In case of separate DL/UL-TCI state configurations, the one TCI state for UL channels/signals can corresponds to the 'new' TCI state providing components (A) and (B) as described above.

In a variation, in case of the 'new' TCI state corresponds to J-TCI state, the component (B) can be included within the one or both of the two QCL-Info-r17 parameters.

When the UE reports a beam report indicating panel selection/switch (as described above), the NW may have to perform (re-)configuration or signaling in order to provide the component (B) in the new TCI state definition to facilitate fast panel selection/switch. At least one of the following examples can be used/configured regarding the signaling.

In one example, there may not be any configured TCI states (e.g., in the latest configured pool(s) of TCI states via RRC) that can facilitate fast panel selection/switch aligned with the beam report, and hence the NW may have to use higher layer (RRC) signaling to re-configure the list(s)/pool(s) of TCI states that includes TCI states with component (B) aligned with the panel selection/switch.
In one example, the UE can receive a re-configuration of one pool of TCI states, e.g., a pool of UL-TCI states or a pool of J-TCI (or DL-TCI) states.
In one example, the UE can receive a re-configuration of two pools of TCI states, a pool of UL-TCI states and a pool of J-TCI (or DL-TCI) states.

In one example, there may not be any activated TCI states (e.g., in the latest activated TCI states via MAC CE) that can facilitate fast panel selection/switch aligned with the beam report, however, the pool(s) of TCI states configured via RRC includes TCI states that are aligned with the beam report. Hence, a MAC CE based signaling can be used to update the activated TCI states which include TCI state(s) aligned with beam report (hence facilitate fast panel selection/switch).

In one example, when the UE is configures with one pool of TCI states, e.g., a pool of UL-TCI states or a pool of J-TCI (or DL-TCI) states, where the pool includes TCI states with component (B) corresponding to different panel selection/switch hypothesis, a MAC CE based activation can be used to activate TCI states that are aligned with the beam report (i.e., include component (B) according to the reported panel selection hypothesis).
In one example, when the UE is configures with two pools of TCI states, e.g., a pool of UL-TCI states and a pool of J-TCI (or DL-TCI) states, where the one of or both of the two pools includes TCI states with component (B) corresponding to different panel selection/switch hypothesis, a MAC CE based activation can be used to activate TCI states that are aligned with the beam report (i.e., include component (B) according to the reported panel selection hypothesis). In particular, the MAC CE based activation can activate TCI states from one of the two pools, or activate a mixture of TCI states from two pools. In one example, the one of the two pools is fixed for such a panel switch (e.g., UL-TCI state pool). In one example, a separate dedicated signaling (RRC and/or MAC CE) can be used to configure/ indicate one of the two pools. In one example, a separate dedicated signaling (RRC and/or MAC CE) can be used to configure/indicate either one of the two pools or both pools for TCI state activation.
In one example, the UE is configured with multiple (e.g., 2) TCI state pools, one for each panel selection hypothesis, and a MAC CE based activation is used to activate one of the multiple pools that is aligned with the beam report. Here, the pools can be UL TCI state pool or joint (or DL) TCI state pool.
In one example, the UE is configured with one TCI state pools which can be partitioned into multiple subsets/groups (e.g., 2) of TCI states, one subset/ group for each panel selection hypothesis, and a MAC CE based activation is used to activate one of the multiple subsets/groups that is aligned with the beam report. Here, the pools can be UL TCI state pool or joint (or DL) TCI state pool.
In one example, a MAC CE code point indicates multiple TCI states (E.g., 2), each for different panel, and DCI can perform panel selection In one example, a DCI-based signaling is used to facilitate fast panel selection/switch aligned with the beam report.
In one example, the MAC CE can activate up to S TCI states (as described) with component (B) corresponding to different panel selection/switch hypothesis, and the DCI field can be used to indicates panel selection aligned with the beam report.
In one example, two (or L>=2 in general) groups/ subsets of TCI states, each comprising up to S (e.g., S=8 or 16) TCI states can be activated via MAC CE (e.g., from one pool or two pools of TCI states, where the pools of UL-TCI pool of DLorJoint-TCI pool), and a DCI field can be used to indicate one of the two (or L) groups/subsets of TCI states. In one example, the two (or L) groups/subsets corresponds to two (or L) panel selection hypotheses. The DCI field can be separate from the DCI field 'Transmission Configuration Indication' or, can also be joint with the DCI field 'Transmission Configuration Indication'.

In one example, a MAC CE code point activates S pairs of TCI states (or S tuples comprising K TCI states in general), where S=8 or 16, each pair (tuple) with components (B) corresponding to different panel selection hypothesis, and a DCI field can be used to perform panel selection from the pair (or tuple) of TCI states. The DCI field can be separate from the DCI field 'Transmission Configuration Indication' or, can also be joint with the DCI field 'Transmission Configuration Indication'.

The information about the component (B) to facilitate UL panel selection/switch can be provided/configured according to at least one of the following sub-embodiments.

In one embodiment, the SRS-Info information about the component (B) can include (ID or IDs of) one SRS resource or multiple SRS resources. In one example, (ID or IDs of) one SRS resource or multiple SRS resources belong to a SRS resource set, which for example, can be configured with usage set to 'codebook' (for codebook-based UL transmission) or 'nonCodebook' (for non-codebook-based UL transmission), i.e., the component (B) is similar to dynamic UL grant wherein SRI indication via UL-DCI (format 0_1 or 0_2) provides ID or IDs of SRS resource(s). In another example, (ID or IDs of) one SRS resource or multiple SRS resources belong to list of higher layer configured SRS resources.

When this 'new' TCI state is indicated (e.g., via DL-DCI format 1_1 or 1_2 with or without DL assignment), it indicates both UL Tx beam (UL Tx spatial relation/filter) as well as SRS resource(s) for the UL transmission. The indicated SRS resource(s) can also be aligned with the UE panel switch/selection assumptions at UE and NW (e.g., when a capability value information about the UE panel selection is reported by the UE together with the beam report as described in this disclosure).

Since the component (B) corresponds to SRS resource(s), the SRI indication in UL-DCI (format 01 or 0_2) may or may not be needed (indicated).

- In one example, SRI is not indicated when (panel and/or) SRS resource selection is performed via component (B) in the new TCI state definition.
- In one example, SRI is present/indicated, but the UE ignores it when (panel and/or) SRS selection is performed via component (B) in the new TCI state definition.
- In one example, when the component (B) selects/indicates multiple SRS resources, SRI indicates one of the selected SRS resources, and when the component (B) selects/indicates one SRS resource, SRI is either not indicated, or is ignored by the UE.
- In one example, SRI indicates one SRS resource from a subset of the SRS resource set, where the subset corresponds to or includes or is determined based on SRS resource(s) that are indicated via the component (B). For example, the component (B) can indicate or map to a set (or a subset/group within a set) of SRS resources, and SRI indicates one SRS resource from this indicates set (or subset/group).
- In one example, whether SRI is present (indicated) or absent (not indicated) is configured/indicated, e.g., via RRC, and/or MAC CE, using a parameter sriPresentIn-DCI.

In one example, the (panel and/or) SRS resource is performed via one of the new TCI state definition (indicated via DL-DCI format 1_1 or 1_2) or SRI (indicated via UL-DCI format 0_0 or 0_1). The UE is indicated, via RRC and/or MAC CE, with the information the (panel and/or) SRS resource is performed via one of the new TCI state definition or SRI.

In one example, the (panel and/or) SRS resource is performed via both of the new TCI state definition (indicated via DL-DCI format 1_1 or 1_2) or SRI (indicated via UL-DCI format 0_0 or 0_1). The UE uses the latest of the two (new TCI state or SRI) for the panel and/or) SRS resource selection.

In one example, the (panel and/or) SRS resource is performed via one of or both of the new TCI state definition (indicated via DL-DCI format 1_1 or 1_2) or SRI (indicated via UL-DCI format 0_0 or 0_1). The UE is indicated, via RRC and/or MAC CE, with the information the (panel and/or) SRS resource is performed via one of the new TCI state definition or SRI. The information (one or both of) can be provide to the UE via RRC and/or MAC CE.

In one example, for the case of multi-panel UE (MPUE), i.e., a UE equipped with N>1 antenna panels, the SRS resource(s) can map (belong) to one SRS resource set for all panels, where a subset/group of SRS resources can map to (belong to) a panel. Or, the SRS resource(s) with N1 SRS ports can map to (belong to) a panel, and the SRS resource(s) with N2 SRS ports (N2>N1) can map (belong) to multiple (e.g., 2) or all panels. Alternatively, there is one SRS resource for each panel, and the SRS resource(s) can map (belong) to a SRS resource set for a respective panel. The component (B) then can include X which is according to at least one of the following examples.

- In one example, X=X1=SRS resource(s) for one of the N panels, where the one panel can be fixed (e.g., panel 1), or the information about the one panel can be indicated (e.g., by the NW), e.g., via RRC, or MACE or, DCI, or the one panel is left up to UE implementation.
- In one example, X=X2={SRS resource1(s), SRS resource2(s)} for 2 out of N panels assuming simultaneous transmission from 2 panels (STx2P).
- In one example, X=X1, X2, where X1 and X2 are as described above.
- In one example, X=X11, X12, X2, where X2 is as described above. X11=SRS resource(s) for the $1^{st}$ panel, and X12=SRS resource(s) for the $2^{nd}$ panel.

In one example, for codebook-based UL transmission, when the UE is configured (via PUSCH-Config) with one SRS resource set or multiple SRS resource sets with usage set to 'codebook', at least one of the following examples can be used/configured.

- In one example, the UE is configured (via PUSCH-Config) with one SRS resource set including multiple SRS resources, each with same number of SRS ports. The SRS resources can be partitioned into N groups/subsets, one group/subset for each panel.
- In one example, the UE is configured (via PUSCH-Config) with one SRS resource set including multiple SRS resources with different number of SRS ports, each SRS resource maps to one panel or multiple panels. For example, a SRS resource with 2 SRS ports maps to 1 panel, and a SRS resource with 4 SRS ports maps to two panels.
- In one example, the UE is configured (via PUSCH-Config) with multiple SRS resource sets, an SRS resource set maps to one panel or multiple panels, each SRS resource set comprises one or multiple SRS resources with the same number of SRS ports, and number of SRS ports in one SRS resource set can be different from that in another SRS resource set.

In one example, for non-codebook-based UL transmission, when the UE is configured (via PUSCH-Config) with one SRS resource set or multiple SRS resource sets with usage set to 'nonCodebook', at least one of the following examples can be used/configured.

In one example, the UE is configured (via PUSCH-Config) with one SRS resource set including multiple SRS resources, each with 1 SRS port. The SRS resources can be partitioned into N groups/subsets, one group/subset for each panel.

In one example, the UE is configured (via PUSCH-Config) with multiple SRS resource sets, each set with different number of SRS resources, each SRS resource set maps to one panel or multiple panels. For example, a SRS resource set with 2 SRS resource maps to 1 panel, and a SRS resource set with 4 SRS resources maps to two panels.

In one example, when the component (B) indicates two separate (groups/subsets of) SRS resource(s), S1 and S2, for example or two panels, at least one of the following example is used for the indication.

In one example, the new TCI state includes one indicator for (B) indicating a pair of SRS resource(s), (S1, S2).

In one example, the new TCI state includes two separate indicators for (B), one indicating S1 and another indicating S2.

In one example, when the UE is configured with two UL (PUSCH) transmissions (e.g., via a single UL-DCI format 0_1 or 0_2), the 'new' TCI state definition can include the component (B) comprising two separate SRS resource(s), S1 and S2. In one example, such an UL transmission is targeted towards two TRPs, and two separate SRS resource(s), S1 and S2, corresponds to the two TRPs. Here, S1 comprises one or multiple SRS resources for the $1^{st}$ PUSCH, and S2 comprises one or multiple SRS resources for the $2^{nd}$ PUSCH.

In one example, the new TCI state includes one indicator indicating a pair of SRS resource(s), (S1, S2).

In one example, the new TCI state includes two separate indicators, one indicating S1 and another indicating S2.

In one embodiment, the information (SRS-Info) about the component (B) can include (e.g., index or indices or ID or IDs of) SRS port(s). For example, for a UE supporting a max of 4 SRS ports, SRS-Info can correspond to SRS port indices {0,1} or {2,3} or {0,1,2,3}. In one example, SRS port indices {0,1} corresponds to panel 1, SRS port indices {0,1} corresponds to panel 2, and SRS port indices {0,1,2,3} corresponds to panels 1 and 2.

When a TCI state including SRS-Info according this embodiment is indicated, UE can determine/identify one SRS resource or multiple SRS resources (e.g., from one or multiple SRS resource sets configured for codebook-based or non-codebook-based UL transmission). The determined/identified SRS resource(s) can be aligned with the panel selection/switching assumption based on the beam report (as described above). The UE may or may not be indicated with the SRI in UL-DCI, details as described herein. The rest of the details are the same as described herein.

In one embodiment, the information (SRS-Info) about the component (B) can include (e.g., index or indices or ID(s) of) group(s)/subset(s) of SRS resource(s) within a SRS resource set. For example, a UE can be configured with 4 SRS resources partitioned into multiple groups/subsets, Group 0 comprising SRS resources with IDs {0,1}, and Group 1 comprising SRS resources with IDs {2,3}. Or, Group 0 comprising SRS resources with IDs {0,1}, and Group 2 comprising SRS resources with IDs {0,1,2,3}. Or, Group 0 comprising SRS resources with IDs {0,1}, Group 1 comprising SRS resources with IDs {2,3}, and Group 1 comprising SRS resources with IDs {0,1,2,3}. In one example, Group 0 corresponds to panel 1, Group 1 corresponds to panel 2, and Group 0 corresponds to panel 1, and Group 2 corresponds to panels 1 and 2.

When a TCI state including SRS-Info according this embodiment is indicated, UE can determine/identify one SRS resource or multiple SRS resources (e.g., from one or multiple SRS resource sets configured for codebook-based or non-codebook-based UL transmission). The determined/identified SRS resource(s) can be aligned with the panel selection/switching assumption based on the beam report (as described above). The UE may or may not be indicated with the SRI in UL-DCI, details as described herein. The rest of the details are the same as described herein.

In one embodiment, the information (SRS-Info) about the component (B) can include (e.g., index or indices or ID(s) of) SRS resource set(s). For example, a UE can be configured with multiple (e.g., 2) SRS resource sets. For example, when the UE configured with two SRS resource sets (S1 and S2), S1 corresponds to panel 1, and S2 corresponds to panel 2, and (S1, S2) corresponds to panels 1 and 2.

When a TCI state including SRS-Info according this embodiment is indicated, UE can determine/identify one SRS resource or multiple SRS resources (e.g., from one or multiple SRS resource sets configured for codebook-based or non-codebook-based UL transmission). The determined/identified SRS resource(s) can be aligned with the panel selection/switching assumption based on the beam report (as described above). The UE may or may not be indicated with the SRI in UL-DCI, details as described herein. The rest of the details are the same as described herein.

In one embodiment, the information (SRS-Info) about the component (B) can include (e.g., index or indices or ID(s) of) panel(s) or group(s) of SRS ports (within a SRS resource).

When a TCI state including SRS-Info according this embodiment is indicated, UE can determine/identify one SRS resource or multiple SRS resources (e.g., from one or multiple SRS resource sets configured for codebook-based or non-codebook-based UL transmission). The determined/identified SRS resource(s) can be aligned with the panel selection/switching assumption based on the beam report (as described above). The UE may or may not be indicated with the SRI in UL-DCI, details as described herein. The rest of the details are the same as described herein.

In one embodiment, the information (SRS-Info) about the component (B) can include (max) supported number of SRS ports. For example, for a UE supporting 4 SRS ports, the value of the (max) supported number of SRS ports can be 2 or 4, where the value 2 corresponds to one panel (e.g., panel 1), and the value 4 corresponds to two panels (panels 1 and 2).

When a TCI state including SRS-Info according this embodiment is indicated, UE can determine/identify one SRS resource or multiple SRS resources (e.g., from one or multiple SRS resource sets configured for codebook-based or non-codebook-based UL transmission). The determined/identified SRS resource(s) can be aligned with the panel selection/switching assumption based on the beam report (as described above). The UE may or may not be indicated with the SRI in UL-DCI, details as described herein. The rest of the details are the same as described herein.

In one embodiment, the information (SRS-Info) about the component (B) can include UL-BWP ID.

When a TCI state including SRS-Info according this embodiment is indicated, UE can determine/identify one SRS resource or multiple SRS resources (e.g., from one or multiple SRS resource sets configured for codebook-based or non-codebook-based UL transmission). The determined/identified SRS resource(s) can be aligned with the panel selection/switching assumption based on the beam report (as described above). The UE may or may not be indicated with the SRI in UL-DCI, details as described herein. The rest of the details are the same as described herein.

In one embodiment, the information (SRS-Info) about the component (B) can include physical cell-ID (PCI) or TRP ID.

When a TCI state including SRS-Info according this embodiment is indicated, UE can determine/identify one SRS resource or multiple SRS resources (e.g., from one or multiple SRS resource sets configured for codebook-based or non-codebook-based UL transmission). The determined/identified SRS resource(s) can be aligned with the panel selection/switching assumption based on the beam report (as described above). The UE may or may not be indicated with the SRI in UL-DCI, details as described herein. The rest of the details are the same as described herein.

In one embodiment, the information (SRS-Info) about the component (B) can include a combination of two mentioned in embodiments described herein.

When a TCI state including SRS-Info according this embodiment is indicated, UE can determine/identify one SRS resource or multiple SRS resources (e.g., from one or multiple SRS resource sets configured for codebook-based or non-codebook-based UL transmission). The determined/identified SRS resource(s) can be aligned with the panel selection/switching assumption based on the beam report (as described above). The UE may or may not be indicated with the SRI in UL-DCI, details as described herein. The rest of the details are the same as described herein.

In one embodiment, the information (SRS-Info) about the component (B) is included in the TCI state definition explicitly according to one of the embodiments described herein, and the source RS (as described in component A) can be absent (not included) in the TCI state definition. When source RS is absent, TCI state is used to indicate only component (B), i.e., fast panel selection/switch. When such a TCI state is indicated, the UL Tx beam can either be the last indicated UL Tx beam (e.g., via UL-TCI or DLorJoint-TCI state), or the UL Tx beam is indicated via a separate channel/medium or the UL Tx beam is default beam.

When a TCI state including SRS-Info according this embodiment is indicated, UE can determine/identify one SRS resource or multiple SRS resources (e.g., from one or multiple SRS resource sets configured for codebook-based or non-codebook-based UL transmission). The determined/identified SRS resource(s) can be aligned with the panel selection/switching assumption based on the beam report (as described above). The UE may or may not be indicated with the SRI in UL-DCI, details as described herein. The rest of the details are the same as described herein.

In one embodiment, the information (SRS-Info) about the component (B) is included in the TCI state definition implicitly without a field or parameter (such srs-Info). In one example, source RS indicated via the component (A) also provide information about the component (B).

In one example, one source RS provides reference for both UL Tx beam as well as panel selection/switch, i.e., a TCI state is indicated for both beam and panel selection.

In one example, the source RS can be the same as a CSI-RS or SSB indicated via CRI or SSBRI in the beam report including the capability value index (indicating max supported #SRS ports).

In one example, the source RS can be determined based on a CSI-RS or SSB indicated via CRI or SSBRI in the beam report including the capability value index (indicating max supported #SRS ports).

In one example, the source RS can be a reference RS, which is determined based on as a CSI-RS or SSB indicated via CRI or SSBRI in the beam report including the capability value index (indicating max supported #SRS ports).

In one example, two source RSs can be included, one source RS for the UL Tx beam, and one source RS for panel selection.

When a TCI state including SRS-Info according this embodiment is indicated, UE can determine/identify one SRS resource or multiple SRS resources (e.g., from one or multiple SRS resource sets configured for codebook-based or non-codebook-based UL transmission). The determined/identified SRS resource(s) can be aligned with the panel selection/switching assumption based on the beam report (as described above). The UE may or may not be indicated with the SRI in UL-DCI, details as described herein. The rest of the details are the same as described herein.

TABLE 41

```
UL-TCIState-r18 ::=  SEQUENCE {
   UL-TCIState-Id-r18   UL-TCIState-Id-r18,
   Component (A)
      Component (B)
   ...
}
Component (A) ::= {
   referenceSignal-r17       CHOICE {
      ssb-Index-r17      SSB-Index-r17,
      csi-RS-Index-r17         NZP-CSI-RS-ResourceId-r17,
      srs-r17    PUCCH-SRS-r17
   }
}
Component (B) ::= {
   srs-Info1    SRS-Info
   srs-Info2    SRS-Info
   ...
   srs-InfoN    SRS-Info
}
OR
Component (B) ::= {
   srs-Info    SEQUENCE (SIZE (1 ... N)) OF SRS-Info
}
```

TABLE 42

```
DLorJoint-TCIState-r18 ::=  SEQUENCE {
   Tci-StateUnifiedStateId-r18      TCIState-Id,
   Component (A)
      Component (B)
   ...
}
Component (A) ::= {
   qcl-Type1-r17   QCL-Info-r17,
   qcl-Type2-r17   QCL-Info-r17
}
Component (B) ::= {
   srs-Info1    SRS-Info
   srs-Info2    SRS-Info
   ...
   srs-InfoN    SRS-Info
}
```

TABLE 42-continued

```
OR
Component (B) ::= {
    srs-Info    SEQUENCE (SIZE (1 ... N)) OF SRS-Info
}
```

In one embodiment, a UE can be configured with an UL beam (or TCI state) indication based on a 'new' TCI state definition wherein a TCI state includes and/or is associated with an information about both (A) a source RS for providing a reference for determining UL Tx beam (or UL Tx spatial relation/filter) for UL transmission (e.g., for dynamic-grant and configured-grant based PUSCH and PUCCH resource in a CC, and SRS), and (B) a plurality of (multiple) SRS-Infos (SRS related information). That is, a plurality of SRS-Infos are included in and/or associated with each TCI state. The plurality of SRS-Infos can be used for UL panel selection (when the UE is equipped with multiple UE panels). The information about (B) could be explicitly included in a TCI state, or could be associated with a TCI state via separate IE.

The UE can be configured with a list/pool/set of up to T (e.g., T=64 or 128) TCI-State configurations (e.g., a pool of UL-TCIState-r18 or a pool of DLorJoint-TCIState-r18), details as described herein. Two examples are shown in Table 40 and Table 41. Here, SRS-info can correspond to SRS port(s), SRS port group(s), SRS resource(s), SRS resource group(s), and/or SRS resource set(s).

The UE can also receive an activation command (e.g., via MAC CE), as described in TS 38.321, used to map up to S (e.g., S=one value from 8, 9, . . . 16) TCI states (e.g., in case of J-TCI state) and/or pairs of TCI states, with one TCI state for DL channels/signals and one TCI state for UL channels/signals (e.g., in case of separate DL/UL TCI states) to the codepoints of the DCI field 'Transmission Configuration Indication' for one or for a set of CCs/DL BWPs, and if applicable, for one or for a set of CCs/UL BPWs. In case of J-TCI state configurations, the S TCI states can correspond to the 'new' TCI states providing components (A) and (B) as described above. In case of separate DL/UL-TCI state configurations, the one TCI state for UL channels/signals can corresponds to the 'new' TCI state providing components (A) and (B) as described above.

In a variation, in case of the 'new' TCI state corresponds to J-TCI state, the component (B) can be included within the one or both of the two QCL-Info-r17 parameters.

When the UE reports a beam report indicating panel selection/switch (as described above), the NW may have to perform (re-)configuration or signaling in order to provide the component (B) in the new TCI state definition to facilitate fast panel selection/switch. At least one of the following examples can be used/configured regarding the signaling.

In one example, when a subset of configured TCI states are activated via MAC CE, one SRS-Info is selected for each activated TCI state from the plurality of SRS-Infos associated with and/or included in the activated TCI state.

In one example, when the TCI state update is signaled (either via MAC CE or DCI), one SRS-Info is selected for each updated TCI state from the plurality of SRS-Infos associated with and/or included in the activated TCI state. When the TCI state update updates multiple TCI states (e.g., 2 TCI states for 2 TRPs), or when one MAC CE or DCI code point maps to multiple TCI states, one SRS-Info is selected for each of the multiple updated TCI states from the plurality of SRS-Infos associated with and/or included in the respective updated TCI state. The MAC CE or DCI field for the selection of the SRS-Info can be separate (dedicated) or can be a joint field (e.g., MAC CE activation command that activates a subset of TCI states or a MAC CE or DCI field that updates/indicates the TCI states can be used as a joint field).

When a TCI state including SRS-Info according this embodiment is indicated, UE can determine/identify one SRS resource or multiple SRS resources (e.g., from one or multiple SRS resource sets configured for codebook-based or non-codebook-based UL transmission). The determined/identified SRS resource(s) can be aligned with the panel selection/switching assumption based on the beam report (as described above). The UE may or may not be indicated with the SRI in UL-DCI, details as described herein. The rest of the details are the same as described herein.

The information (SRS-Info) about the component (B) to facilitate UL panel selection/switch can be provided/configured according to at least one of the following sub-embodiments.

The information about the component (B) to facilitate UL panel selection/switch can be provided/configured according to at least one of the following sub-embodiments.

In one embodiment, the SRS-Info information about the component (B) can include (ID or IDs of) one SRS resource or multiple SRS resources. In one example, (ID or IDs of) one SRS resource or multiple SRS resources belong to a SRS resource set, which for example, can be configured with usage set to 'codebook' (for codebook-based UL transmission) or 'nonCodebook' (for non-codebook-based UL transmission), i.e., the component (B) is similar to dynamic UL grant wherein SRI indication via UL-DCI (format 0_1 or 0_2) provides ID or IDs of SRS resource(s). In another example, (ID or IDs of) one SRS resource or multiple SRS resources belong to list of higher layer configured SRS resources.

When this 'new' TCI state is indicated (e.g., via DL-DCI format 1_1 or 1_2 with or without DL assignment), it indicates both UL Tx beam (UL Tx spatial relation/filter) as well as SRS resource(s) for the UL transmission. The indicated SRS resource(s) can also be aligned with the UE panel switch/selection assumptions at UE and NW (e.g., when a capability value information about the UE panel selection is reported by the UE together with the beam report as described in this disclosure).

Since the component (B) corresponds to SRS resource(s), the SRI indication in UL-DCI (format 01 or 0_2) may or may not be needed (indicated).

In one example, SRI is not indicated when (panel and/or) SRS resource selection is performed via component (B) in the new TCI state definition.

In one example, SRI is present/indicated, but the UE ignores it when (panel and/or) SRS selection is performed via component (B) in the new TCI state definition.

In one example, when the component (B) selects/indicates multiple SRS resources, SRI indicates one of the selected SRS resources, and when the component (B) selects/indicates one SRS resource, SRI is either not indicated, or is ignored by the UE.

In one example, SRI indicates one SRS resource from a subset of the SRS resource set, where the subset corresponds to or includes or is determined based on SRS resource(s) that are indicated via the component (B). For example, the component (B) can indicate or map to a set (or a subset/group within a set) of SRS resources, and SRI indicates one SRS resource from this indicates set (or subset/group).

In one example, whether SRI is present (indicated) or absent (not indicated) is configured/indicated, e.g., via RRC, and/or MAC CE, using a parameter sriPresentIn-DCI.

In one example, the (panel and/or) SRS resource is performed via one of the new TCI state definition (indicated via DL-DCI format 1_1 or 1_2) or SRI (indicated via UL-DCI format 0_0 or 0_1). The UE is indicated, via RRC and/or MAC CE, with the information the (panel and/or) SRS resource is performed via one of the new TCI state definition or SRI.

In one example, the (panel and/or) SRS resource is performed via both of the new TCI state definition (indicated via DL-DCI format 1_1 or 1_2) or SRI (indicated via UL-DCI format 0_0 or 0_1). The UE uses the latest of the two (new TCI state or SRI) for the panel and/or) SRS resource selection.

In one example, the (panel and/or) SRS resource is performed via one of or both of the new TCI state definition (indicated via DL-DCI format 1_1 or 1_2) or SRI (indicated via UL-DCI format 0_0 or 0_1). The UE is indicated, via RRC and/or MAC CE, with the information the (panel and/or) SRS resource is performed via one of the new TCI state definition or SRI. The information (one or both of) can be provide to the UE via RRC and/or MAC CE.

In one example, for the case of multi-panel UE (MPUE), i.e., a UE equipped with N>1 antenna panels, the SRS resource(s) can map (belong) to one SRS resource set for all panels, where a subset/group of SRS resources can map to (belong to) a panel. Or, the SRS resource(s) with N1 SRS ports can map to (belong to) a panel, and the SRS resource(s) with N2 SRS ports (N2>N1) can map (belong) to multiple (e.g., 2) or all panels. Alternatively, there is one SRS resource for each panel, and the SRS resource(s) can map (belong) to a SRS resource set for a respective panel. The component (B) then can include X which is according to at least one of the following examples.

In one example, X=X1=SRS resource(s) for one of the N panels, where the one panel can be fixed (e.g., panel 1), or the information about the one panel can be indicated (e.g., by the NW), e.g., via RRC, or MACE or, DCI, or the one panel is left up to UE implementation.

In one example, X=X2={SRS resource1(s), SRS resource2(s)} for 2 out of N panels assuming simultaneous transmission from 2 panels (STx2P).

In one example, X=X1, X2, where X1 and X2 are as described above.

In one example, X=X11, X12, X2, where X2 is as described above. X11=SRS resource(s) for the 1$^{st}$ panel, and X12=SRS resource(s) for the 2$^{nd}$ panel.

In one example, for codebook-based UL transmission, when the UE is configured (via PUSCH-Config) with one SRS resource set or multiple SRS resource sets with usage set to 'codebook', at least one of the following examples can be used/configured.

In one example, the UE is configured (via PUSCH-Config) with one SRS resource set including multiple SRS resources, each with same number of SRS ports. The SRS resources can be partitioned into N groups/subsets, one group/subset for each panel.

In one example, the UE is configured (via PUSCH-Config) with one SRS resource set including multiple SRS resources with different number of SRS ports, each SRS resource maps to one panel or multiple panels. For example, a SRS resource with 2 SRS ports maps to 1 panel, and a SRS resource with 4 SRS ports maps to two panels.

In one example, the UE is configured (via PUSCH-Config) with multiple SRS resource sets, an SRS resource set maps to one panel or multiple panels, each SRS resource set comprises one or multiple SRS resources with the same number of SRS ports, and number of SRS ports in one SRS resource set can be different from that in another SRS resource set.

In one example, for non-codebook-based UL transmission, when the UE is configured (via PUSCH-Config) with one SRS resource set or multiple SRS resource sets with usage set to 'nonCodebook', at least one of the following examples can be used/configured.

In one example, the UE is configured (via PUSCH-Config) with one SRS resource set including multiple SRS resources, each with 1 SRS port. The SRS resources can be partitioned into N groups/subsets, one group/subset for each panel.

In one example, the UE is configured (via PUSCH-Config) with multiple SRS resource sets, each set with different number of SRS resources, each SRS resource set maps to one panel or multiple panels. For example, a SRS resource set with 2 SRS resource maps to 1 panel, and a SRS resource set with 4 SRS resources maps to two panels.

In one example, when the component (B) indicates two separate (groups/subsets of) SRS resource(s), S1 and S2, for example or two panels, at least one of the following example is used for the indication.

In one example, the new TCI state includes one indicator for (B) indicating a pair of SRS resource(s), (S1, S2).

In one example, the new TCI state includes two separate indicators for (B), one indicating S1 and another indicating S2.

In one example, when the UE is configured with two UL (PUSCH) transmissions (e.g., via a single UL-DCI format 0_1 or 0_2), the 'new' TCI state definition can include the component (B) comprising two separate SRS resource(s), S1 and S2. In one example, such an UL transmission is targeted towards two TRPs, and two separate SRS resource(s), S1 and S2, corresponds to the two TRPs. Here, S1 comprises one or multiple SRS resources for the 1$^{st}$ PUSCH, and S2 comprises one or multiple SRS resources for the 2$^{nd}$ PUSCH.

In one example, the new TCI state includes one indicator indicating a pair of SRS resource(s), (S1, S2).

In one example, the new TCI state includes two separate indicators, one indicating S1 and another indicating S2.

In one embodiment, the information (SRS-Info) about the component (B) can include (e.g., index or indices or ID or IDs of) SRS port(s). For example, for a UE supporting a max of 4 SRS ports, SRS-Info can correspond to SRS port indices {0,1} or {2,3} or {0,1,2,3}. In one example, SRS port indices {0,1} corresponds to panel 1, SRS port indices {0,1} corresponds to panel 2, and SRS port indices {0,1,2,3} corresponds to panels 1 and 2.

When a TCI state including SRS-Info according this embodiment is indicated, UE can determine/identify one SRS resource or multiple SRS resources (e.g., from one or multiple SRS resource sets configured for codebook-based or non-codebook-based UL transmission). The determined/identified SRS resource(s) can be aligned with the panel selection/switching assumption based on the beam report (as described above). The UE may or may not be indicated with the SRI in UL-DCI, details as described herein. The rest of the details are the same as described herein.

In one embodiment, the information (SRS-Info) about the component (B) can include (e.g., index or indices or ID(s) of) group(s)/subset(s) of SRS resource(s) within a SRS resource set. For example, a UE can be configured with 4 SRS resources partitioned into multiple groups/subsets, Group 0 comprising SRS resources with IDs {0,1}, and Group 1 comprising SRS resources with IDs {2,3}. Or, Group 0 comprising SRS resources with IDs {0,1}, and Group 2 comprising SRS resources with IDs {0,1,2,3}. Or, Group 0 comprising SRS resources with IDs {0,1}, Group 1 comprising SRS resources with IDs {2,3}, and Group 1 comprising SRS resources with IDs {0,1,2,3}. In one example, Group 0 corresponds to panel 1, Group 1 corresponds to panel 2, and Group 0 corresponds to panel 1, and Group 2 corresponds to panels 1 and 2.

When a TCI state including SRS-Info according this embodiment is indicated, UE can determine/identify one SRS resource or multiple SRS resources (e.g., from one or multiple SRS resource sets configured for codebook-based or non-codebook-based UL transmission). The determined/identified SRS resource(s) can be aligned with the panel selection/switching assumption based on the beam report (as described above). The UE may or may not be indicated with the SRI in UL-DCI, details as described herein. The rest of the details are the same as described herein.

In one embodiment, the information (SRS-Info) about the component (B) can include (e.g., index or indices or ID(s) of) SRS resource set(s). For example, a UE can be configured with multiple (e.g., 2) SRS resource sets. For example, when the UE configured with two SRS resource sets (S1 and S2), S1 corresponds to panel 1, and S2 corresponds to panel 2, and (S1, S2) corresponds to panels 1 and 2.

When a TCI state including SRS-Info according this embodiment is indicated, UE can determine/identify one SRS resource or multiple SRS resources (e.g., from one or multiple SRS resource sets configured for codebook-based or non-codebook-based UL transmission). The determined/identified SRS resource(s) can be aligned with the panel selection/switching assumption based on the beam report (as described above). The UE may or may not be indicated with the SRI in UL-DCI, details as described herein. The rest of the details are the same as described herein.

In one embodiment, the information (SRS-Info) about the component (B) can include (e.g., index or indices or ID(s) of) panel(s) or group(s) of SRS ports (within a SRS resource).

When a TCI state including SRS-Info according this embodiment is indicated, UE can determine/identify one SRS resource or multiple SRS resources (e.g., from one or multiple SRS resource sets configured for codebook-based or non-codebook-based UL transmission). The determined/identified SRS resource(s) can be aligned with the panel selection/switching assumption based on the beam report (as described above). The UE may or may not be indicated with the SRI in UL-DCI, details as described herein. The rest of the details are the same as described herein.

In one embodiment, the information (SRS-Info) about the component (B) can include (max) supported number of SRS ports. For example, for a UE supporting 4 SRS ports, the value of the (max) supported number of SRS ports can be 2 or 4, where the value 2 corresponds to one panel (e.g., panel 1), and the value 4 corresponds to two panels (panels 1 and 2).

When a TCI state including SRS-Info according this embodiment is indicated, UE can determine/identify one SRS resource or multiple SRS resources (e.g., from one or multiple SRS resource sets configured for codebook-based or non-codebook-based UL transmission). The determined/identified SRS resource(s) can be aligned with the panel selection/switching assumption based on the beam report (as described above). The UE may or may not be indicated with the SRI in UL-DCI, details as described herein. The rest of the details are the same as described herein.

In one embodiment, the information (SRS-Info) about the component (B) can include UL-BWP ID.

When a TCI state including SRS-Info according this embodiment is indicated, UE can determine/identify one SRS resource or multiple SRS resources (e.g., from one or multiple SRS resource sets configured for codebook-based or non-codebook-based UL transmission). The determined/identified SRS resource(s) can be aligned with the panel selection/switching assumption based on the beam report (as described above). The UE may or may not be indicated with the SRI in UL-DCI, details as described herein. The rest of the details are the same as described herein.

In one embodiment, the information (SRS-Info) about the component (B) can include physical cell-ID (PCI) or TRP ID.

When a TCI state including SRS-Info according this embodiment is indicated, UE can determine/identify one SRS resource or multiple SRS resources (e.g., from one or multiple SRS resource sets configured for codebook-based or non-codebook-based UL transmission). The determined/identified SRS resource(s) can be aligned with the panel selection/switching assumption based on the beam report (as described above). The UE may or may not be indicated with the SRI in UL-DCI, details as described herein. The rest of the details are the same as described herein.

In one embodiment, the information (SRS-Info) about the component (B) can include a combination of two mentioned herein.

When a TCI state including SRS-Info according this embodiment is indicated, UE can determine/identify one SRS resource or multiple SRS resources (e.g., from one or multiple SRS resource sets configured for codebook-based or non-codebook-based UL transmission). The determined/identified SRS resource(s) can be aligned with the panel selection/switching assumption based on the beam report (as described above). The UE may or may not be indicated with the SRI in UL-DCI, details as described herein. The rest of the details are the same as described herein.

In one embodiment, the information (SRS-Info) about the component (B) is included in the TCI state definition explicitly according to one of embodiments IV.1 through IV.9, and the source RS (as described in component A) can be absent (not included) in the TCI state definition. When source RS is absent, TCI state is used to indicate only component (B), i.e., fast panel selection/switch. When such a TCI state is indicated, the UL Tx beam can either be the last indicated UL Tx beam (e.g., via UL-TCI or DLorJoint-TCI state), or the UL Tx beam is indicated via a separate channel/medium or the UL Tx beam is default beam.

When a TCI state including SRS-Info according this embodiment is indicated, UE can determine/identify one SRS resource or multiple SRS resources (e.g., from one or multiple SRS resource sets configured for codebook-based or non-codebook-based UL transmission). The determined/identified SRS resource(s) can be aligned with the panel selection/switching assumption based on the beam report (as described above). The UE may or may not be indicated with the SRI in UL-DCI, details as described herein. The rest of the details are the same as described herein.

In one embodiment, the information (SRS-Info) about the component (B) is included in the TCI state definition implicitly without a field or parameter (such as srs-Info). In one example, source RS indicated via the component (A) also provide information about the component (B).

In one example, one source RS provides reference for both UL Tx beam as well as panel selection/switch, i.e., a TCI state is indicated for both beam and panel selection.

In one example, the source RS can be the same as a CSI-RS or SSB indicated via CRI or SSBRI in the beam report including the capability value index (indicating max supported #SRS ports).

In one example, the source RS can be determined based on a CSI-RS or SSB indicated via CRI or SSBRI in the beam report including the capability value index (indicating max supported #SRS ports).

In one example, the source RS can be a reference RS, which is determined based on as a CSI-RS or SSB indicated via CRI or SSBRI in the beam report including the capability value index (indicating max supported #SRS ports).

In one example, two source RSs can be included, one source RS for the UL Tx beam, and one source RS for panel selection.

When a TCI state including SRS-Info according this embodiment is indicated, UE can determine/identify one SRS resource or multiple SRS resources (e.g., from one or multiple SRS resource sets configured for codebook-based or non-codebook-based UL transmission). The determined/identified SRS resource(s) can be aligned with the panel selection/switching assumption based on the beam report (as described above). The UE may or may not be indicated with the SRI in UL-DCI, details as described herein. The rest of the details are the same as described herein.

In one embodiment, a UE can be configured with a UL beam (or TCI state) indication wherein a TCI state includes and/or is associated with an information about (A) a source RS for providing a reference for determining UL Tx beam (or UL Tx spatial relation/filter) for UL transmission (e.g., for dynamic-grant and configured-grant based PUSCH and PUCCH resource in a CC, and SRS). The UE is further configured with an information about (B) a plurality of (multiple) SRS-Infos (SRS related information) configured separately via higher layer (and/or MAC CE). Here, SRS-info can correspond to SRS port(s), SRS port group(s), SRS resource(s), SRS resource group(s), and/or SRS resource set(s). The plurality of SRS-Infos can be used for UL panel selection (when the UE is equipped with multiple UE panels). The information about (B) could be explicitly included in a TCI state, or could be associated with a TCI state via separate IE.

The UE can be configured with a list/pool/set of up to T (e.g., T=64 or 128) TCI-State configurations (e.g., a pool of UL-TCIState-r18 or a pool of DLorJoint-TCIState-r18), details as described herein.

The UE can also receive an activation command (e.g., via MAC CE), as described in TS 38.321, used to map up to S (e.g., S=one value from 8, 9, . . . 16) TCI states (e.g., in case of J-TCI state) and/or pairs of TCI states, with one TCI state for DL channels/signals and one TCI state for UL channels/signals (e.g., in case of separate DL/UL TCI states) to the codepoints of the DCI field 'Transmission Configuration Indication' for one or for a set of CCs/DL BWPs, and if applicable, for one or for a set of CCs/UL BPWs.

When the UE reports a beam report indicating panel selection/switch (as described above), the NW may have to perform (re-)configuration or signaling in order to provide the component (B) in the new TCI state definition to facilitate fast panel selection/switch. At least one of the following examples can be used/configured regarding the signaling.

In one example, when a subset of configured TCI states are activated via MAC CE, one SRS-Info is selected for each activated TCI state from the plurality of configured SRS-Infos.

In one example, when the TCI state update is signaled (either via MAC CE or DCI), one SRS-Info is selected for each updated TCI state from the plurality of configured SRS-Infos. When the TCI state update updates multiple TCI states (e.g., 2 TCI states for 2 TRPs), or when one MAC CE or DCI code point maps to multiple TCI states, one SRS-Info is selected for each of the multiple updated TCI states from the plurality of configured SRS-Infos. The MAC CE or DCI field for the selection of the SRS-Info can be separate (dedicated) or can be a joint field (e.g., MAC CE activation command that activates a subset of TCI states or a MAC CE or DCI field that updates/indicates the TCI states can be used as a joint field.

When a TCI state including SRS-Info according this embodiment is indicated, UE can determine/identify one SRS resource or multiple SRS resources (e.g., from one or multiple SRS resource sets configured for codebook-based or non-codebook-based UL transmission). The determined/identified SRS resource(s) can be aligned with the panel selection/switching assumption based on the beam report (as described above). The UE may or may not be indicated with the SRI in UL-DCI, details as described herein. The rest of the details are the same as described herein.

The information about the component (B) to facilitate UL panel selection/switch can be provided/configured according to at least one of the following sub-embodiments.

In one embodiment, the SRS-Info information about the component (B) can include (ID or IDs of) one SRS resource or multiple SRS resources. In one example, (ID or IDs of) one SRS resource or multiple SRS resources belong to a SRS resource set, which for example, can be configured with usage set to 'codebook' (for codebook-based UL transmission) or 'nonCodebook' (for non-codebook-based UL transmission), i.e., the component (B) is similar to dynamic UL grant wherein SRI indication via UL-DCI (format 0_1 or 0_2) provides ID or IDs of SRS resource(s). In another example, (ID or IDs of) one SRS resource or multiple SRS resources belong to list of higher layer configured SRS resources.

When this 'new' TCI state is indicated (e.g., via DL-DCI format 1_1 or 1_2 with or without DL assignment), it indicates both UL Tx beam (UL Tx spatial relation/filter) as well as SRS resource(s) for the UL transmission. The indicated SRS resource(s) can also be aligned with the UE panel switch/selection assumptions at UE and NW (e.g., when a capability value information about the UE panel selection is reported by the UE together with the beam report as described in this disclosure).

Since the component (B) corresponds to SRS resource(s), the SRI indication in UL-DCI (format 0_1 or 0_2) may or may not be needed (indicated).

In one example, SRI is not indicated when (panel and/or) SRS resource selection is performed via component (B) in the new TCI state definition.

In one example, SRI is present/indicated, but the UE ignores it when (panel and/or) SRS selection is performed via component (B) in the new TCI state definition.

In one example, when the component (B) selects/indicates multiple SRS resources, SRI indicates one of the selected SRS resources, and when the component (B) selects/indicates one SRS resource, SRI is either not indicated, or is ignored by the UE.

In one example, SRI indicates one SRS resource from a subset of the SRS resource set, where the subset corresponds to or includes or is determined based on SRS resource(s) that are indicated via the component (B). For example, the component (B) can indicate or map to a set (or a subset/group within a set) of SRS resources, and SRI indicates one SRS resource from this indicates set (or subset/group).

In one example, whether SRI is present (indicated) or absent (not indicated) is configured/indicated, e.g., via RRC, and/or MAC CE, using a parameter sriPresentInDCI.

In one example, the (panel and/or) SRS resource is performed via one of the new TCI state definition (indicated via DL-DCI format 1_1 or 1_2) or SRI (indicated via UL-DCI format 0_0 or 0_1). The UE is indicated, via RRC and/or MAC CE, with the information the (panel and/or) SRS resource is performed via one of the new TCI state definition or SRI.

In one example, the (panel and/or) SRS resource is performed via both of the new TCI state definition (indicated via DL-DCI format 1_1 or 1_2) or SRI (indicated via UL-DCI format 0_0 or 0_1). The UE uses the latest of the two (new TCI state or SRI) for the panel and/or) SRS resource selection.

In one example, the (panel and/or) SRS resource is performed via one of or both of the new TCI state definition (indicated via DL-DCI format 1_1 or 1_2) or SRI (indicated via UL-DCI format 0_0 or 0_1). The UE is indicated, via RRC and/or MAC CE, with the information the (panel and/or) SRS resource is performed via one of the new TCI state definition or SRI. The information (one or both of) can be provide to the UE via RRC and/or MAC CE.

In one example, for the case of multi-panel UE (MPUE), i.e., a UE equipped with N>1 antenna panels, the SRS resource(s) can map (belong) to one SRS resource set for all panels, where a subset/group of SRS resources can map to (belong to) a panel. Or, the SRS resource(s) with N1 SRS ports can map to (belong to) a panel, and the SRS resource(s) with N2 SRS ports (N2>N1) can map (belong) to multiple (e.g., 2) or all panels. Alternatively, there is one SRS resource for each panel, and the SRS resource(s) can map (belong) to a SRS resource set for a respective panel. The component (B) then can include X which is according to at least one of the following examples.

In one example, X=X1=SRS resource(s) for one of the N panels, where the one panel can be fixed (e.g., panel 1), or the information about the one panel can be indicated (e.g., by the NW), e.g., via RRC, or MACE or, DCI, or the one panel is left up to UE implementation.

In one example, X=X2={SRS resource1(s), SRS resource2(s)} for 2 out of N panels assuming simultaneous transmission from 2 panels (STx2P).

In one example, X=X1, X2, where X1 and X2 are as described above.

In one example, X=X11, X12, X2, where X2 is as described above. X11=SRS resource(s) for the $1^{st}$ panel, and X12=SRS resource(s) for the $2^{nd}$ panel.

In one example, for codebook-based UL transmission, when the UE is configured (via PUSCH-Config) with one SRS resource set or multiple SRS resource sets with usage set to 'codebook', at least one of the following examples can be used/configured.

In one example, the UE is configured (via PUSCH-Config) with one SRS resource set including multiple SRS resources, each with same number of SRS ports. The SRS resources can be partitioned into N groups/subsets, one group/subset for each panel.

In one example, the UE is configured (via PUSCH-Config) with one SRS resource set including multiple SRS resources with different number of SRS ports, each SRS resource maps to one panel or multiple panels. For example, a SRS resource with 2 SRS ports maps to 1 panel, and a SRS resource with 4 SRS ports maps to two panels.

In one example, the UE is configured (via PUSCH-Config) with multiple SRS resource sets, an SRS resource set maps to one panel or multiple panels, each SRS resource set comprises one or multiple SRS resources with the same number of SRS ports, and number of SRS ports in one SRS resource set can be different from that in another SRS resource set.

In one example, for non-codebook-based UL transmission, when the UE is configured (via PUSCH-Config) with one SRS resource set or multiple SRS resource sets with usage set to 'nonCodebook', at least one of the following examples can be used/configured.

In one example, the UE is configured (via PUSCH-Config) with one SRS resource set including multiple SRS resources, each with 1 SRS port. The SRS resources can be partitioned into N groups/subsets, one group/subset for each panel.

In one example, the UE is configured (via PUSCH-Config) with multiple SRS resource sets, each set with different number of SRS resources, each SRS resource set maps to one panel or multiple panels. For example, a SRS resource set with 2 SRS resource maps to 1 panel, and a SRS resource set with 4 SRS resources maps to two panels.

In one example, when the component (B) indicates two separate (groups/subsets of) SRS resource(s), S1 and S2, for example or two panels, at least one of the following example is used for the indication.

In one example, the new TCI state includes one indicator for (B) indicating a pair of SRS resource(s), (S1, S2).

In one example, the new TCI state includes two separate indicators for (B), one indicating S1 and another indicating S2.

In one example, when the UE is configured with two UL (PUSCH) transmissions (e.g., via a single UL-DCI format 0_1 or 0_2), the 'new' TCI state definition can include the component (B) comprising two separate SRS resource(s), S1 and S2. In one example, such an UL transmission is targeted towards two TRPs, and two separate SRS resource(s), S1 and S2, corresponds to the two TRPs. Here, S1 comprises one or multiple SRS resources for the $1^{st}$ PUSCH, and S2 comprises one or multiple SRS resources for the $2^{nd}$ PUSCH.

In one example, the new TCI state includes one indicator indicating a pair of SRS resource(s), (S1, S2).

In one example, the new TCI state includes two separate indicators, one indicating S1 and another indicating S2.

In one embodiment, the information (SRS-Info) about the component (B) can include (e.g., index or indices or ID or IDs of) SRS port(s). For example, for a UE supporting a max of 4 SRS ports, SRS-Info can correspond to SRS port indices {0,1} or {2,3} or {0,1,2,3}. In one example, SRS port indices {0,1} corresponds to panel 1, SRS port indices {0,1} corresponds to panel 2, and SRS port indices {0,1,2,3} corresponds to panels 1 and 2.

When a TCI state including SRS-Info according this embodiment is indicated, UE can determine/identify one SRS resource or multiple SRS resources (e.g., from one or multiple SRS resource sets configured for codebook-based or non-codebook-based UL transmission). The determined/identified SRS resource(s) can be aligned with the panel selection/switching assumption based on the beam report (as described above). The UE may or may not be indicated with the SRI in UL-DCI, details as described herein. The rest of the details are the same as described herein.

In one embodiment, the information (SRS-Info) about the component (B) can include (e.g., index or indices or ID(s) of) group(s)/subset(s) of SRS resource(s) within a SRS resource set. For example, a UE can be configured with 4 SRS resources partitioned into multiple groups/subsets, Group 0 comprising SRS resources with IDs {0,1}, and Group 1 comprising SRS resources with IDs {2,3}. Or, Group 0 comprising SRS resources with IDs {0,1}, and Group 2 comprising SRS resources with IDs {0,1,2,3}. Or, Group 0 comprising SRS resources with IDs {0,1}, Group 1 comprising SRS resources with IDs {2,3}, and Group 1 comprising SRS resources with IDs {0,1,2,3}. In one example, Group 0 corresponds to panel 1, Group 1 corresponds to panel 2, and Group 0 corresponds to panel 1, and Group 2 corresponds to panels 1 and 2.

When a TCI state including SRS-Info according this embodiment is indicated, UE can determine/identify one SRS resource or multiple SRS resources (e.g., from one or multiple SRS resource sets configured for codebook-based or non-codebook-based UL transmission). The determined/identified SRS resource(s) can be aligned with the panel selection/switching assumption based on the beam report (as described above). The UE may or may not be indicated with the SRI in UL-DCI, details as described herein. The rest of the details are the same as described herein.

In one embodiment, the information (SRS-Info) about the component (B) can include (e.g., index or indices or ID(s) of) SRS resource set(s). For example, a UE can be configured with multiple (e.g., 2) SRS resource sets. For example, when the UE configured with two SRS resource sets (S1 and S2), S1 corresponds to panel 1, and S2 corresponds to panel 2, and (S1, S2) corresponds to panels 1 and 2.

When a TCI state including SRS-Info according this embodiment is indicated, UE can determine/identify one SRS resource or multiple SRS resources (e.g., from one or multiple SRS resource sets configured for codebook-based or non-codebook-based UL transmission). The determined/identified SRS resource(s) can be aligned with the panel selection/switching assumption based on the beam report (as described above). The UE may or may not be indicated with the SRI in UL-DCI, details as described herein. The rest of the details are the same as described herein.

In one embodiment, the information (SRS-Info) about the component (B) can include (e.g., index or indices or ID(s) of) panel(s) or group(s) of SRS ports (within a SRS resource).

When a TCI state including SRS-Info according this embodiment is indicated, UE can determine/identify one SRS resource or multiple SRS resources (e.g., from one or multiple SRS resource sets configured for codebook-based or non-codebook-based UL transmission). The determined/identified SRS resource(s) can be aligned with the panel selection/switching assumption based on the beam report (as described above). The UE may or may not be indicated with the SRI in UL-DCI, details as described herein. The rest of the details are the same as described herein.

In one embodiment, the information (SRS-Info) about the component (B) can include (max) supported number of SRS ports. For example, for a UE supporting 4 SRS ports, the value of the (max) supported number of SRS ports can be 2 or 4, where the value 2 corresponds to one panel (e.g., panel 1), and the value 4 corresponds to two panels (panels 1 and 2).

When a TCI state including SRS-Info according this embodiment is indicated, UE can determine/identify one SRS resource or multiple SRS resources (e.g., from one or multiple SRS resource sets configured for codebook-based or non-codebook-based UL transmission). The determined/identified SRS resource(s) can be aligned with the panel selection/switching assumption based on the beam report (as described above). The UE may or may not be indicated with the SRI in UL-DCI, details as described herein. The rest of the details are the same as described herein.

In one embodiment, the information (SRS-Info) about the component (B) can include UL-BWP ID.

When a TCI state including SRS-Info according this embodiment is indicated, UE can determine/identify one SRS resource or multiple SRS resources (e.g., from one or multiple SRS resource sets configured for codebook-based or non-codebook-based UL transmission). The determined/identified SRS resource(s) can be aligned with the panel selection/switching assumption based on the beam report (as described above). The UE may or may not be indicated with the SRI in UL-DCI, details as described herein. The rest of the details are the same as described herein.

In one embodiment, the information (SRS-Info) about the component (B) can include physical cell-ID (PCI) or TRP ID.

When a TCI state including SRS-Info according this embodiment is indicated, UE can determine/identify one SRS resource or multiple SRS resources (e.g., from one or multiple SRS resource sets configured for codebook-based or non-codebook-based UL transmission). The determined/identified SRS resource(s) can be aligned with the panel selection/switching assumption based on the beam report (as described above). The UE may or may not be indicated with the SRI in UL-DCI, details as described herein. The rest of the details are the same as described herein.

In one embodiment, the information (SRS-Info) about the component (B) can include a combination of two mentioned herein.

When a TCI state including SRS-Info according this embodiment is indicated, UE can determine/identify one SRS resource or multiple SRS resources (e.g., from one or multiple SRS resource sets configured for codebook-based or non-codebook-based UL transmission). The determined/identified SRS resource(s) can be aligned with the panel selection/switching assumption based on the beam report (as described above). The UE may or may not be indicated with the SRI in UL-DCI, details as described herein. The rest of the details are the same as described herein.

In one embodiment, the information (SRS-Info) about the component (B) is included in the TCI state definition explicitly according to one of the embodiments described herein, and the source RS (as described in component A) can be absent (not included) in the TCI state definition. When source RS is absent, TCI state is used to indicate only component (B), i.e., fast panel selection/switch. When such a TCI state is indicated, the UL Tx beam can either be the last indicated UL Tx beam (e.g., via UL-TCI or DLorJoint-TCI state), or the UL Tx beam is indicated via a separate channel/medium or the UL Tx beam is default beam.

When a TCI state including SRS-Info according this embodiment is indicated, UE can determine/identify one SRS resource or multiple SRS resources (e.g., from one or multiple SRS resource sets configured for codebook-based or non-codebook-based UL transmission). The determined/identified SRS resource(s) can be aligned with the panel selection/switching assumption based on the beam report (as described above). The UE may or may not be indicated with the SRI in UL-DCI, details as described herein. The rest of the details are the same as described herein.

In one embodiment, the information (SRS-Info) about the component (B) is included in the TCI state definition implicitly without a field or parameter (such srs-Info). In one example, source RS indicated via the component (A) also provide information about the component (B).

In one example, one source RS provides reference for both UL Tx beam as well as panel selection/switch, i.e., a TCI state is indicated for both beam and panel selection.

In one example, the source RS can be the same as a CSI-RS or SSB indicated via CRI or SSBRI in the beam report including the capability value index (indicating max supported #SRS ports).

In one example, the source RS can be determined based on a CSI-RS or SSB indicated via CRI or SSBRI in the beam report including the capability value index (indicating max supported #SRS ports).

In one example, the source RS can be a reference RS, which is determined based on as a CSI-RS or SSB indicated via CRI or SSBRI in the beam report including the capability value index (indicating max supported #SRS ports).

In one example, two source RSs can be included, one source RS for the UL Tx beam, and one source RS for panel selection.

When a TCI state including SRS-Info according this embodiment is indicated, UE can determine/identify one SRS resource or multiple SRS resources (e.g., from one or multiple SRS resource sets configured for codebook-based or non-codebook-based UL transmission). The determined/identified SRS resource(s) can be aligned with the panel selection/switching assumption based on the beam report (as described above). The UE may or may not be indicated with the SRI in UL-DCI, details as described herein. The rest of the details are the same as described herein.

In one embodiment, which is a variation of embodiments described herein, except that either the SRI is replaced with or indicates SRS resource(s) that correspond to another quantity or capability type (included in the beam report as explained in this disclosure) that can correspond to or associated with UE antenna panels. In one example, the another quantity or the capability type corresponds to at least one of the following examples.

PanelID(s)
SRS resource set ID(s)
SRS resource ID(s)
SRS port group ID(s)
Number of UL layers or rank
Coherence type
TPMI group(s)

Figure 15:
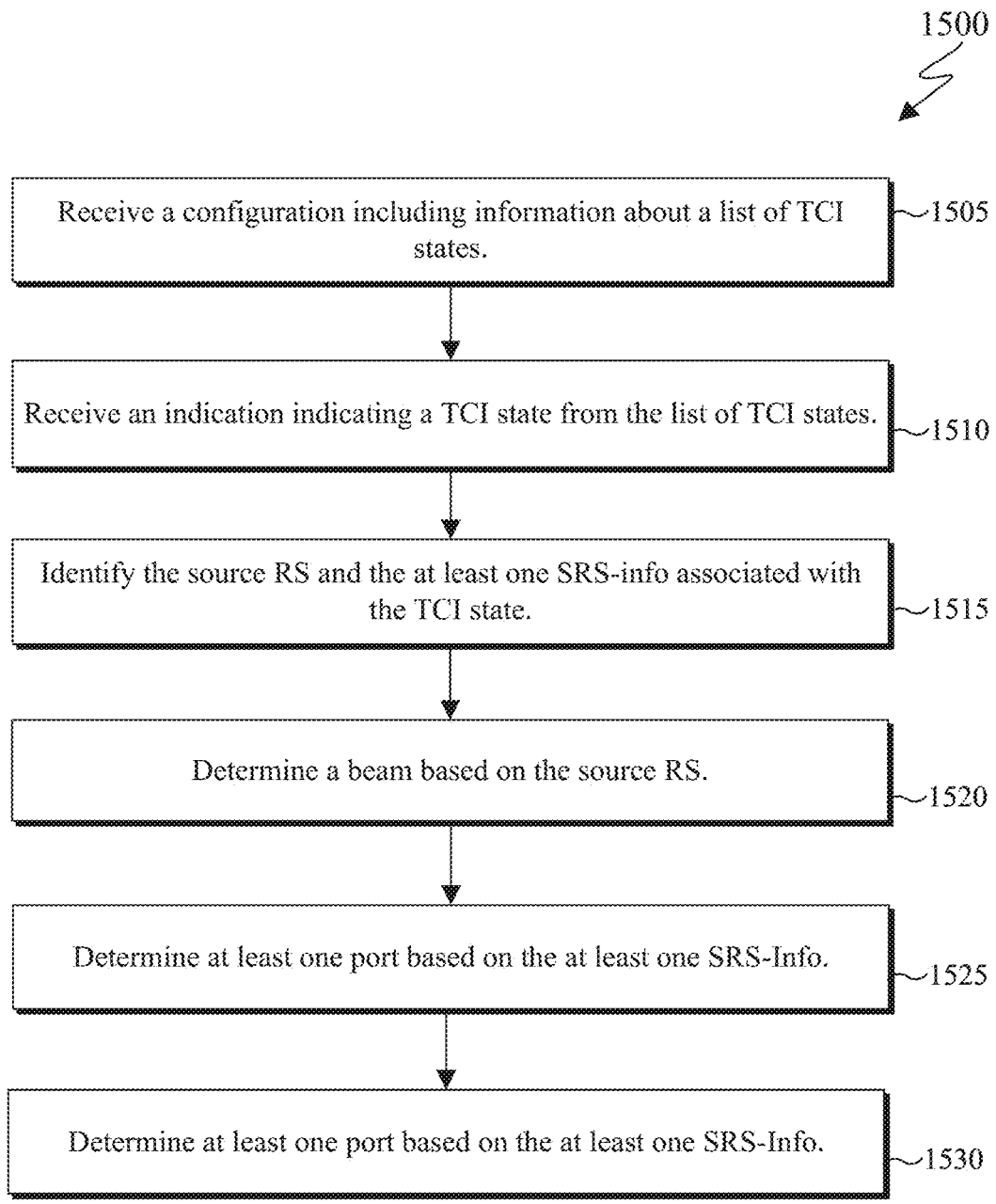
FIG. 15 illustrates a flowchart for a method for UL transmit beam and SRS resource alignment according to embodiments of the present disclosure.

FIG. 15 illustrates a flowchart for a method 1500 for UL transmit beam and SRS resource alignment according to embodiments of the present disclosure. For example, the method 1500 may be performed by The embodiment of the method 1500 illustrated in FIG. 15 is for illustration only. FIG. 15 does not limit the scope of this disclosure to any particular implementation.

The method begins with the UE receiving a configuration including information about a list of TCI states (step 1505). The UE then receives an indication indicating a TCI state from the list of TCI states (step 1510). For example, in step 1510, the TCI state is associated with a source RS SRS-Info. For example, the at least one SRS-Info corresponds to at least one of IDs of one or more SRS resources, IDs of one or more SRS ports, IDs of one or more SRS resource sets, a group of SRS resources, a group of SRS ports, a maximum supported number of SRS ports, and an UL BWP ID.

In various embodiments, the indication includes a codepoint of a field that indicates the TCI state. In various embodiments, the codepoint is mapped to (i) the TCI state or (ii) a pair of TCI states. When the code point is mapped to the TCI state: the TCI state is for one or a set of CCs/UL BPWs, or the TCI state is for both of (i) the one or the set of CCs/UL BWPs and (ii) one or a set of CCs/DL BPWs. When the code point is mapped to the pair of TCI states: the pair includes a DL TCI state and the TCI state, the DL TCI state is for the one or the set of CCs/DL BWPs, and the TCI state is for the one or the set of CCs/UL BPWs.

In various embodiments, the indication is via a DCI field, a MAC-CE activates up to S TCI states or pairs of TCI states corresponding to multiple SRS-Info, where S>1. The codepoint of the DCI field indicates the TCI state. The at least one SRS-Info associated with the TCI state is one of the multiple SRS-Info.

In various embodiments, a MAC-CE activates multiple groups of TCI states, each of the multiple groups of TCI states corresponds to a different SRS-Info. The indication is via: a joint DCI field that indicates the TCI state and one of the multiple groups of TCI states to which the TCI state belongs or two DCI fields, a first of the two DCI fields indicates the TCI state and a second of the two DCI fields indicates one of the multiple groups of TCI states to which the TCI state belongs.

In various embodiments, the at least one SRS-Info corresponds to multiple SRS-info associated with the source RS. The TCI state includes a TCI state ID and at least one QCL-Info. The at least one QCL-Info includes an ID of the source RS, where the source RS is one of a CSI-RS resource, a SSB resource, or a SRS resource. The TCI state or the at least one QCL-Info includes the at least one SRS-Info or an ID of the at least one SRS-Info.

The UE then identifies the source RS and the at least one SRS-info associated with the TCI state (step 1515). The UE then determines a beam based on the source RS (step 1520). The UE then determines at least one port based on the at least one SRS-Info (step 1525). The UE then transmits an UL transmission using the beam and the at least one port (step 1530). For example, in step 1530, a SRI in a DCI that grants the UL transmission indicates a SRS resource from multiple SRS resources indicated via the at least one SRS-Info.

Any of the above variation embodiments can be utilized independently or in combination with at least one other variation embodiment.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to:
receive a configuration including information about a list of transmission configuration indicator (TCI) states, and
receive an indication indicating a TCI state from the list of TCI states, wherein the TCI state is associated with a source reference signal (RS) and at least one sounding reference signal (SRS) related information (SRS-Info); and
a processor operably coupled to the transceiver, the processor, based on the indication, configured to:
identify the source RS and the at least one SRS-info associated with the TCI state,
determine a beam based on the source RS, and
determine at least one port based on the at least one SRS-Info, wherein the transceiver is further configured to transmit an uplink (UL) transmission using the beam and the at least one port, and
wherein a SRS resource indicator (SRI) in a downlink control information (DCI) that grants the UL transmission indicates a SRS resource from multiple SRS resources indicated via the at least one SRS-Info.

2. The UE of claim 1, wherein the at least one SRS-Info corresponds to at least one of:
identifiers (IDs) of one or more SRS resources,
IDs of one or more SRS ports,
IDs of one or more SRS resource sets
a group of SRS resources,
a group of SRS ports,
a maximum supported number of SRS ports, and
an UL bandwidth part (BWP) ID.

3. The UE of claim 1, wherein the indication includes a codepoint of a field that indicates the TCI state.

4. The UE of claim 3, wherein:
the codepoint is mapped to (i) the TCI state or (ii) a pair of TCI states,
when mapped to the TCI state:
the TCI state is for one or a set of component carriers (CCs)/UL bandwidth parts (BPWs), or the TCI state is for both of (i) the one or the set of CCs/UL BWPs and (ii) one or a set of CCs/downlink (DL) BPWs, and when mapped to the pair of TCI states:
the pair includes a DL TCI state and the TCI state,
the DL TCI state is for the one or the set of CCs/DL BWPs, and
the TCI state is for the one or the set of CCs/UL BPWs.

5. The UE of claim 3, wherein:
the indication is via a downlink control information (DCI) field,
a medium access control-control element (MAC-CE) activates up to S TCI states or pairs of TCI states corresponding to multiple SRS-Info, where S>1,
the codepoint of the DCI field indicates the TCI state, and
the at least one SRS-Info associated with the TCI state is one of the multiple SRS-Info.

6. The UE of claim 1, wherein:
the transceiver is configured to transmit information including capability values indicating capabilities of the UE related to the UL transmission,
the indication is via a field in the downlink control information (DCI,
the DCI further includes a SRS resource indicator (SRI) field, and
the processor is further configured to identify an acknowledgment of receipt of the transmitted information including the capability values based on a value in the SRI field.

7. The UE of claim 1, wherein:
the at least one SRS-Info corresponds to multiple SRS-info associated with the source RS,
the TCI state includes a TCI state identifier (ID) and at least one quasi colocation information (QCL-Info),
the at least one QCL-Info includes an ID of the source RS, where the source RS is one of a channel state information RS (CSI-RS) resource, a synchronization signal block (SSB) resource, or a SRS resource, and
the TCI state or the at least one QCL-Info includes the at least one SRS-Info or an ID of the at least one SRS-Info.

8. A base station (BS) comprising:
a transceiver configured to:
transmit a configuration including information about a list of transmission configuration indicator (TCI) states,
transmit an indication indicating a TCI state from the list of TCI states,
wherein the TCI state is associated with a source reference signal (RS) and at least one sounding reference signal (SRS) related information (SRS-Info),
the source RS indicates a beam, and
the at least one SRS-Info indicates at least one port; and
receive an uplink (UL) transmission based on the beam and the at least one port,
wherein a SRS resource indicator (SRI) in a downlink control information (DCI) that grants the UL transmission indicates a SRS resource from multiple SRS resources indicated via the at least one SRS-Info.

9. The BS of claim 8, wherein the indication includes a codepoint of a field that indicates the TCI state.

10. The BS of claim 9, wherein:
the codepoint is mapped to (i) the TCI state or (ii) a pair of TCI states,
when mapped to the TCI state:
the TCI state is for one or a set of component carriers (CCs)/UL bandwidth parts (BPWs), or
the TCI state is for both of (i) the one or the set of CCs/UL BWPs and (ii) one or a set of CCs/downlink (DL) BPWs, and when mapped to the pair of TCI states:
the pair includes a DL TCI state and the TCI state,
the DL TCI state is for the one or the set of CCs/DL BWPs, and
the TCI state is for the one or the set of CCs/UL BPWs.

11. The BS of claim 9, wherein:
the indication is via a downlink control information (DCI field,
a medium access control-control element (MAC-CE) activates up to S TCI states or pairs of TCI states corresponding to multiple SRS-Info, where S>1,
the codepoint of the DCI field indicates the TCI state, and
the at least one SRS-Info associated with the TCI state is one of the multiple SRS-Info.

12. A method performed by a user equipment (UE), the method comprising:
receiving a configuration including information about a list of transmission configuration indicator (TCI) states;
receiving an indication indicating a TCI state from the list of TCI states, wherein the TCI state is associated with a source reference signal (RS) and at least one sounding reference signal (SRS) related information (SRS-Info);
identifying the source RS and the at least one SRS-info associated with the TCI state;
determining a beam based on the source RS;
determining at least one port based on the at least one SRS-Info; and
transmitting an uplink (UL) transmission using the beam and the at least one port,
wherein a SRS resource indicator (SRI) in a downlink control information (DCI) that grants the UL transmission indicates a SRS resource from multiple SRS resources indicated via the at least one SRS-Info.

13. The method of claim 12, wherein the at least one SRS-Info corresponds to at least one of:
identifiers (IDs) of one or more SRS resources,
IDs of one or more SRS ports,
IDs of one or more SRS resource sets
a group of SRS resources,
a group of SRS ports,
a maximum supported number of SRS ports, and
an UL bandwidth part (BWP) ID.

14. The method of claim 12, wherein the indication includes a codepoint of a field that indicates the TCI state.

15. The method of claim 14, wherein:
the codepoint is mapped to (i) the TCI state or (ii) a pair of TCI states,
when mapped to the TCI state:
the TCI state is for one or a set of component carriers (CCs)/UL bandwidth parts (BPWs), or the TCI state is for both of (i) the one or the set of CCs/UL BWPs and (ii) one or a set of CCs/downlink (DL) BPWs, and
when mapped to the pair of TCI states:
the pair includes a DL TCI state and the TCI state,
the DL TCI state is for the one or the set of CCs/DL BWPs, and
the TCI state is for the one or the set of CCs/UL BPWs.

16. The method of claim 14, wherein:
the indication is via a downlink control information (DCI field,
a medium access control-control element (MAC-CE) activates up to S TCI states or pairs of TCI states corresponding to multiple SRS-Info, where S>1,
the codepoint of the DCI field indicates the TCI state, and
the at least one SRS-Info associated with the TCI state is one of the multiple SRS-Info.

17. The method of claim 14, further comprising: transmitting information including capability values indicating capabilities of the UE related to the UL transmission, wherein the indication is via a field in the downlink control information (DCI and the DCI further includes a SRS resource indicator (SRI) field, and identifying an acknowledgment of receipt of the transmitted information including the capability values based on a value in the SRI field.

18. The method of claim 12, wherein: the at least one SRS-Info corresponds to multiple SRS-info associated with the source RS, the TCI state includes a TCI state identifier (ID) and at least one quasi colocation information (QCL-Info), the at least one QCL-Info includes an ID of the source RS, where the source RS is one of a channel state information RS (CSI-RS) resource, a synchronization signal block (SSB) resource, or a SRS resource, and the TCI state or the at least one QCL-Info includes the at least one SRS-Info or an ID of the at least one SRS-Info.

* * * * *